United States Patent
Ly et al.

(10) Patent No.: US 12,279,157 B2
(45) Date of Patent: Apr. 15, 2025

(54) ELECTRONIC DEVICE AND METHODS FOR PERFORMING DATA AGGREGATION IN A 5G USER EQUIPMENT

(71) Applicant: InterDigital Patent Holdings, Inc., Wilmington, DE (US)

(72) Inventors: Quang Ly, North Wales, PA (US); Michael F. Starsinic, Newtown, PA (US); Hongkun Li, Malvern, PA (US); Pascal M. Adjakple, Great Neck, NY (US); Catalina Mihaela Mladin, Hatboro, PA (US); Joseph M. Murray, Schwenksville, PA (US); Jiwan L. Ninglekhu, Royersford, PA (US); Zhuo Chen, Claymont, DE (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 263 days.

(21) Appl. No.: 17/606,783

(22) PCT Filed: Apr. 28, 2020

(86) PCT No.: PCT/US2020/030243
§ 371 (c)(1),
(2) Date: Oct. 27, 2021

(87) PCT Pub. No.: WO2020/223219
PCT Pub. Date: Nov. 5, 2020

(65) Prior Publication Data
US 2022/0210698 A1 Jun. 30, 2022

Related U.S. Application Data

(60) Provisional application No. 62/840,811, filed on Apr. 30, 2019.

(51) Int. Cl.
*H04W 72/04* (2023.01)
*H04L 5/00* (2006.01)
(Continued)

(52) U.S. Cl.
CPC ................ *H04W 28/065* (2013.01)

(58) Field of Classification Search
CPC ... H04W 88/02; H04W 72/535; H04W 72/53; H04W 92/18; H04W 76/38;
(Continued)

(56) References Cited

U.S. PATENT DOCUMENTS 9,882,877 B2 * 1/2018 Wood ............... H04L 67/12
2012/0157033 A1 * 6/2012 Ou ................... H04W 74/04
455/458

(Continued)

FOREIGN PATENT DOCUMENTS

CN 103096472 A 5/2013
WO WO-2017186308 A1 * 11/2017
WO 2018/067956 A1 4/2018

OTHER PUBLICATIONS

"3rd Generation Partnership Project; Technical Specification Group Services and System Aspects; enhanced Relays for Energy Efficiency and Extensive Coverage; Stage 1 (Release 17)", 3GPP Draft; 22866-020 RM, 3rd Generation Partnership Project (3GPP), Mobile Competence Centre ; 650, Route Des Lucioles ; F-06921 Sophia-Antipolis Cedex ; France vol. SA WGl Mar. 4, 2019 (Mar. 4, 2019), XP051697329.

*Primary Examiner* — Marcus Smith
*Assistant Examiner* — Jason A Harley
(74) *Attorney, Agent, or Firm* — Flaster Greenberg P.C.

(57) ABSTRACT

An electronic device including circuitry configured to send a request to a core network, wherein the request informs the core network that the electronic device is capable of aggre-
(Continued)

gating data and relaying data from other electronic devices; receive one or more aggregation policies from the core network, wherein the one or more aggregation policies provide parameters that instruct how the electronic device is to aggregate and relay data; receive data from the other electronic devices; aggregate the data from the other electronic devices based on the parameters; and send the aggregated data to the core network.

17 Claims, 33 Drawing Sheets

(51) Int. Cl.
| | |
|---|---|
| *H04L 49/9057* | (2022.01) |
| *H04W 12/06* | (2021.01) |
| *H04W 28/02* | (2009.01) |
| *H04W 28/06* | (2009.01) |
| *H04W 36/22* | (2009.01) |
| *H04W 72/02* | (2009.01) |
| *H04W 74/00* | (2009.01) |
| *H04W 88/04* | (2009.01) |

(58) Field of Classification Search
CPC ............... H04L 41/0893; H04L 12/185; H04L 2209/80; H04L 12/1407; H04L 47/28; H04L 67/62; H04M 15/66
USPC ......................................................... 370/473
See application file for complete search history.

(56) References Cited

U.S. PATENT DOCUMENTS

| | | | |
|---|---|---|---|
| 2012/0208562 A1* | 8/2012 | Wilkin | H04L 43/091 455/456.3 |
| 2014/0181201 A1 | 6/2014 | Choi | |
| 2014/0376459 A1* | 12/2014 | Kanamarlapudi | H04W 72/04 370/329 |
| 2016/0088588 A1 | 3/2016 | Li et al. | |
| 2016/0100362 A1* | 4/2016 | Palanisamy | H04W 52/0212 370/311 |
| 2018/0192471 A1* | 7/2018 | Li | H04W 16/04 |
| 2019/0191330 A1* | 6/2019 | Dao | H04L 69/22 |
| 2019/0191467 A1* | 6/2019 | Dao | H04W 76/11 |
| 2019/0306913 A1* | 10/2019 | Kim | H04W 4/70 |
| 2020/0029384 A1* | 1/2020 | Hong | H04W 36/305 |
| 2021/0084130 A1* | 3/2021 | Dai | H04W 12/033 |
| 2021/0127343 A1* | 4/2021 | Mladin | H04W 76/14 |
| 2021/0136659 A1* | 5/2021 | Ianev | H04W 28/02 |

* cited by examiner

Non-Roaming 5G System Architecture in reference point representation

User Plane Architecture for the Uplink Classifier

Multi-homed PDU Session: service continuity case

Change of PDU Session Anchor with IPv6 Multi homed PDU Session

Removal of additional PDU Session Anchor and Branching Point or UL CL

Reference Diagram for IAB Architecture

Protocol Stack Examples of Adaptation Layer in Exemplary Architecture

Protocol Stack Examples of Adaptation Layer in Exemplary Architecture

Protocol Stack Examples of Adaptation Layer in Exemplary Architecture

Protocol Stack Examples of Adaptation Layer in Exemplary Architecture

User Plane Protocol Stacks for Proposed Solution

UE triggered V2X Policy provisioning procedure

Synchronizing Delay Tolerant Data Periods
Between UEs in Relay Chain

Downlink UPF Relay Data Aggregation Operation

RAN Node Paging UE for Delay Tolerant Data

Example User Interface of Relay Aggregation Options in UE

ELECTRONIC DEVICE AND METHODS FOR PERFORMING DATA AGGREGATION IN A 5G USER EQUIPMENT

CROSS-REFERENCE TO RELATED APPLICATIONS

This application is the National Stage Application of International Patent Application No. PCT/US2020/030243, filed Apr. 28, 2020 which claims the benefit of U.S. Provisional Application No. 62/840,811, filed on Apr. 30, 2019, the entire contents of which are incorporated by reference herein.

FIELD

The present disclosure relates generally to wireless communications, and more particularly to wireless communications systems, devices, methods, and computer readable medium with computer-executable instructions for performing data aggregation in 5G User Equipment (UE).

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

UEs can be used to track assets such as shipping containers, and tracking the user UEs require that that UEs operate worldwide and be reachable throughout transport to provide tracking and management of the underlying assets. These UEs may be attached to shipping containers and are expected to operate for lifetimes of 10 to 15 years. The UEs may be devices with fixed batteries so efficient power consumption is a critical requirement. Due to mobility and poor signal strengths, the containers (containing a UE) may not always have connectivity to the core network, and thus the containers will no longer be able to be tracked. Also, traditional UEs used for tracking containers consume large amounts of power as they are powered on for long periods of time when transmitting or receiving data, or waiting to transmit or receive data.

SUMMARY

An exemplary embodiment of the present disclosure provides an electronic device. The electronic device include circuitry configured to send a request to a core network, wherein the request informs the core network that the electronic device is capable of aggregating data and relaying data from other electronic devices; receive one or more aggregation policies from the core network, wherein the one or more aggregation policies provide parameters that instruct how the electronic device is to aggregate and relay data; receive data from the other electronic devices; aggregate the data from the other electronic devices based on the parameters; and send the aggregated data to the core network.

An exemplary embodiment of the present disclosure provides a method performed by an electronic device. The method includes: sending a request to a core network, wherein the request informs the core network that the electronic device is capable of aggregating data and relaying data from other electronic devices; receiving one or more aggregation policies from the core network, wherein the one or more aggregation policies provide parameters that instruct how the electronic device is to aggregate and relay data; receiving data from the other electronic devices; aggregating the data from the other electronic devices based on the parameters; and sending the aggregated data to the core network.

An exemplary embodiment of the present disclosure provides a method for a network node, the method including: receiving a request from an electronic device, wherein the request informs the network node that the electronic device is capable of aggregating data and relaying data from other electronic devices; and sending one or more aggregation policies to the electronic device, wherein the one or more aggregation policies provide parameters that instruct how the electronic device is to aggregate and relay data, wherein the one or more aggregation policies include at least a traffic group ID parameter and a parameter indicative of a delay tolerant data period.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The scope of the present disclosure is best understood from the following detailed description of exemplary embodiments when read in conjunction with the accompanying drawings, wherein.

Figure 1A:
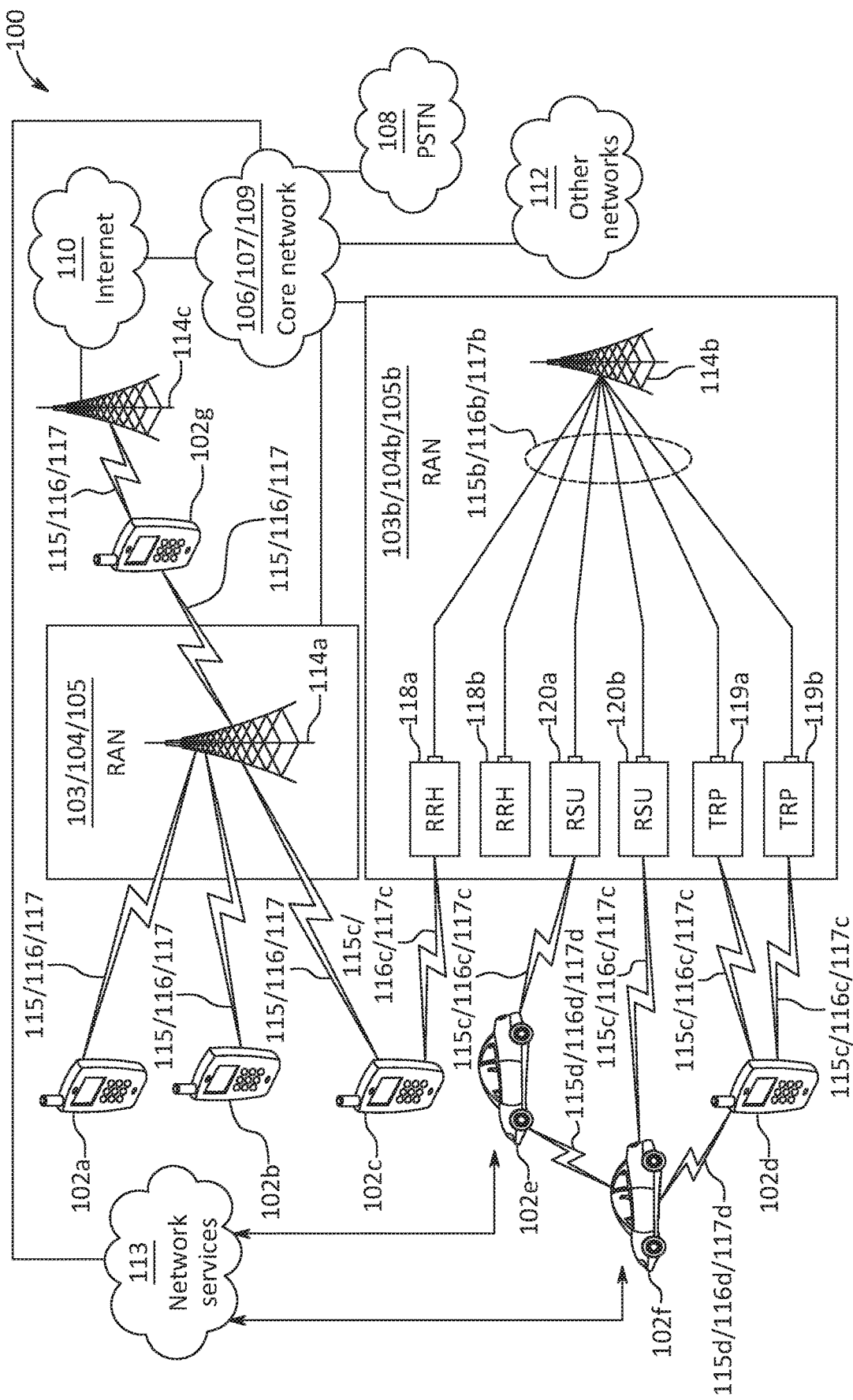
FIG. 1A is a system diagram that shows an example 3GPP architecture.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

The following is a list of acronyms relating to service level and core network technologies that may appear in the below description. Unless otherwise specified, the acronyms used herein refer to the corresponding term listed below.

Definitions and Abbreviations

| Abbreviations | |
|---|---|
| AF | Application Function |
| AMF | Access and Mobility Management Function |
| AS | Application Servers |
| CN | Core Network |
| DL | Downlink |
| DNN | Data Network Name |
| IAB | Integrated Access and Backhaul |
| NAS | Non Access Stratum |
| NF | Network Function |
| NR | NR Radio Access |
| PCF | Policy Control Function |
| PDU | Protocol Data Unit |
| PLMN | Public Land Mobile Network |
| PSA | PDU Session Anchor |
| RACH | Random Access Procedure |
| AF | Application Function |
| RAN | Radio Access Network |
| RSD | Route Selection Descriptor |

-continued

| Abbreviations | |
|---|---|
| SMF | Session Management Function |
| UDM | Unified Data Management |
| UE | User Equipment |
| URSP | UE Route Selection Policy |
| UL | Uplink |
| UPF | User Plane Function |

| Terms and Definitions | |
|---|---|
| Relay Chain | Consists of a group of UEs involved in aggregating and relaying data from other UEs in the group to the core network. |
| Relay UE | A generic term used to refer to a UE that aggregates data from other UEs in a relay chain and relays the aggregated data to an upstream relay UE or to the core network. The term is applied to any UE that performs data aggregation and relaying as outlined in this disclosure. A relay UE in the middle of a relay chain is also referred to as an intermediate UE in the disclosure. A relay UE may also aggregate its own data as well. |
| Remote UE | A UE that provides data to a relay UE for aggregation and relaying to the core network. |
| Management Tracking Systems | Application servers (ASs) located in the cloud to provide tracking and management of assets. |
| Relay Aggregation (RA) UPF | UPFs that support shared PDU session functionality and are able to separate UL data received from relay UEs to one or more PSA UPFs. Additionally, the RA UPF may also aggregate DL data traffic from one or more PSA UPFs and relay the aggregated traffic to a relay UE. |
| Shared PDU Session | A special type of PDU session where data from multiple UEs are aggregated together and sent to the core network. The PDU session supports a special payload where data from multiple PDU sessions are indicated to allow an RA UPF to properly route UL data to the corresponding PSA UPFs. An RA UPF may also use the shared PDU session to aggregate DL traffic to a relay UE. |
| Traffic Group ID | An identifier used to assist in data aggregation of multiple UEs in UE relaying applications. The identifier groups data traffic together to inform UEs and RA UPFs that data traffic may be aggregated together and sent on a shared PDU session. |
| Delay Tolerant Data Period | A parameter provided to UEs and RA UPFs to specify the time duration that data aggregation may occur. At the expiration of this time period, a relay UE will send all data aggregated to an upstream relay UE or to the core network. A RA UPF may use this parameter to aggregate DL data in the core network before sending the data to a relay UE. |

Example Communication System and Networks

FIG. 1A illustrates an example communications system 100 in which the systems, methods, and apparatuses described and claimed herein may be used. The communications system 100 may include wireless transmit/receive units (WTRUs) 102a, 102b, 102c, 102d, 102e, 102f, and/or 102g, which generally or collectively may be referred to as WTRU 102 or WTRUs 102. The communications system 100 may include, a radio access network (RAN) 103/104/105/103b/104b/105b, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 1A, each of the WTRUs 102 is depicted in FIGS. 1A-1E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. In the example of FIG. 1A, each base stations 114a and 114b is depicted as a single element. In practice, the base stations 114a and 114b may include any number of interconnected base stations and/or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b may be any type of device configured to wiredly and/or wirelessly interface with at least one of the Remote Radio Heads (RRHs) 118a, 118b, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, and/or other networks 112.

TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations and/or network elements (not shown), such as a Base Station Controller (BSC), a Radio Network Controller (RNC), relay nodes, etc. Similarly, the base station 114b may be part of the RAN 103b/104b/105b, which may also include other base stations and/or network elements (not shown), such as a BSC, a RNC, relay nodes, etc. The base station 114a may be configured to transmit and/or receive wireless signals within a particular geographic region, which may be referred to as a cell (not shown). Similarly, the base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, for example, the base station 114a may include three transceivers, e.g., one for each sector of the cell. The base station 114a may employ Multiple-Input Multiple Output (MIMO) technology and, therefore, may utilize multiple transceivers for each sector of the cell, for instance.

The base station 114a may communicate with one or more of the WTRUs 102a, 102b, 102c, and 102g over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114b may communicate with one or more of the RRHs 118a and 118b, TRPs 119a and 119b, and/or RSUs 120a and 120b, over a wired or air interface 115b/116b/117b, which may be any suitable wired (e.g., cable, optical fiber, etc.) or wireless communication link (e.g., RF, microwave, IR, UV, visible light, cmWave, mmWave, etc.). The air interface 115b/116b/117b may be established using any suitable RAT.

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., RF, microwave, IR, ultraviolet UV, visible light, cmWave, mmWave, etc.) The air interface 115c/116c/117c may be established using any suitable RAT.

The WTRUs 102 may communicate with one another over a direct air interface 115d/116d/117d, such as Sidelink communication which may be any suitable wireless communication link (e.g., RF, microwave, IR, ultraviolet UV, visible light, cmWave, mmWave, etc.) The air interface 115d/116d/117d may be established using any suitable RAT.

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and/or RSUs 120a and 120b in the RAN 103b/104b/105b and the WTRUs 102c, 102d, 102e, and 102f, may implement a radio technology such as Universal Mobile Telecommunications System (UMTS) Terrestrial Radio Access (UTRA), which may establish the air interface 115/116/117 and/or 115c/116c/117c respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a in the RAN 103/104/105 and the WTRUs 102a, 102b, 102c, and 102g, or RRHs 118a and 118b, TRPs 119a and 119b, and/or RSUs 120a and 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A), for example. The air interface 115/116/117 or 115c/116c/117c may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114a in the RAN 103/104/105 and the WTRUs 102a, 102b, 102c, and 102g or RRHs 118a and 118b, TRPs 119a and 119b, and/or RSUs 120a and 120b in the RAN 103b/104b/105b and the WTRUs 102c, 102d, 102e, and 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114c and the WTRUs 102, e.g., WTRU 102e, may implement a radio technology such as IEEE 802.11 to establish a Wireless Local Area Network (WLAN). Similarly, the base station 114c and the WTRUs 102, e.g., WTRU 102d, may implement a radio technology such as IEEE 802.15 to establish a wireless personal area network (WPAN). The base station 114c and the WTRUs 102, e.g., WRTU 102e, may utilize a cellular-based RAT (e.g., WCDMA, CDMA2000, GSM, LTE, LTE-A, NR, etc.) to establish a picocell or femtocell. As shown in FIG. 1A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the internet protocol (IP) in the TCP/IP internet protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 1A may be configured to communicate with the base station 114a, which may employ a cellular-based radio technology, and with the base station 114c, which may employ an IEEE 802 radio technology.

Although not shown in FIG. 1A, it will be appreciated that a User Equipment may make a wired connection to a gateway. The gateway may be a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 1B:
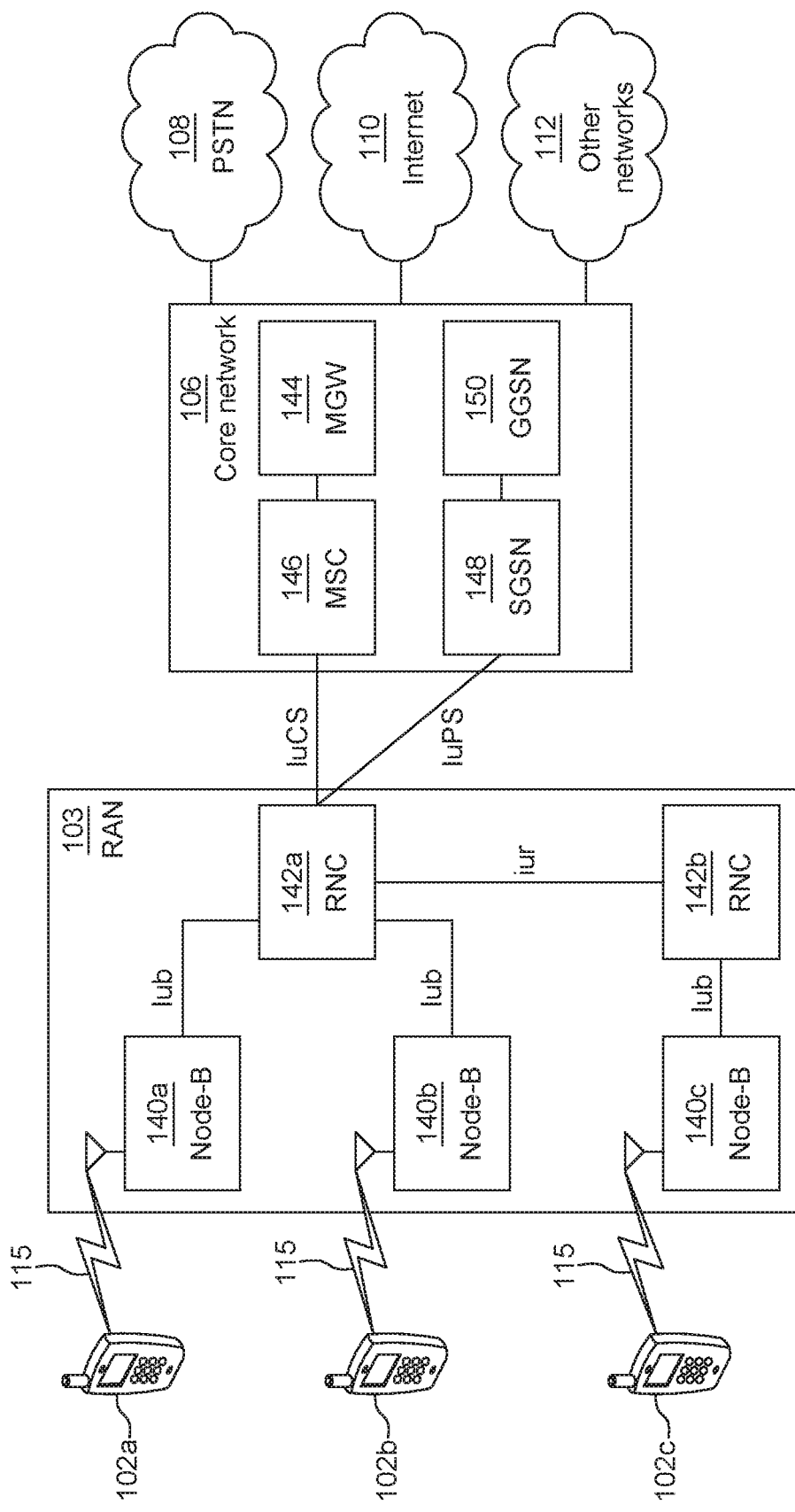
FIG. 1B is a system diagram that shows an example of a Radio Access Network (RAN) architecture and a core network architecture.

FIG. 1B is a system diagram of an example RAN 103 and core network 106. As noted above, the RAN 103 may employ a UTRA radio technology to communicate with the WTRUs 102a, 102b, and 102c over the air interface 115. The RAN 103 may also be in communication with the core network 106. As shown in FIG. 1B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 1B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 1B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 1C:
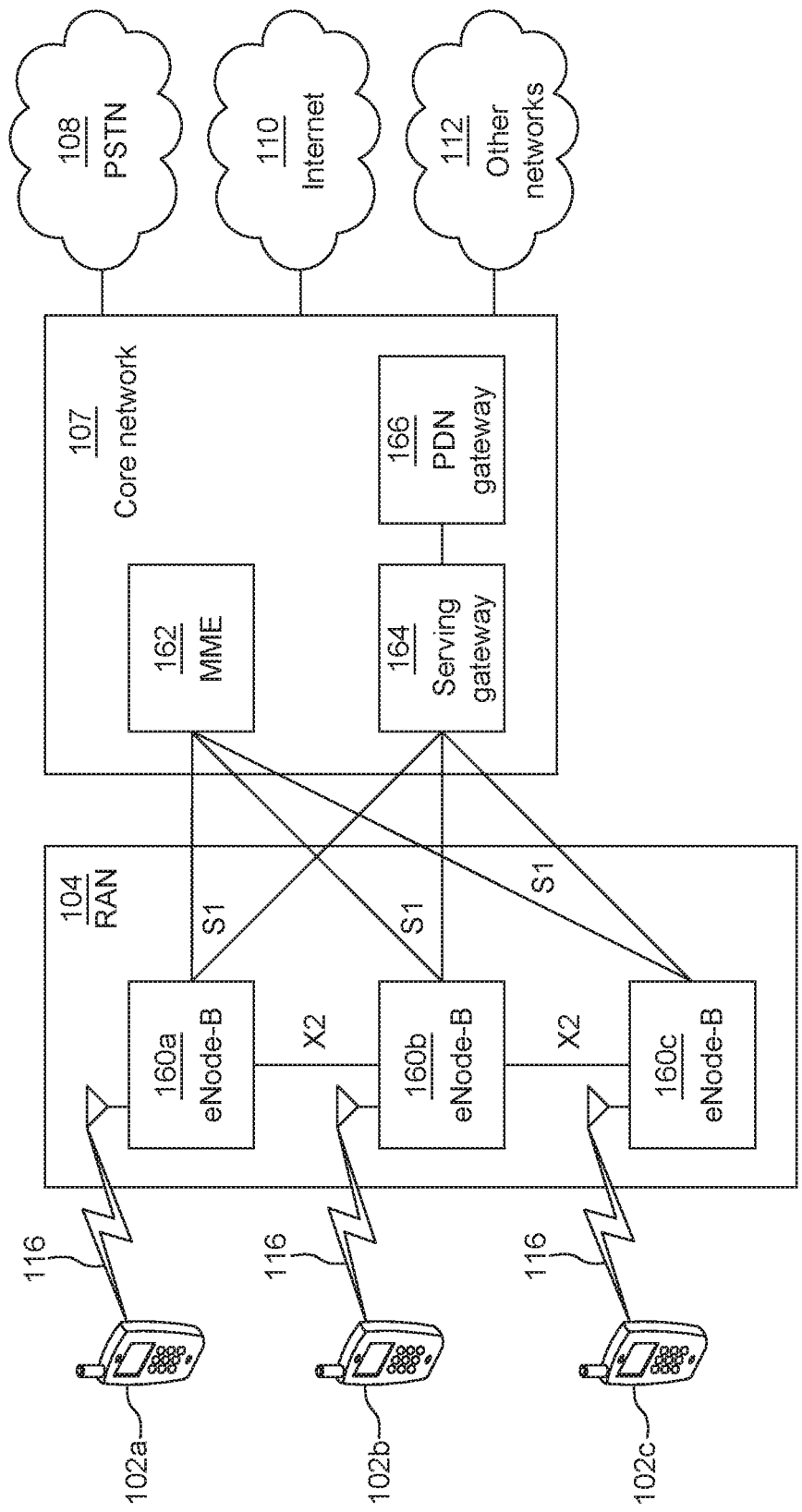
FIG. 1C is a system diagram that shows an example of a Radio Access Network (RAN) architecture and a core network architecture.

FIG. 1C is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1C, the eNode-Bs 160a, 160b, and 160c may communicate with one another over an X2 interface.

The core network 107 shown in FIG. 1C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an Si interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the Si interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 1D:
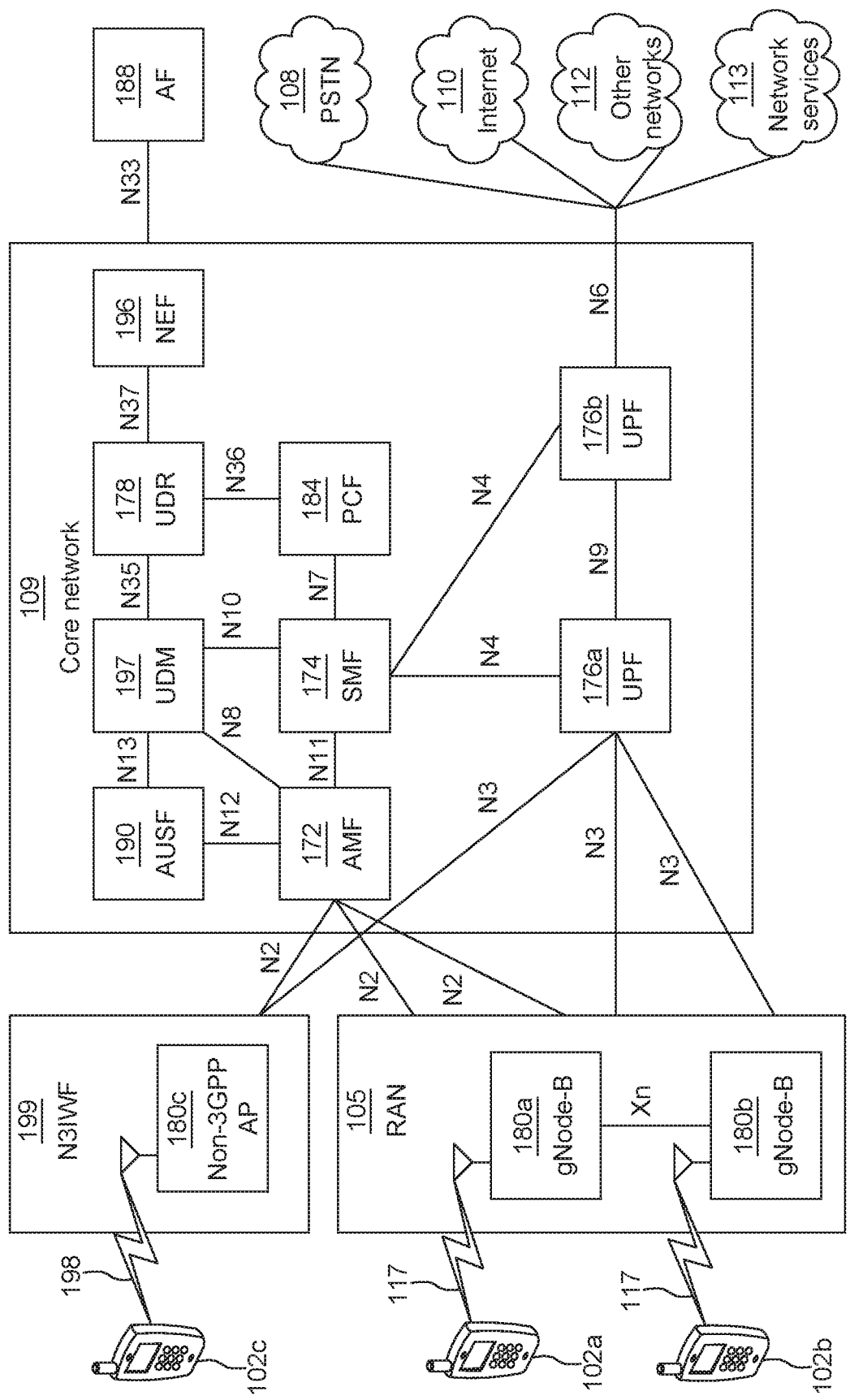
FIG. 1D is a system diagram that shows an example of a Radio Access Network (RAN) architecture and a core network architecture.

FIG. 1D is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 1D, the gNode-Bs 180a and 180b may communicate with one another over an Xn interface, for example.

The core network 109 shown in FIG. 1D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in FIG. 1G.

In the example of FIG. 1D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 1D shows that network functions directly connect to one another, however, it should be appreciated that they may communicate via routing agents such as a diameter routing agent or message buses.

In the example of FIG. 1D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible for forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 1D.

The SMF 174 may be connected to the AMF 172 via an N11 interface. Similarly, the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible for packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 1D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 1D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned and/or operated by other service providers.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1E:
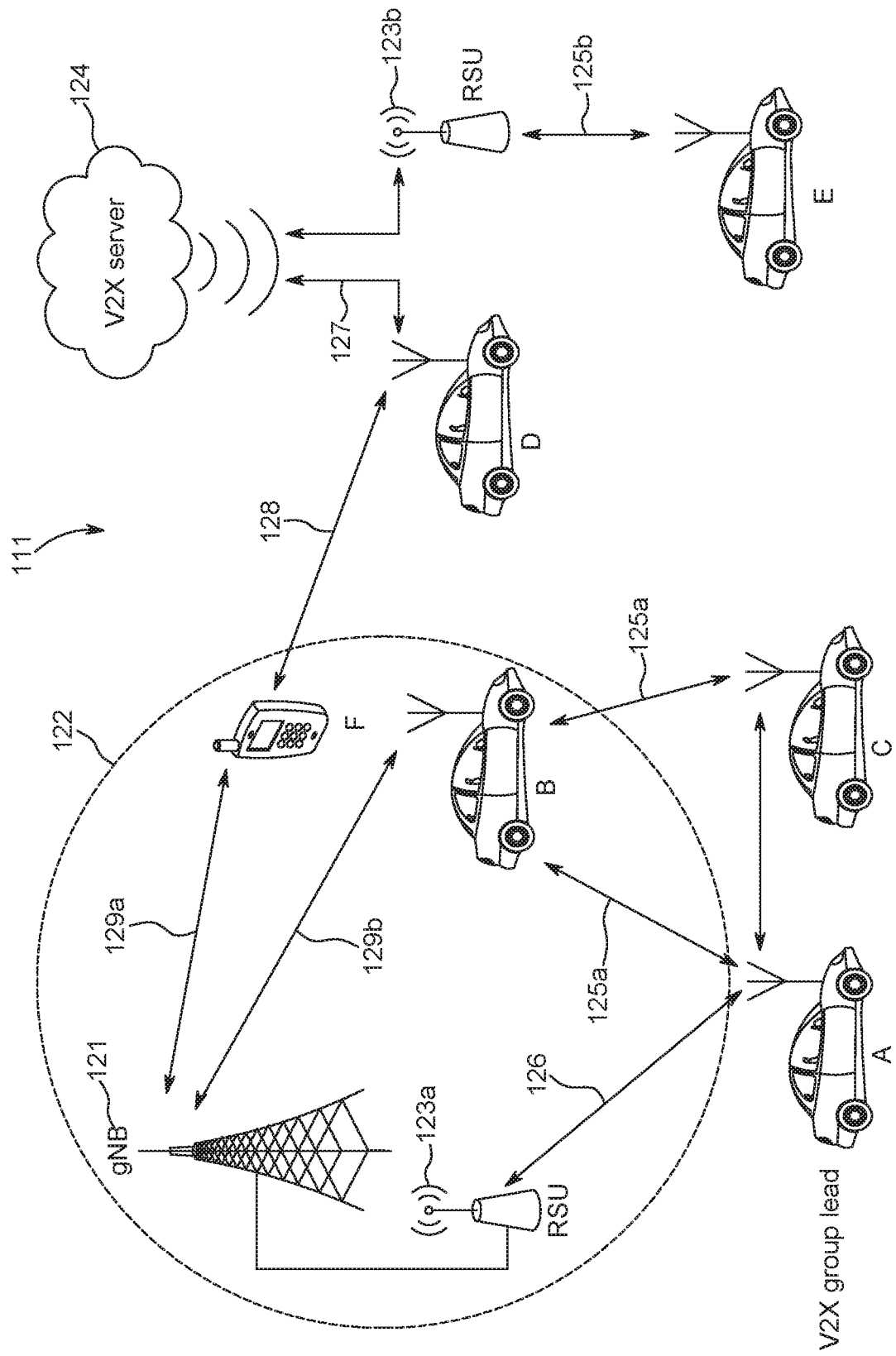
FIG. 1E is a system diagram that shows an example 3GPP architecture.

FIG. 1E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, and/or other network elements. One or several or all WTRUs A, B, C, D, E, and F may be out of range of the access network coverage 122. WTRUs A, B, and C form a V2X group, among which WTRU A is the group lead and WTRUs B and C are group members.

WTRUs A, B, C, D, E, F may communicate with each other over a Uu interface 129b via the gNB 121 if they are under the access network coverage (only B and F are shown under the network coverage in FIG. 1E). WTRUs A, B, C, D, E, F may communicate with each other directly via a Sidelink (PC5 or NR PC5) interface 125a, 125b, 128, if they are under or out of the access network coverage (e.g., A, C, WTRUs A, B, C, D, E, F may communicate with each other D and E are shown out of the network coverage in FIG. 1E).

WTRUs A, B, C, D, E, and F may communicate with RSU 123a or 123b via a Vehicle-to-Network (V2N) 126 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 1F:
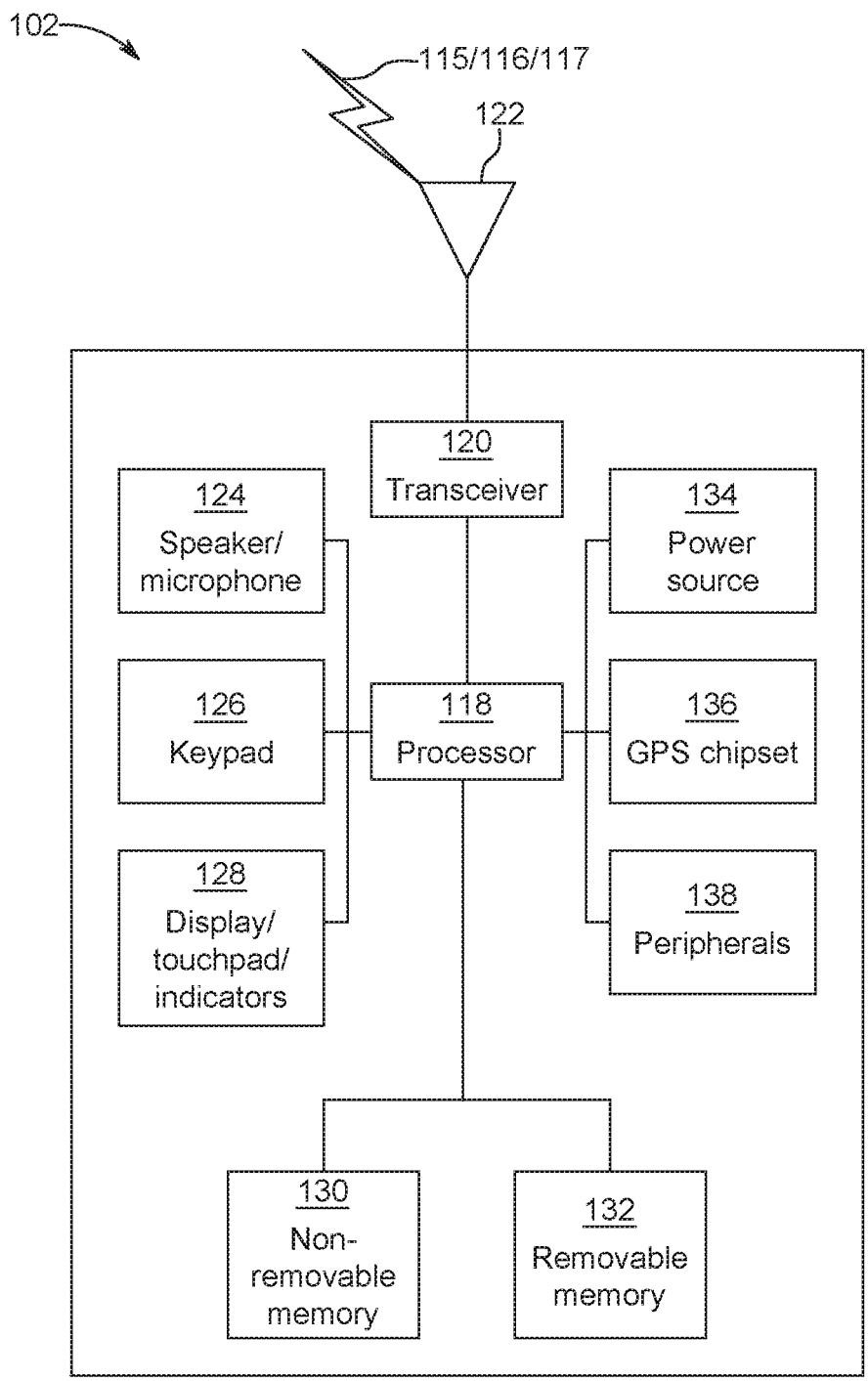
FIG. 1F is a system diagram of an example apparatus or device configured for wireless communications.

FIG. 1F is a block diagram of an example apparatus or device WTRU 102 that may be configured for wireless communications and operations in accordance with the systems, methods, and apparatuses described herein, such as a WTRU 102 of FIG. 1A, 1B, 1C, 1D, or 1E. As shown in FIG. 1F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 1F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 1A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 1F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 1G:
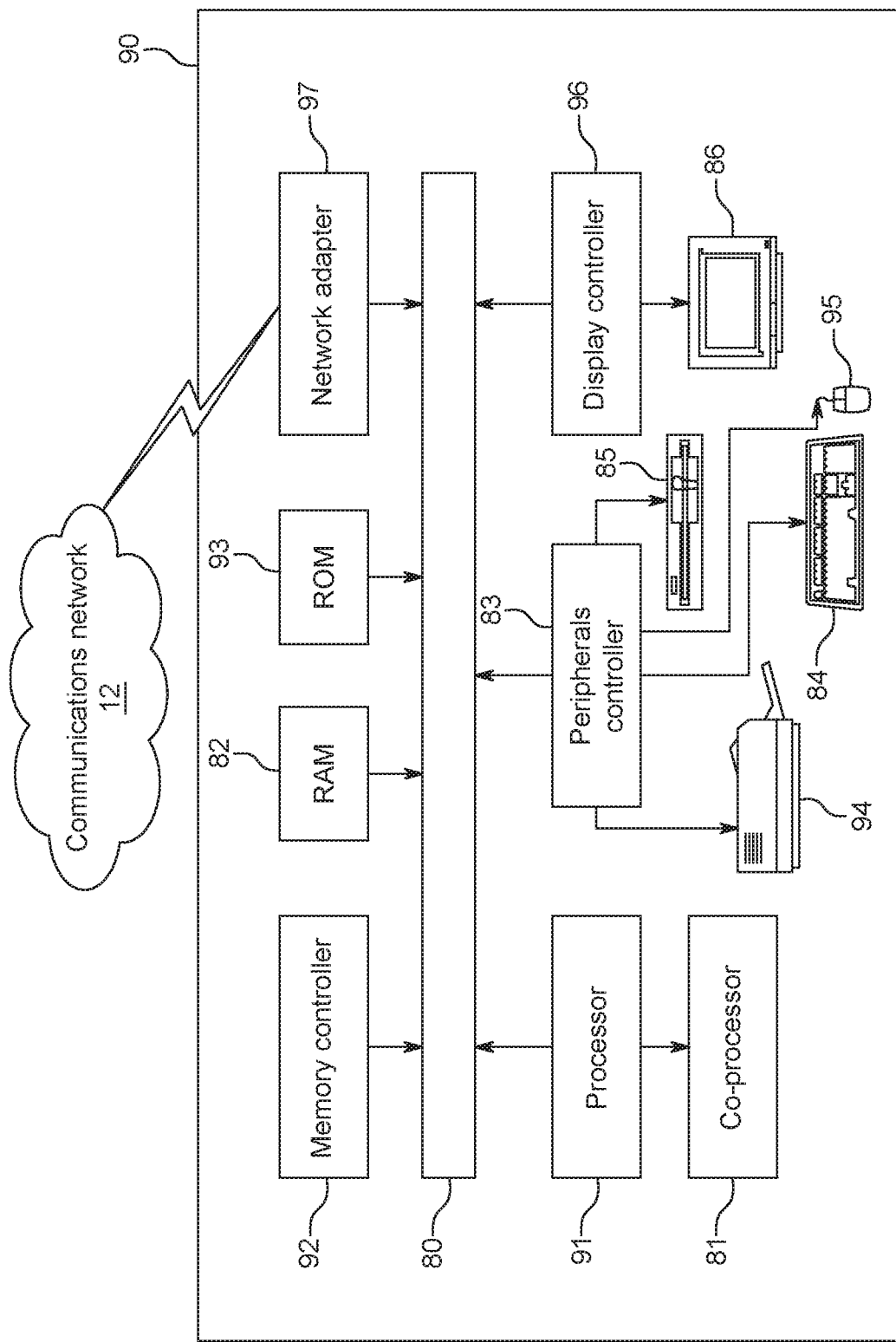
FIG. 1G is a system diagram that shows an example of a computing system used in a communication network.

FIG. 1G is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

Asset tracking use cases require UEs to operate worldwide and be reachable throughout its transport to provide tracking management of the underlying assets. These UEs can be attached to shipping containers and are expected to operate for lifetimes of 10 to 15 years. The UEs can be devices with fixed batteries so efficient power consumption is a critical requirement. Due to mobility and poor signal strengths, the containers may not always have connectivity to the core network. As a result, asset tracking UEs may need to depend on other UEs to relay and aggregate its data to the core network to optimize power consumption.

This disclosure proposes the following mechanisms to address the requirements of asset tracking UEs:
 UEs provide a capability indication to the core network to indicate the support of relay aggregation. The core network then provisions relay UEs with data aggregation parameters used to aggregate and relay UE data.
 Relay UEs provide indication to core network to create Shared PDU Sessions for sending aggregated data on the user plane. In turn, core network configures UPF and RAN node to allocate resources for tunneling data through the shared PDU session.
 Relay UEs utilize data aggregation parameters to make determination on whether to aggregate data from other UEs. Relay UEs can also wait for a specified aggregation period to allow other UEs to send its data.
 Relay UE aggregates data from other UEs and sends them on the shared PDU sessions. RAN node and UPF(s) route data on shared PDU session to one or more PSA UPFs.
 UPF supports aggregating DL data from one or more PSA UPFs and sends aggregated data to relay UEs.
 Relay UE and RAN node communicate with each other for RAN node to efficiently allocate radio resources for UE to send delay tolerant data to core network.

5G Cellular Network

Figure 2:
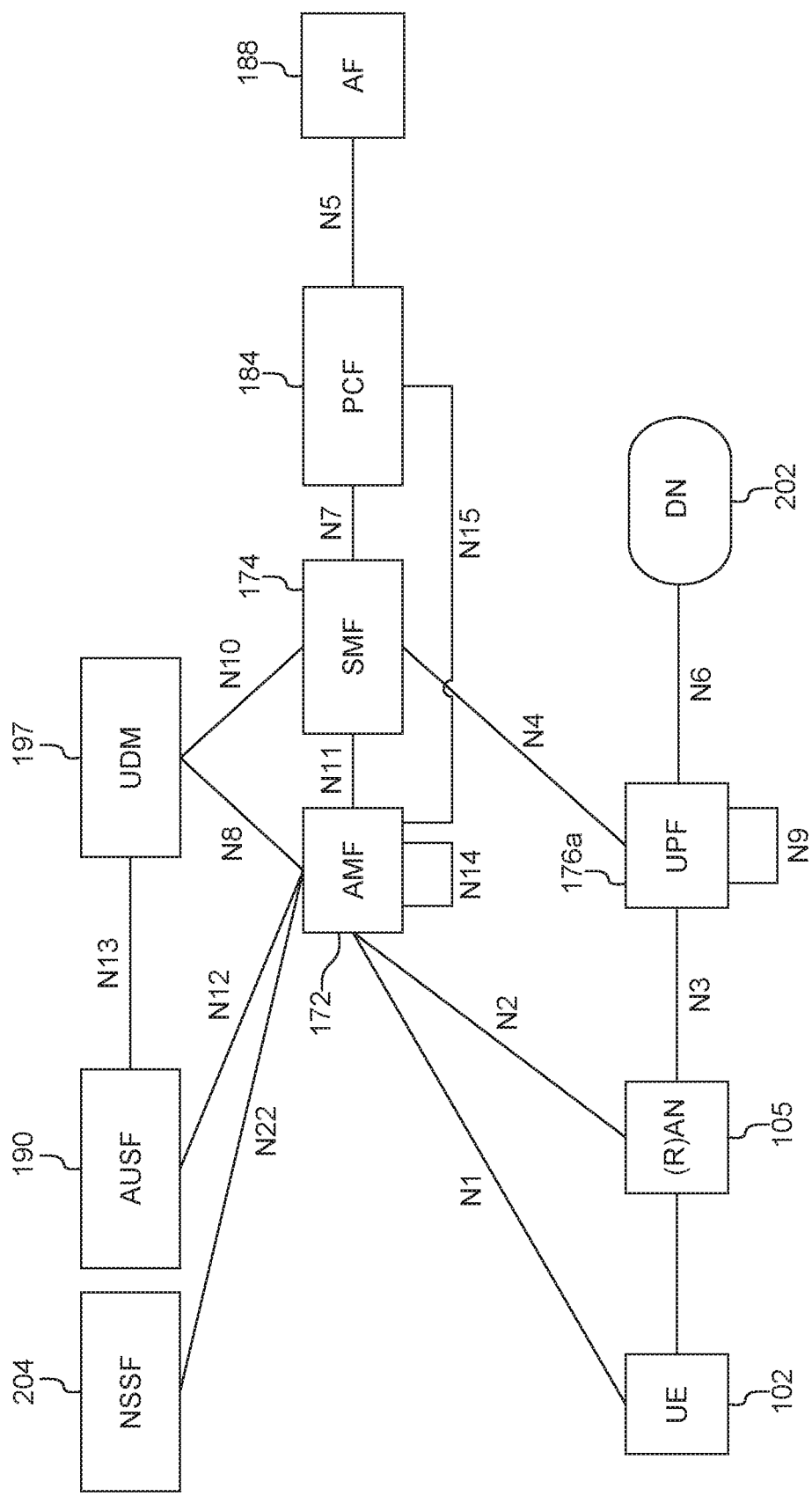
FIG. 2 shows a non-roaming 5G system architecture in accordance with an exemplary embodiment.

FIG. 2 shows the 3GPP 5G non-roaming system architecture where various entities interact with each other over the indicated reference points. A User Equipment (UE) device 102 may send and receive data to and from a Data Network (DN) 202 such as the internet through the Radio Access Network (RAN) 105 and the User Plane Function (UPF) entities 176a. This data path is referred to as the 5G User Plane (UP).

Data traffic from the UE 102 is sent on PDU sessions that are created in the core network. The following network functions play a role in the PDU session management within the core network 106/107/109. FIG. 2 also includes Network Slice Selection Function (NSSF) 204.
 Access and Mobility Function (AMF) 172: The UE 102 sends an N1 message through the RAN node 105 to the AMF 172 to initially establish a PDU session in the core network. The AMF 172 selects an appropriate SMF 174 to process the PDU Session Establishment request.
 Session Management Function (SMF) 174: The SMF 174 is responsible for creating PDU sessions and can contact the UDM 197 for subscription information and PCF 184 for policy information to use in processing the PDU Session Establishment request. The SMF 174 can also communicate with the UPF 176a and the RAN node 105 to establishment tunneling information that will be used to route data from the UE 102 to the DN 202 and from the DN 202 back to the UE 102.
 Policy and Control Function (PCF) 184: The PCF 184 makes authorization and policy decisions for establishing the PDU session.
 User Plane Function (UPF) 176a: The UPF 176a allocates resources in the user plane to allow data traffic to flow from the UE 102 to the DN 202 and from the DN 202 back to the UE 102. One or more UPFs 176a, 176b, 176c, etc. in the core network can be utilized to route the data.
 Radio Access Network (RAN) 105: The RAN node 105 offers communication access from the UE 102 to the core network for both control plane and user plane traffic.

PDU Session Management in 5GC

Figure 3A:
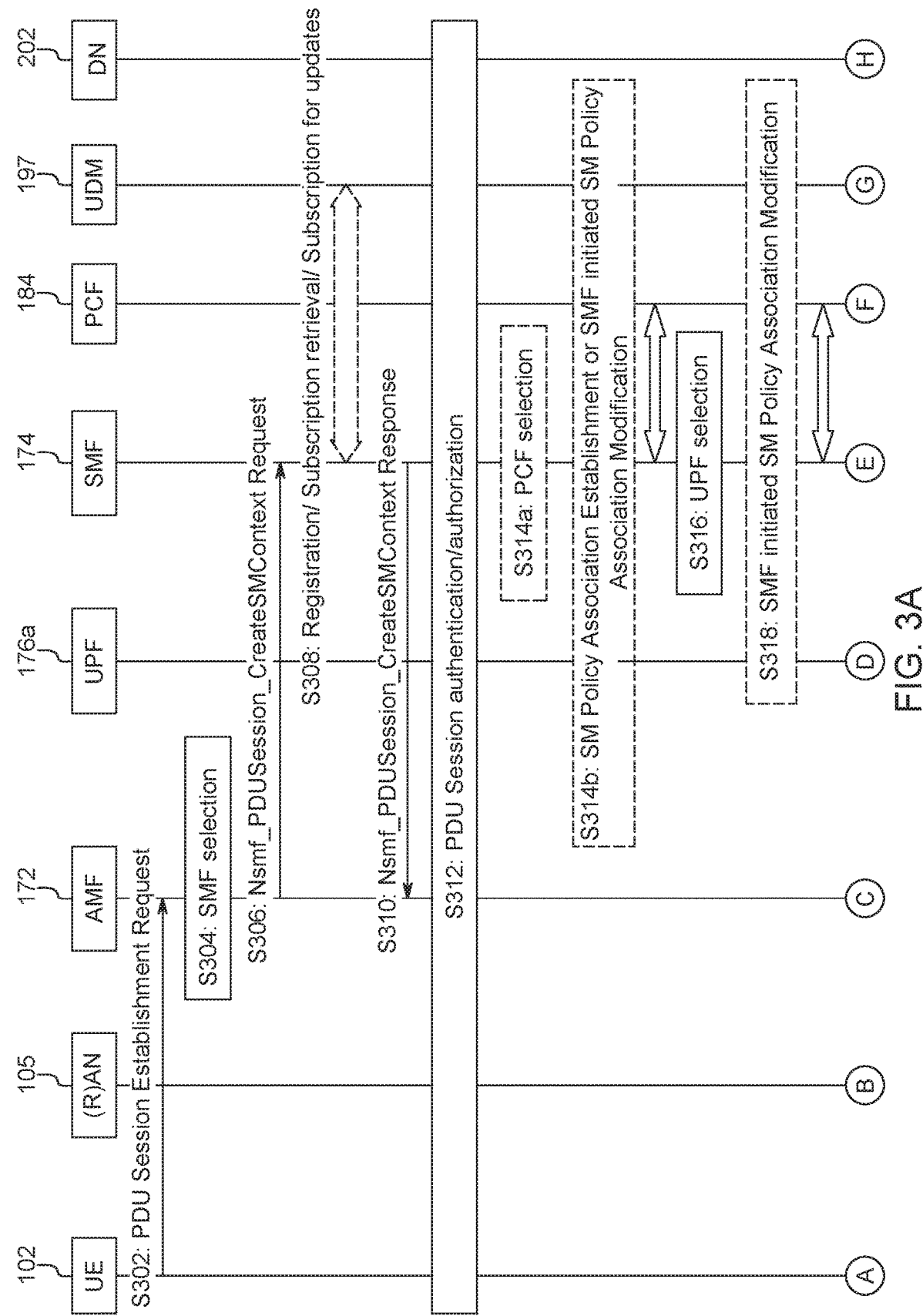
FIG. 3A. shows a UE requested PDU session establishment procedure in accordance with an exemplary embodiment.
Figure 3B:
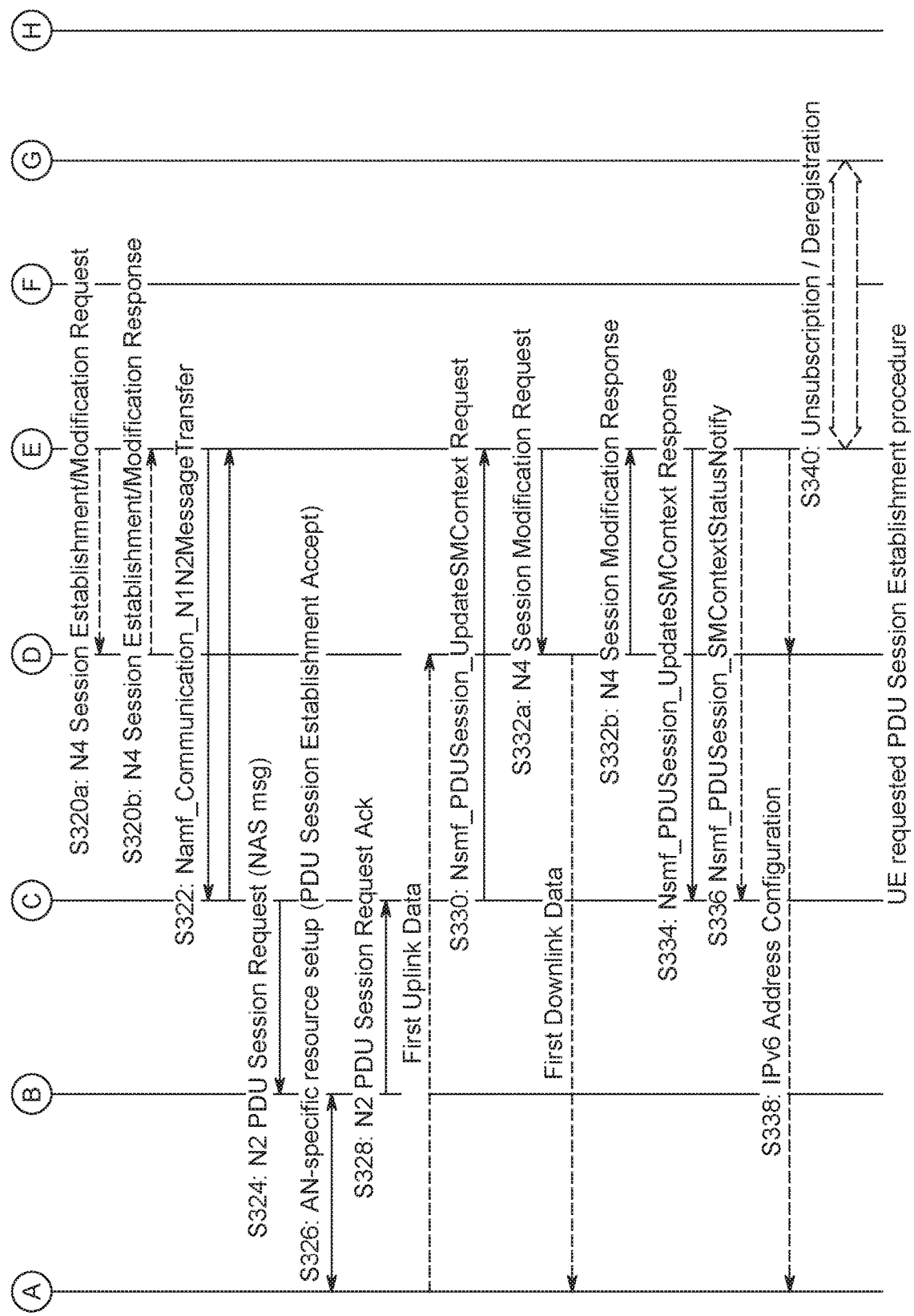
FIG. 3B. shows a UE requested PDU session establishment procedure in accordance with an exemplary embodiment.

Prior to sending or receiving data, a UE 102 must set up a Protocol Data Unit (PDU) Session with the Session Management Function (SMF) 174 using the PDU Session Establishment procedure as shown in FIGS. 3A and 3B. This procedure establishes a PDU session for the UE 102 and the SMF 174 configures the UPF 176a and RAN node 105 to route traffic between the UE 102 and the DN 202. The UE 102 then sends and receives data using this PDU session and the RAN node 105 and the UPF 176a assist in forwarding the data to and from the DN 202. Each UE 102 needs to establish its own PDU session in order to send and receive data to and from a DN 202. A brief description of the procedure is provided below and the detailed description of the procedure can be found in TS 23.502 (3GPP TS 23.502, Procedures for the 5G System; V15.4.1 (2019 January)), incorporated herein by reference.
 Step S302: The UE 102 sends a PDU Session Establishment request on top of a NAS message through the RAN node 105 to the AMF 172. In the request, the UE 102 includes a PDU Session ID and other session parameters such as PDU Session Type, Request Type, requested SSC mode, DNN, etc.
 Steps S302, S306, S308, and S310: The AMF 172 forwards the request to the SMF 174, which get session management subscription data from the UDM 197 and checks if the UE 102 is allowed to create the PDU session. The SMF 174 replies to the AMF 172 with the results of the request.
 Steps S312, S314a, S314b, S316, and S318: An optional secondary authorization/authentication can be performed in step S312 while the SMF 174 can obtain policy information from the PCF 184 in steps S314*a* and S314*b*. Then the SMF 174 can select user plane resources in step S316 and generate an IP address/prefix that is provided to the PCF 184 in step S318.

Steps S320*a* and 320*b*: The SMF 174 establishes user plane resources on the selected UPF 176*a* with rules and parameters to use for the PDU session.

Step S322: The SMF 174 sends information about the PDU session to AMF 172 including N2 and N1 information to be returned to the RAN 105 and UE 102, respectively.

Steps S324, S326, and S328: The AMF 172 returns the N2 and N1 information to RAN 105 and UE 102, and RAN 105 acknowledges AMF 172 with AN N3 tunnel information to UPF 176*a*. Uplink data can now be sent from the UE 102, through the RAN 105, and to the UPF 176*a* to the DN 202.

Steps S330, S332*a*, and S332*b*: The AMF 172 forwards the AN N3 tunnel information to the SMF 174, which then informs the UPF 176*a* of such information as well as corresponding forwarding rules. After this point, the UPF 176*a* can then send downlink data to the UE 102 through the RAN 105.

In step S334, the AMF 172 receives an Nsmf_PDUSession_UpdateSMContext Response. In step S336, the AMF 172 receives an Nsmf_PDUSession_SMContextStatusNotify. In step S338, IPv6 address configuration occurs. In step S340, unsubscription/deregistration is performed.

PDU Session related information as shown in Table 1 are maintained by the PCF and can be sent to a UE during registration procedure. According to TS 23.503 (3GPP TS 23.503, Policy and Charging Control Framework for the 5G System; V15.4.0 (2018 December)), incorporated herein by reference, "the purpose of the PDU Session related policy information is to provide policy and charging control related information that is applicable to a single Monitoring key or the whole PDU Session respectively."

TABLE 1

PDU Session related policy information

| Attribute | Description | PCF permitted to modify for dynamically provided information | Scope | Differences compared with table 6.4. and 6.6 in TS 23.203 |
|---|---|---|---|---|
| Charging information | Defines the containing CHF address. | No | PDU Session | None |
| Default charging method | Defines the default charging method for the PDU Session. | No | PDU Session | None |
| Policy control request trigger | Defines the event(s) that shall cause a re-request of PCC rules for the PDU Session. | Yes | PDU Session | Explicitly subscribed by invoking Npcf_SMPolicy Control service operation |
| Authorized QoS per bearer (UE-initiated IP-CAN bearer activation/modification) | Defines the authorised QoS for the IP-CAN bearer (QCI, GBR, MBR). | Yes | IP-CAN bearer | Removed |
| Authorized MBR per QCI (network initiated IP-CAN bearer activation/modification) | Defines the authorised MBR per QCI. | Yes | IP-CAN session | Removed |
| Revalidation time limit | Defines the time period within which the SMF shall perform a PCC rules request. | Yes | PDU Session | None |
| PRA Identifier(s) | Defines the Presence Reporting Area(s) to monitor for the UE with respect to entering/leaving | Yes | PDU Session | None but only applicable to PCF |
| List(s) of Presence Reporting Area elements | Defines the elements of the Presence Reporting Area(s) | Yes | PDU Session | None but only applicable to PCF |
| Default NBIFOM access | The access to be used for all traffic that docs not match any existing Routing Rule | Yes (only at the addition of an access to the IP-CAN session) | IP-CAN session | Removed |
| IP Index (NOTE 11) | Provided to SMF to assist in determining the IP Address allocation method (e.g. which IP pool to assign from) when a PDU Session requires an IP address - as defined | No | PDU Session | Added |

TABLE 1-continued

PDU Session related policy information

| Attribute | Description | PCF permitted to modify for dynamically provided information | Scope | Differences compared with table 6.4. and 6.6 in TS 23.203 |
|---|---|---|---|---|
| | in TS 23.501 [2] clause 5.8.2.2.1. | | | |
| Explicitly signalled QoS Characteristics (NOTE 1) | Defines a dynamically assigned 5QI value (from the non-standardized value range) and the associated 5G QoS characteristics as defined in TS 23.501 [2] clause 5.7.3. | No | PDU Session | Added |
| Reflective QoS Timer | Defines the lifetime of a UE derived QoS rule belonging to the PDU Session. | No | PDU Session | Added |
| Authorized Session-AMBR (NOTE 2) (NOTE 3) | Defines the Aggregate Maximum Bit Rate for the Non-GBR QoS Flows of the PDU Session. | Yes | PDU Session | Modified |
| Authorized default 5QI/ARP (NOTE 3) (NOTE 10) | Defines the default 5QI and ARP of the QoS Flow associated with the default QoS rule. | Yes | PDU Session | Modified |
| Time Condition (NOTE 4) | Defines the time at which the corresponding Subsequent Authorized Session-AMBR or Subsequent Authorized default 5QI/ARP shall be applied. | No (NOTE 5) | PDU Session | Modified |
| Subsequent Authorized Session-AMBR (NOTE 4) (NOTE 2) | Defines the Aggregate Maximum Bit Rate for the Non-GBR QoS Flows of the PDU Session when the Time Condition is reached. | No (NOTE 5) | PDU Session | Modified |
| Subsequent Authorized default 5QI/ARP (NOTE 4) (NOTE 10) | Defines the default 5QI and ARP when the Time Condition is reached. | No (NOTE 5) | PDU Session | Modified |
| Usage Monitoring Control related information | Defines the information that is required to enable user plane monitoring of resources for individual applications/services, groups of applications/services, for a PDU Session. | | | |
| Monitoring key | The PCF uses the monitoring key to group services that share a common allowed usage. | No | PDU Session | None |
| Volume threshold (NOTE 7) | Defines the traffic volume value after which the SMF shall report usage to the PCF for this monitoring key. | Yes | Monitoring key | None |
| Time threshold (NOTE 7) | Defines the resource time usage after which the SMF shall report usage to the PCF. | Yes | Monitoring key | None |
| Monitoring time | Defines the time at which the SMF shall reapply the Volume and/or Time Threshold. | No (NOTE 6) | Monitoring Key | None |
| Subsequent Volume threshold (NOTE 9) | Defines the traffic volume value after which the SMF shall report usage to the PCF for this | No (NOTE 6) | Monitoring Key | None |

TABLE 1-continued

PDU Session related policy information

| Attribute | Description | PCF permitted to modify for dynamically provided information | Scope | Differences compared with table 6.4. and 6.6 in TS 23.203 |
|---|---|---|---|---|
| Subsequent Time threshold (NOTE 9) | Monitoring key for the period after the Monitoring time. Defines resource time usage after which the SMF shall report usage to the PCF for this Monitoring key for the period after the Monitoring time. | No (NOTE 6) | Monitoring Key | None |
| Inactivity Detection Time (NOTE 8) | Defines the period of time after which the time measurement shall stop, if no packets are received. | Yes | Monitoring Key | None |

(NOTE 1):
Multiple Non-standardized QoS Characteristics can be provided by the PCF. Operator configuration is assumed to ensure that the non-standardized 5QI to QoS characteristic relation is unique within the PLMN.
(NOTE 2):
The Authorized Session-AMBR and the Subsequent Authorized Session-AMBR can be provided together with a list of Access Types possibly complemented by RAT types.
(NOTE 3):
There is always an unconditional value for the Authorized Session-AMBR and Authorized default 5QI/ARP available at the SMF. The initial value is received as Subscribed Session-AMBR/Subscribed default 5QI/ARP, and the PCF can overwrite it with these parameters.
(NOTE 4):
The Time Condition and Subsequent Authorized Session-AMBR/Subsequent Authorized default 5QI/ARP are used together. The PCF can provide up to four instances of them. When multiple instances are provided, the values of the associated Time Condition have to be different.
(NOTE 5):
The PCF can replace all instances that have been provided previously with a new instruction. A previously provided Time Condition and Subsequent Authorized Session-AMBR/Subsequent Authorized default 5QI/ARP pair cannot be individually modified.
(NOTE 6):
The PCF can replace all instances that have been provided previously with a new instruction. A previously provided Volume threshold/Time threshold and Monitoring Time pair cannot be individually modified.
(NOTE 7):
This attribute is also used by the SMF, e.g. during PDU Session termination, to inform the PCF about the resources that have been consumed by the UE.
(NOTE 8):
This attribute is applicable in presence of Time threshold only.
(NOTE 9):
This attribute is applicable in presence of Monitoring Time only.
(NOTE 10):
The Authorized default 5QI and the Subsequent Authorized default 5QI shall be of Non-GBR Resource Type.
(NOTE 11):
This attribute is applicable only when no IP address/Prefix for the PDU session is received from the SMF.

UE Route Selection Policy

The UE Route Selection Policy (URSP) is a policy maintained in the UE 102 that contains a prioritized list of URSP rules. The URSP can be provisioned to a UE 102 by the PCF or it can be pre-provisioned to a UE 102 by an operator. The structure of an URSP rule is shown in Table 2 and Table 3 and includes both a Traffic Descriptor and a list of Route Selection Descriptors (RSD). The UE 102 evaluates the URSP rules according to the Rule Precedence and determines if the information from an application matches the Traffic Descriptor of the URSP rule. If there is a match, the UE 102 selects a Route Selection Descriptor according to the RSD Precedence value and applies it to the application traffic.

TABLE 2

UE Route Selection Policy Rule [0127]

| Information name | Description | Category | PCF permitted to modify in a UE context | Scope |
|---|---|---|---|---|
| Rule Precedence | Determines the order the URSP rule is enforced in the UE. | Mandatory (NOTE 1) | Yes | UE context |
| Traffic descriptor | This part defines the Traffic descriptor components for the URSP rule. | Mandatory (NOTE 3) | | |

TABLE 2-continued

UE Route Selection Policy Rule [0127]

| Information name | Description | Category | PCF permitted to modify in a UE context | Scope |
| --- | --- | --- | --- | --- |
| Application descriptors | It consists of OSId and OSAppId(s). (NOTE 2) | Optional | Yes | UE context |
| IP descriptors (NOTE 5) | Destination IP 3 tuple(s) (IP address or IPv6 network prefix, port number, protocol ID of the protocol above IP). | Optional | Yes | UE context |
| Domain descriptors | Destination FQDN(s) | Optional | Yes | UE context |
| Non-IP descriptors (NOTE 5) | Descriptor(s) for destination information of non-IP traffic | Optional | Yes | UE context |
| DNN | This is matched against the DNN information provided by the application. | Optional | Yes | UE context |
| Connection Capabilities | This is matched against the information provided by a UE application when it requests a network connection with certain capabilities. (NOTE 4) | Optional | Yes | UE context |
| List of Route Selection Descriptors | A list of Route Selection Descriptors. The components of a Route Selection Descriptor are described in table 6.6.2.1-3. | Mandatory | | |

(NOTE 1):
Rules in a URSP shall have different precedence values.
(NOTE 2):
The information is used to identify the Application(s) that is(are) running on the UE's OS.
The OSId does not include an OS version number. The OSAppId does not include a version number for the application.
(NOTE 3):
At least one of the Traffic descriptor components shall be present.
(NOTE 4):
The format and some values of Connection Capabilities, e.g. "ims", "mms", "internet", etc., are defined in TS 24.526 [19]. More than one connection capabilities value can be provided.
(NOTE 5):
A URSP rule cannot contain the combination of the Traffic descriptor components IP descriptors and Non-IP descriptors.

TABLE 3

Route Selection Descriptor [0127]

| Information name | Description | Category | PCF permitted to modify in URSP | Scope |
| --- | --- | --- | --- | --- |
| Route Selection Descriptor Precedence | Determines the order in which the Route Selection Descriptors are to be applied. | Mandatory (NOTE 1) | Yes | UE context |
| Route selection components | This part defines the route selection components | Mandatory (NOTE 2) | | |
| SSC Mode Selection | One single value of SSC mode. (NOTE 5) | Optional | Yes | UE context |
| Network Slice Selection | Either a single value or a list of values of S-NSSAI(s). | Optional (NOTE 3) | Yes | UE context |
| DNN Selection | Either a single value or a list of values of DNN(s). | Optional | Yes | UE context |
| PDU Session Type Selection | One single value of PDU Session Type | Optional | Yes | UE context |
| Non-Seamless Offload indication | Indicates if the traffic of the matching application is to be offloaded to non-3GPP access outside of a PDU Session. | Optional (NOTE 4) | Yes | UE context |

TABLE 3-continued

Route Selection Descriptor [0127]

| Information name | Description | Category | PCF permitted to modify in URSP | Scope |
|---|---|---|---|---|
| Access Type preference | Indicates the preferred Access Type (3GPP or non-3GPP) when the UE establishes a PDU Session for the matching application. | Optional | Yes | UE context |

(NOTE 1):
Every Route Selection Descriptor in the list shall have a different precedence value.
(NOTE 2):
At least one of the route selection components shall be present.
(NOTE 3):
When the Subscription Information contains only one S-NSSAI in UDR, the PCF needs not provision the UE with S-NSSAI in the Network Slice Selection information. The "match all" URSP rule has one S-NSSAI at most.
(NOTE 4):
If this indication is present in a Route Selection Descriptor, no other components shall be included in the Route Selection Descriptor.
(NOTE 5):
The SSC Mode 3 shall only be used when the PDU Session Type is IP.

Single PDU Session with Multiple PDU Session Anchors

A single PDU session can incorporate multiple UPFs 176 within its data path to support selective traffic routing or Session and Service Continuity (SSC) Mode 3 operations. During these scenarios, the UPFs 176 that interfaces to DNs 202 are termed PDU Session Anchors or PSAs. Another UPF 176 then routes traffic to and from each of the PSAs and serves as the central controller directing traffic between the PSAs and the UE 102. This UPF 176 is termed either the Uplink Classifier (UL CL) UPF or the Branching Point (BP) UPF depending on how the UPF was established. The UL CL UPF is established to divert traffic that matches traffic filters provided by the SMF 174 while the BP UPF is established in support of IPv6 multi-homing cases.

Figure 4:
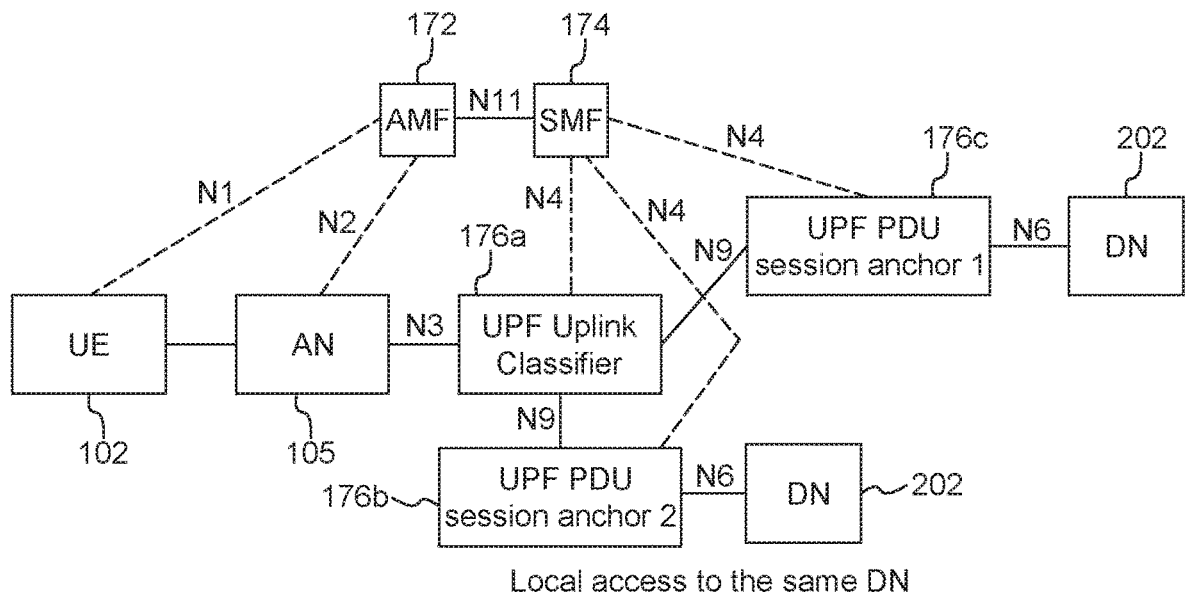
FIG. 4 shows a user plane architecture for the uplink classifier in accordance with an exemplary embodiment.

FIG. 4 shows the user plane architecture for the Uplink Classifier case. An UL CL UPF 176a can interface to multiple PSAs 176b, 176c to direct traffic between the UE 102 and the DN 202. The UL CL UPF 176a is established by the SMF 174 using operator policies and the UE 102 is unaware of such establishment.

Figure 5:
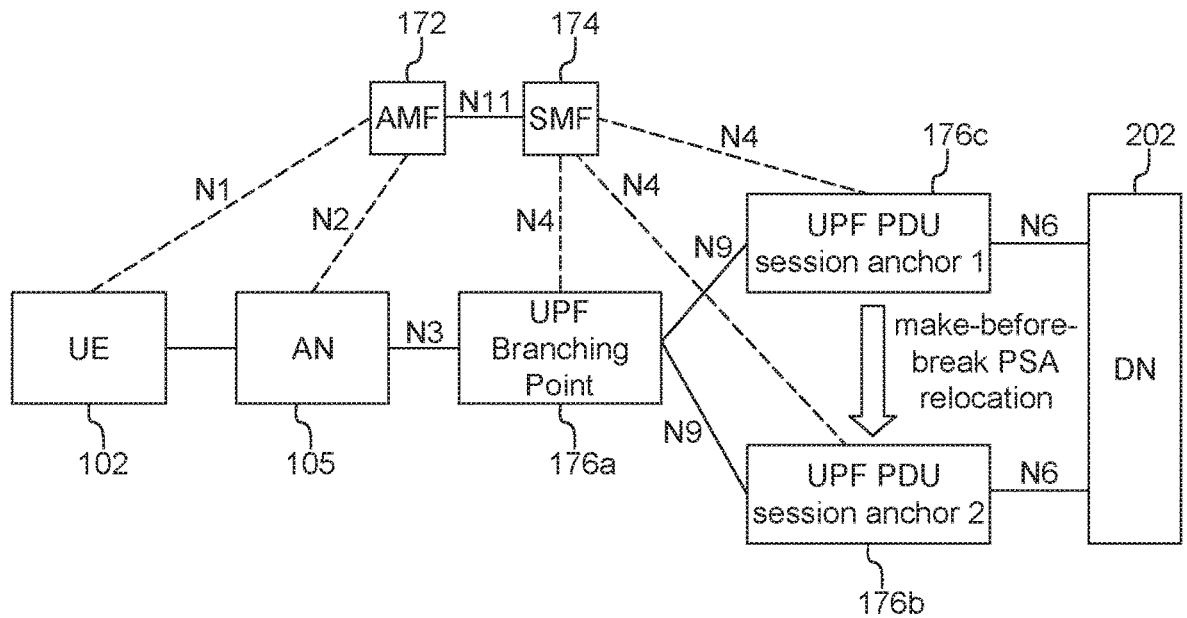
FIG. 5 shows a multi-homed PDU session in accordance with an exemplary embodiment.

The Branching Point UPF 176a architecture shown in FIG. 5 offers similar functionality to UL CL UPFs but only applies to IPv6 multi-homed cases. However, unlike the Uplink Classifier case, the UE 102 is involved with the establishment of the BP UPF 176a by providing an indication of its support for Multi-homed IPv6 PDU Session. The BP UPF 176a then spreads the UL traffic from the UE 102 to the appropriate PSAs 176b, 176c based on the source prefix included in the PDU. The UE 102 selects this source prefix based on routing information and preferences received from the network.

Figure 6A:
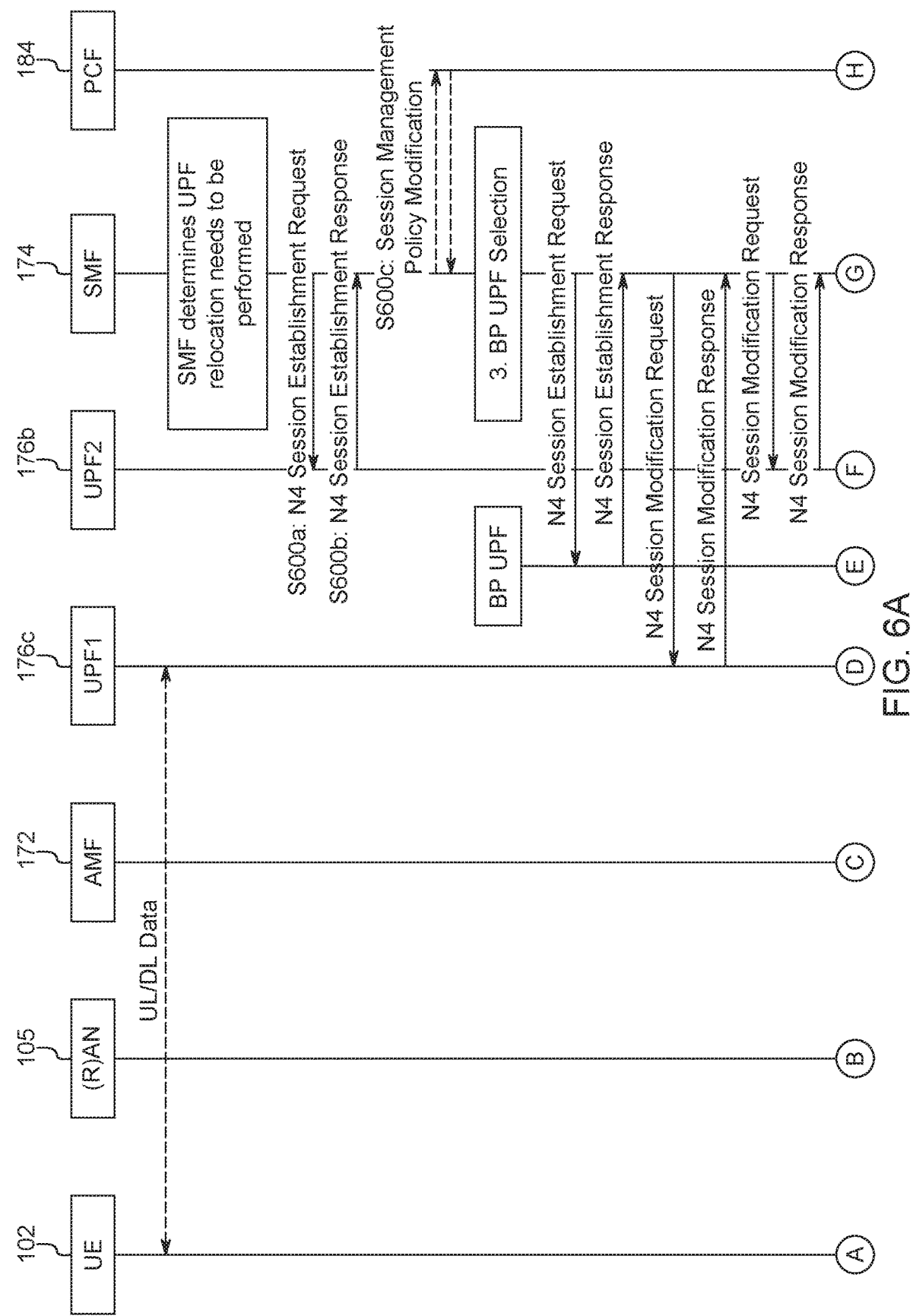
FIG. 6A shows a change of a PDU session anchor with an IPv6 multi-homed PDU session in accordance with an exemplary embodiment.
Figure 6B:
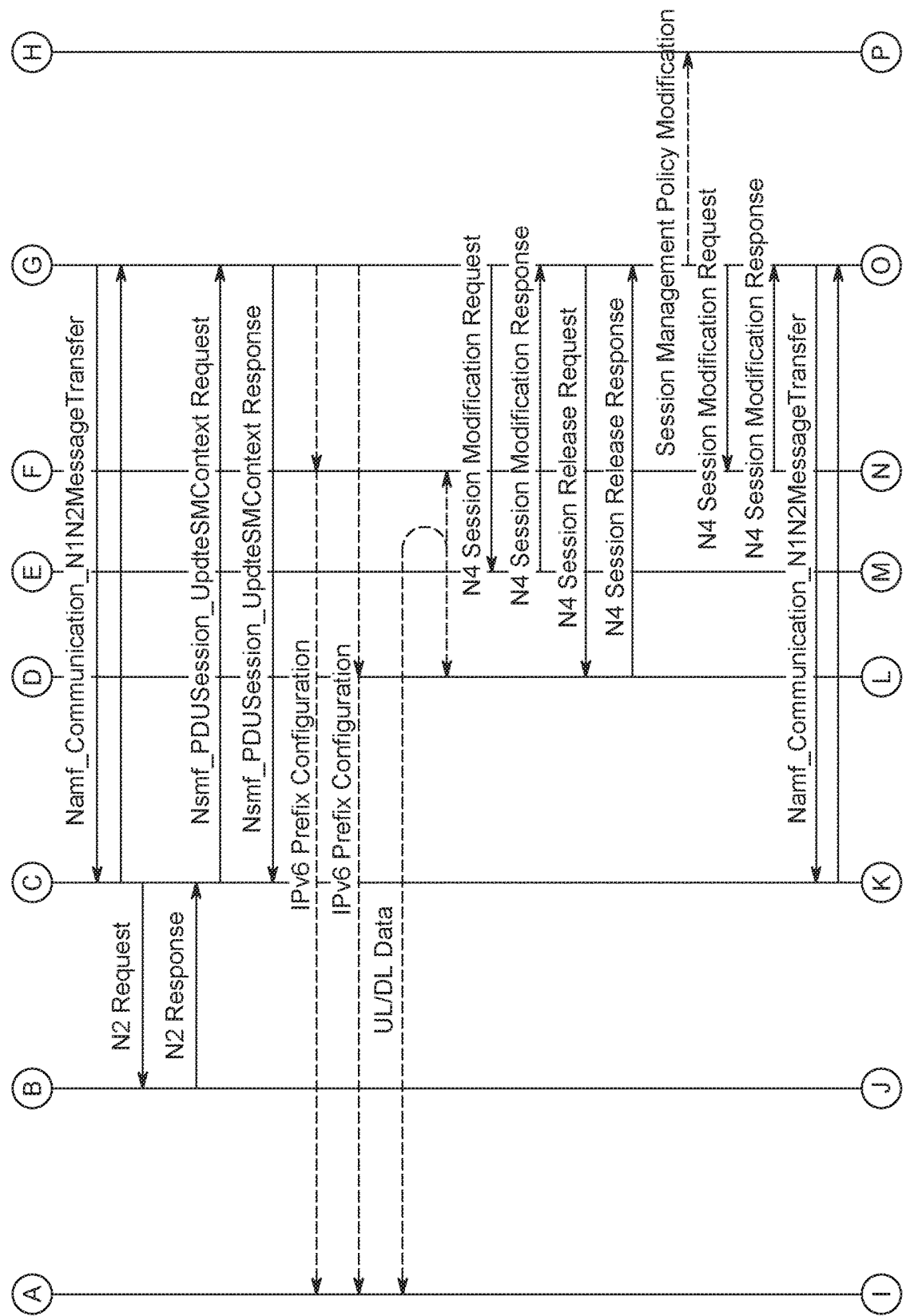
FIG. 6B shows a change of a PDU session anchor with an IPv6 multi-homed PDU session in accordance with an exemplary embodiment.
Figure 6C:
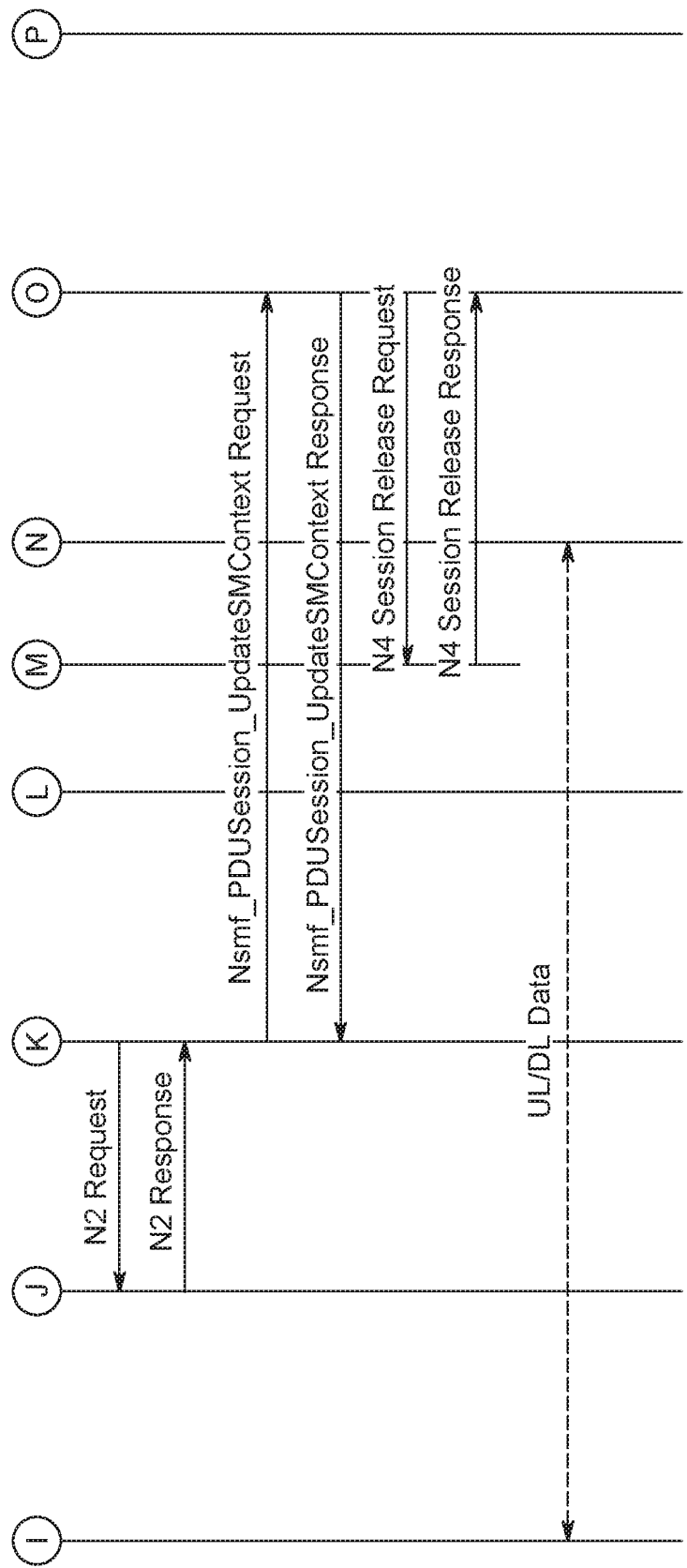
FIG. 6C shows a change of a PDU session anchor with an IPv6 multi-homed PDU session in accordance with an exemplary embodiment.

In the case of a change to the Service and Session Continuity (SSC) Mode 3 for IPv6 Multi-homed PDU Session, a BP UPF can be created to relocate the UPF in order to provide service continuity for the UE 102. FIGS. 6A, 6B, and 6C show the procedure in which the SMF 174 initiates the relocation of a UPF for SSC Mode 3 operation. The entire description can be found in 3GPP TS 23.502, Procedures for the 5G System; V15.4.1 (2019 January), incorporated herein by reference, and the following only summarizes the main steps with concerns to the establishment of the BP UPF. The UE 102 had previously established a PDU session with UPF1 and the SMF 174 determines in steps S600a, S600b, and S600c to reallocate from UPF1 176c to UPF2 176b to preserve service continuity. The SMF 174 first establishes UPF2 176b and then creates a BP UPF. Once the BP UPF is established, the SMF 174 informs UPF1 176c, UPF2 176b, and RAN 105 (through AMF 172) of the BP UPF. Finally, the UE 102 is informed of the new IPv6 prefix to use, which will route traffic to UPF2 176b. Afterwards, the SMF 174 can release resource allocations in both UPF1 176c and the BP UPF.

Figure 7:
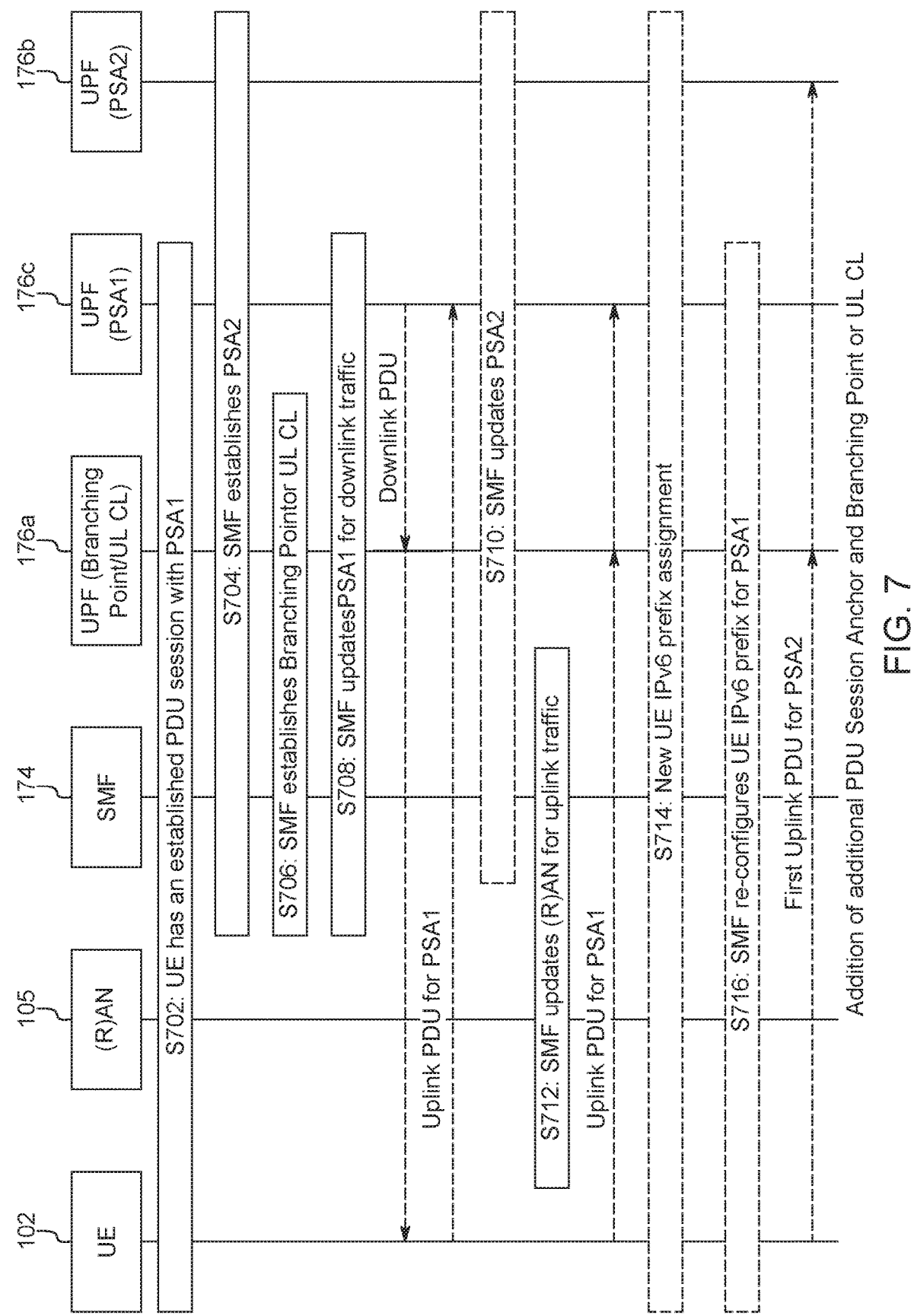
FIG. 7 shows the addition of additional PDU session anchors and branching points in accordance with an exemplary embodiment.

Once a PDU session has been established, a BP or UL CL UPF and additional PSAs can be added to the PDU session. FIG. 7 shows the procedure to perform the aforementioned operation. Provided herein is a summary of the procedure and the detailed description is found in 3GPP TS 23.502, Procedures for the 5G System; V15.4.1 (2019 January), incorporated herein by reference. At the beginning of the procedure (S702), a UE 102 has established a PDU session with PSA1 176c. In step S704, the SMF 174 decides to establish a new PSA (PSA2 176b) possibly due to UE mobility or based on the detection of a new flow. In step S706, the SMF 174 then establishes either a BP or UL CL UPF and provides it with information to communicate with both PSA1 176c and PSA2 176b. Next, in steps S708, S710, S712, the SMF 174 updates PSA1 176c, PSA2 176b, and RAN 105 with information to communicate to the BP or UL CL UPF 176a. If IPv6 multi-homing is enabled, then the SMF 174 notifies the UE 102 of the new IPv6 prefix for PSA2 176b and can reconfigure the UE 102 of the original IPv6 prefix for PSA1 176c (step S714 and S716).

Figure 8:
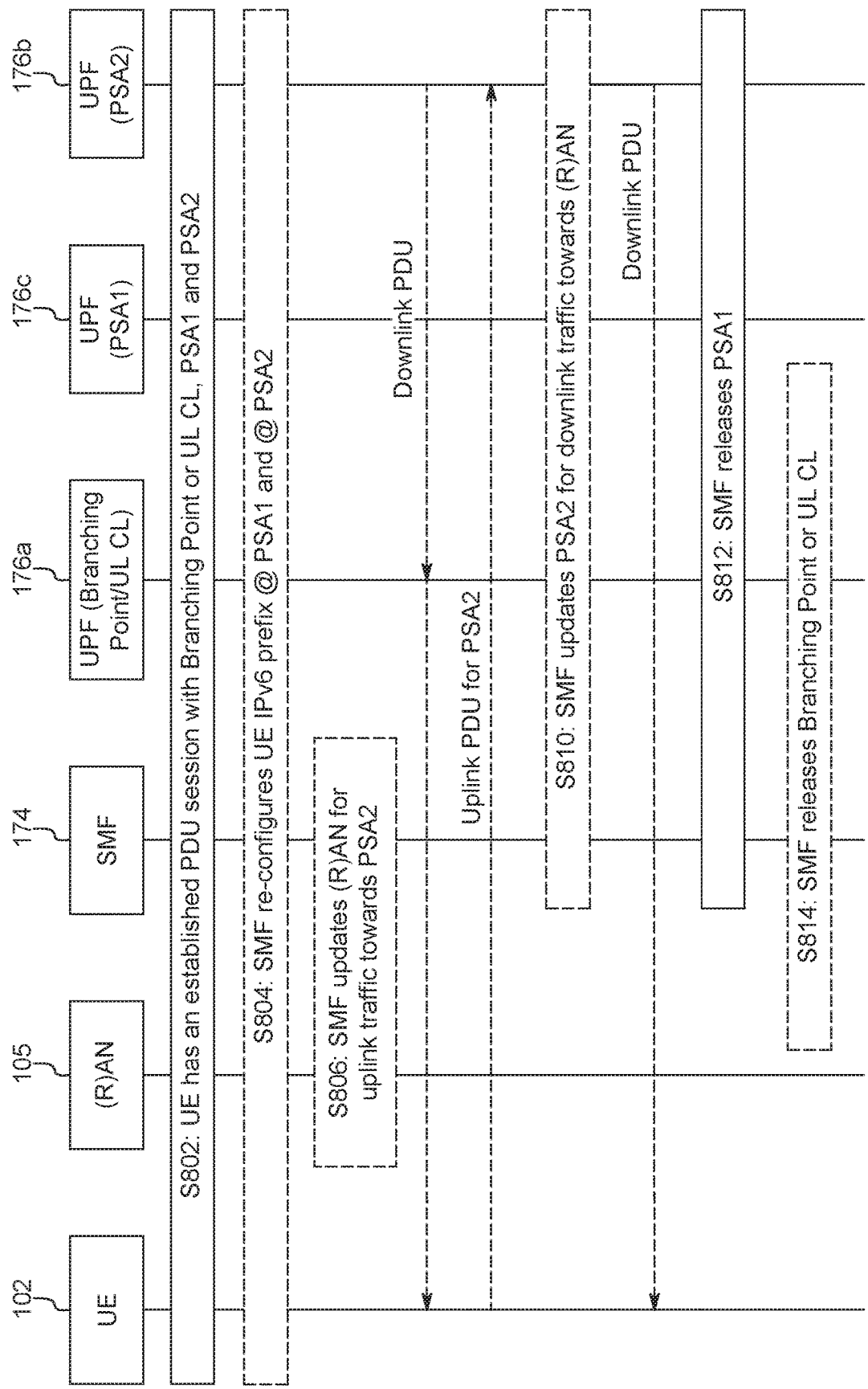
FIG. 8 shows the removal of additional PDU session anchors and branching points in accordance with an exemplary embodiment.

Similarly, PSAs and either BP or UL CL UPF can be removed from a PDU session as shown in FIG. 8. Once again, a summary of the procedure is provided—for the detailed procedure description, see 3GPP TS 23.502, Procedures for the 5G System; V15.4.1 (2019 January), incorporated herein by reference. This procedure begins with a PDU session with established BP or UL CL UPF 176a and two PSAs 176b, 176c (step S802). The SMF 174 makes a determination to remove PSA1 176c based on for example UE mobility or flow termination (step S804). If IPv6 multi-homing is active, then the SMF 174 reconfigures the UE 102 with appropriate information to stop using IPv6 prefix associated with PSA1 176c and directs the UE to use IPv6 prefix associated with PSA2 176b. The SMF 174 can then update RAN 105 and PSA2 176*b* with information to communicate with each other (step S806 and S810). Finally, SMF 174 can release both BP or UL CL UPF 176*a* and PSA1 176*c* (step S812 and S814).

Group Tunneling in 5G Vertical LAN

TR 23.734 (3GPP TS 23.734, Study on enhancement of 5GS for Vertical and LAN Services, V16.0.0 (2018 December)), incorporated herein by reference, is a study to enhance 5GS with Vertical and LAN services and one of the key issues involves the support of 5GLAN Group Management. The study concluded that Solution #29 should be the basis for normative work in support of 5GLAN Group Management. This solution is divided into two architectures: 1) centralized user plane architecture and 2) distributed user plane architecture.

For centralized user plane architecture, the study identifies that a single SMF and a single PSA UPF is responsible for all PDU sessions in 5GLAN group communications. The SMF will manage all PDU sessions of the 5GLAN group and the PSA UPF will enforce the QoS of all UE traffic in the 5GLAN group. Similarly, a single SMF will manage PDU sessions of 5GLAN group communication for the distributed user plane architecture. However, one or more UPFs are used to terminate these PDU sessions and an Nx interface is introduced to provide 5GLAN group traffic within the Nx tunnels.

Integrated Access and Backhaul (IAB) for NR

Figure 9:
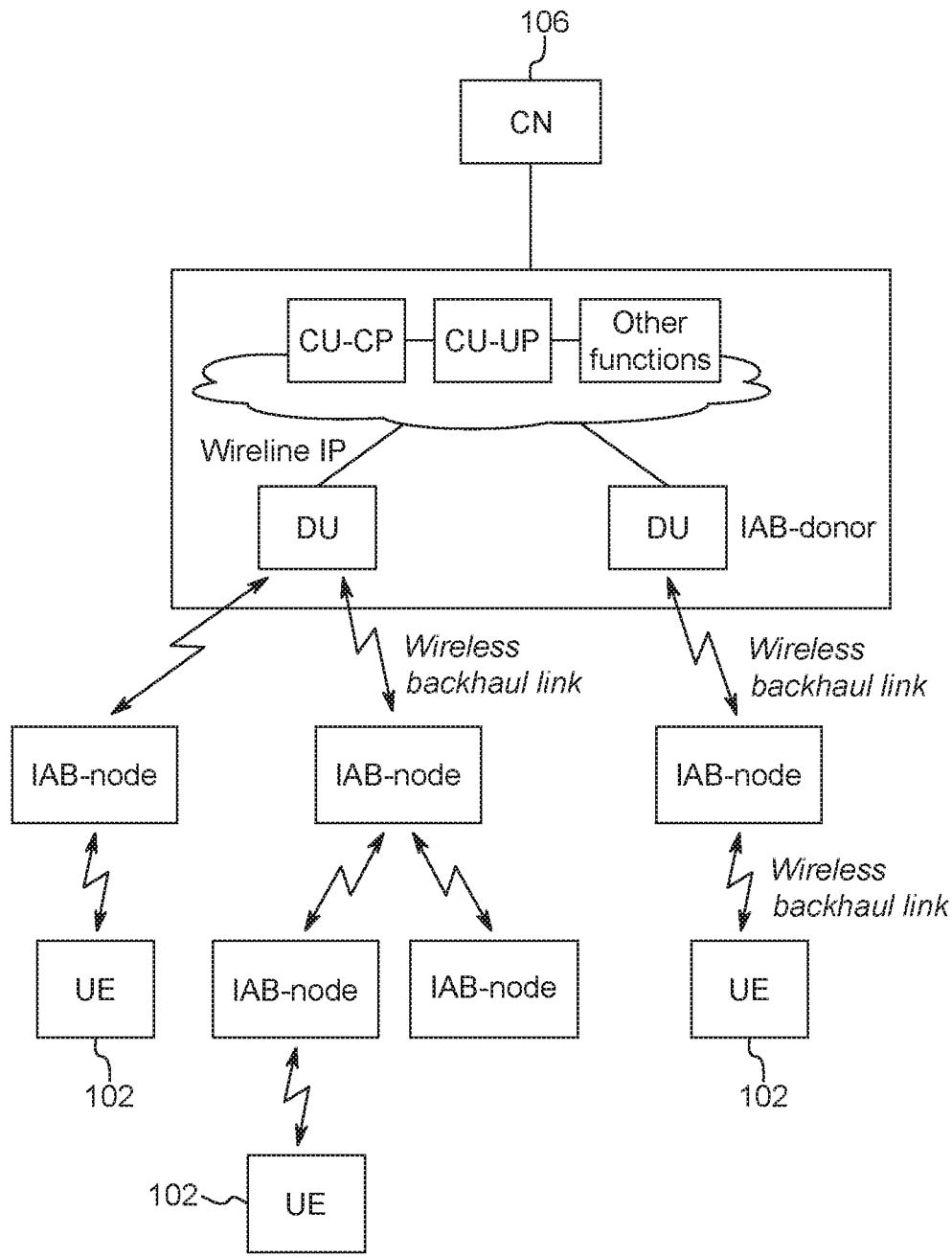
FIG. 9 shows a diagram for an IAB Architecture in accordance with an exemplary embodiment.

TR 38.874 (3GPP TR 38.874, Study on Integrated Access and Backhaul, V16.0.0 (2018 December), incorporated herein by reference, provides a study on the related aspects of relaying access traffic between access and backhaul links. In the study, Integrated Access and Backhaul (IAB) nodes are utilized to provide relaying service to UEs as shown in FIG. 9. An IAB donor node provides eventual access to the core network after receiving aggregated data from other IAB nodes. It is important to note that all the IAB nodes in FIG. 9 are gNodeB nodes used in the backhaul and the backhaul offers a data pipe for routing data is PDU sessions independently, i.e. each PDU session will be processed with their corresponding QoS. In effect, communications between the UE 102 and the IAB nodes and between IAB nodes are NR-Uu as shown in FIG. 10.

Figure 10:
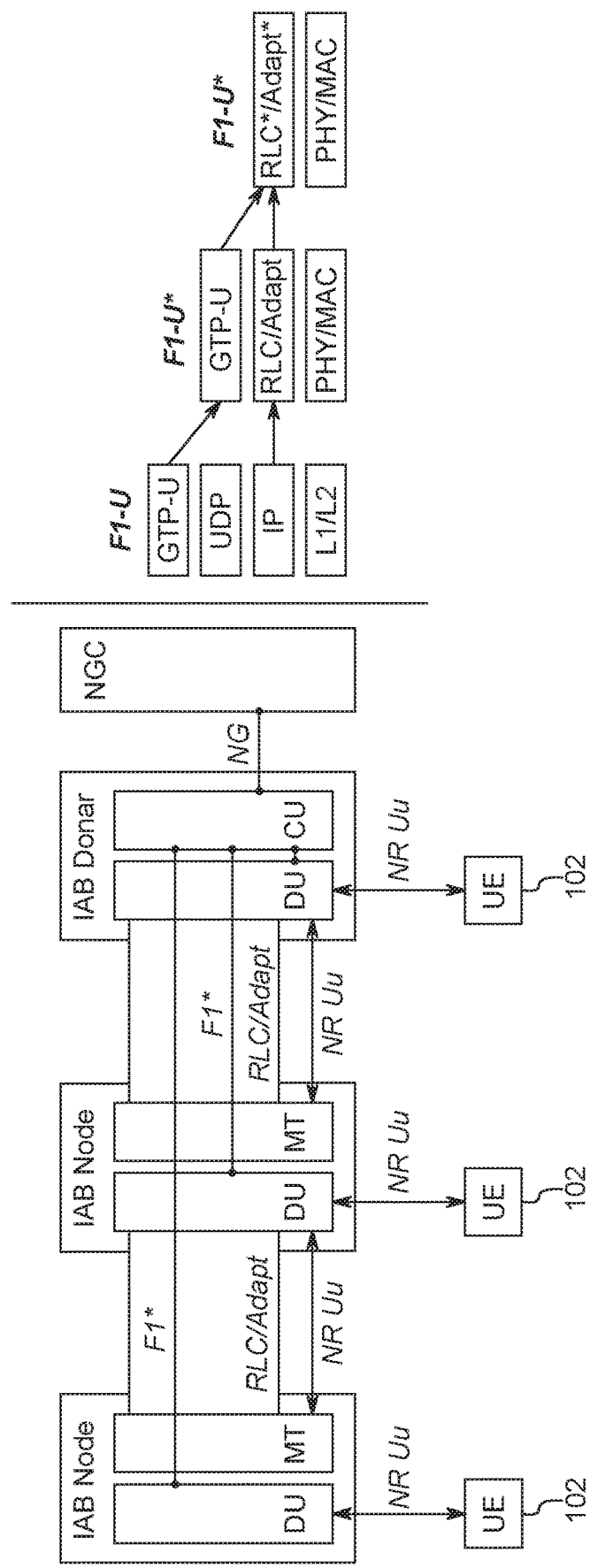
FIG. 10 shows an architecture in accordance with an exemplary embodiment.
Figure 11A:
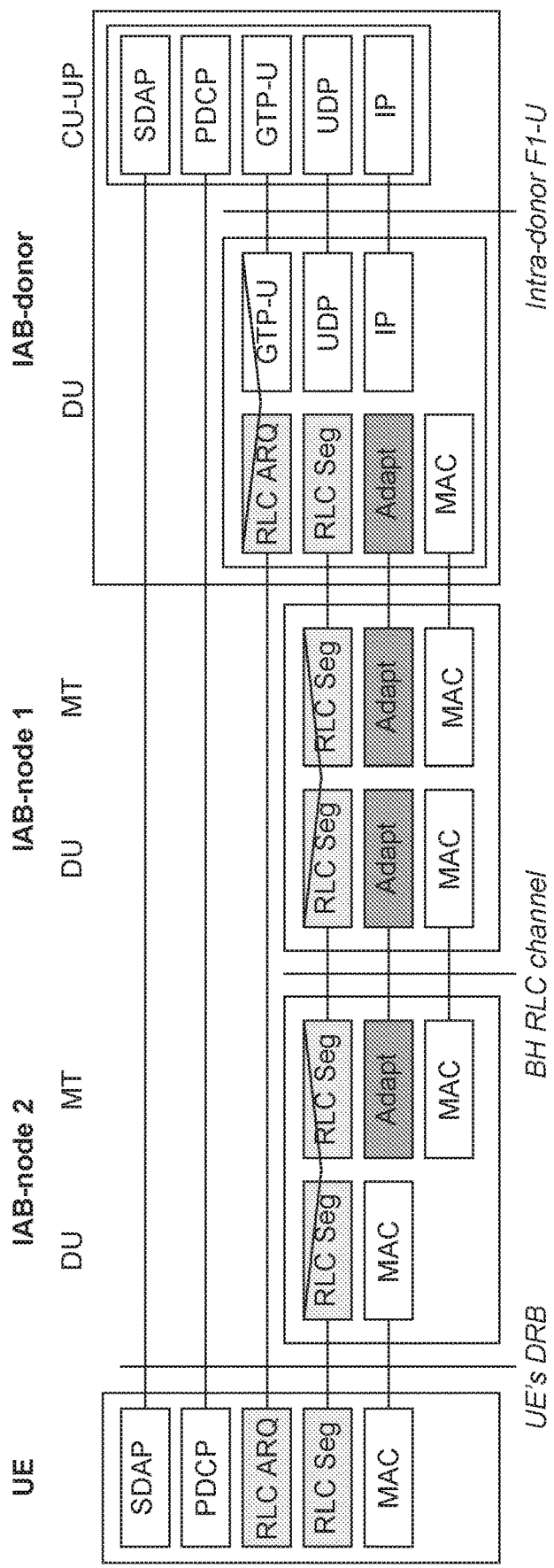
FIG. 11A shows a protocol stack example of an adaptation layer.
Figure 11B:
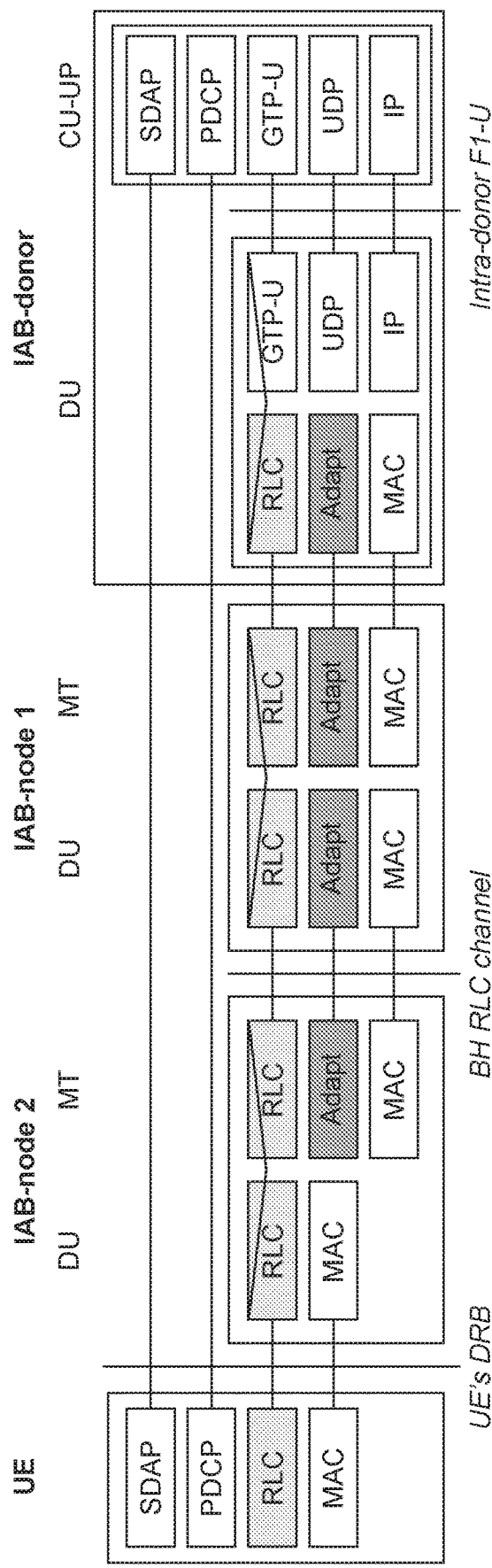
FIG. 11B shows a protocol stack example of an adaptation layer.
Figure 11C:
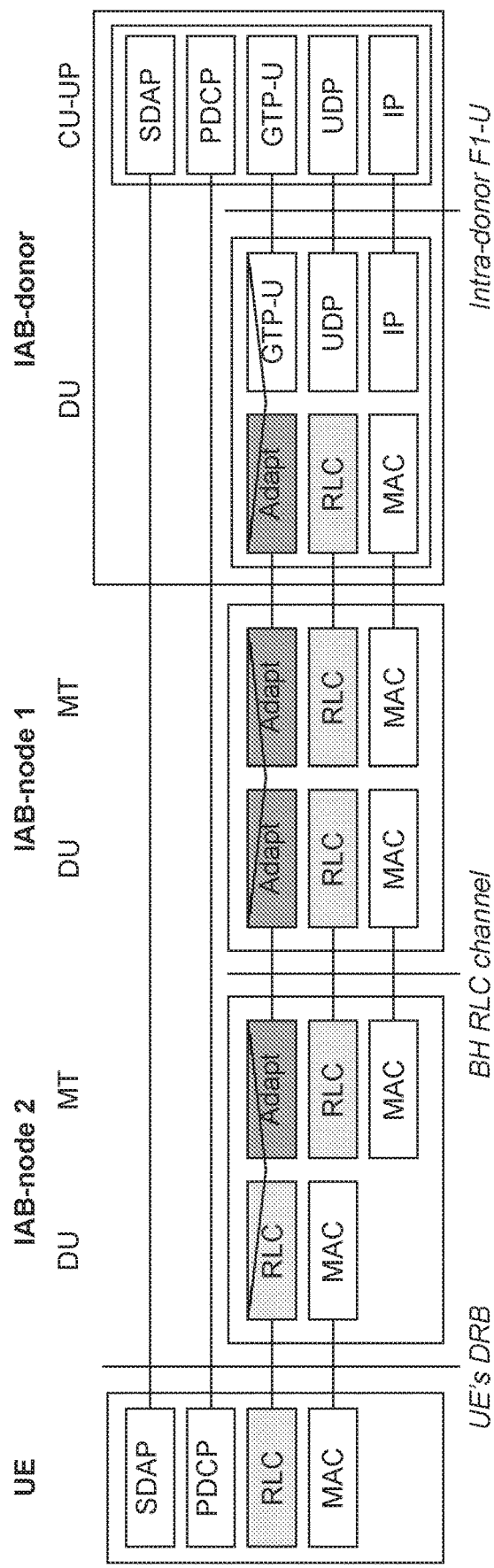
FIG. 11C shows a protocol stack example of an adaptation layer.
Figure 11D:
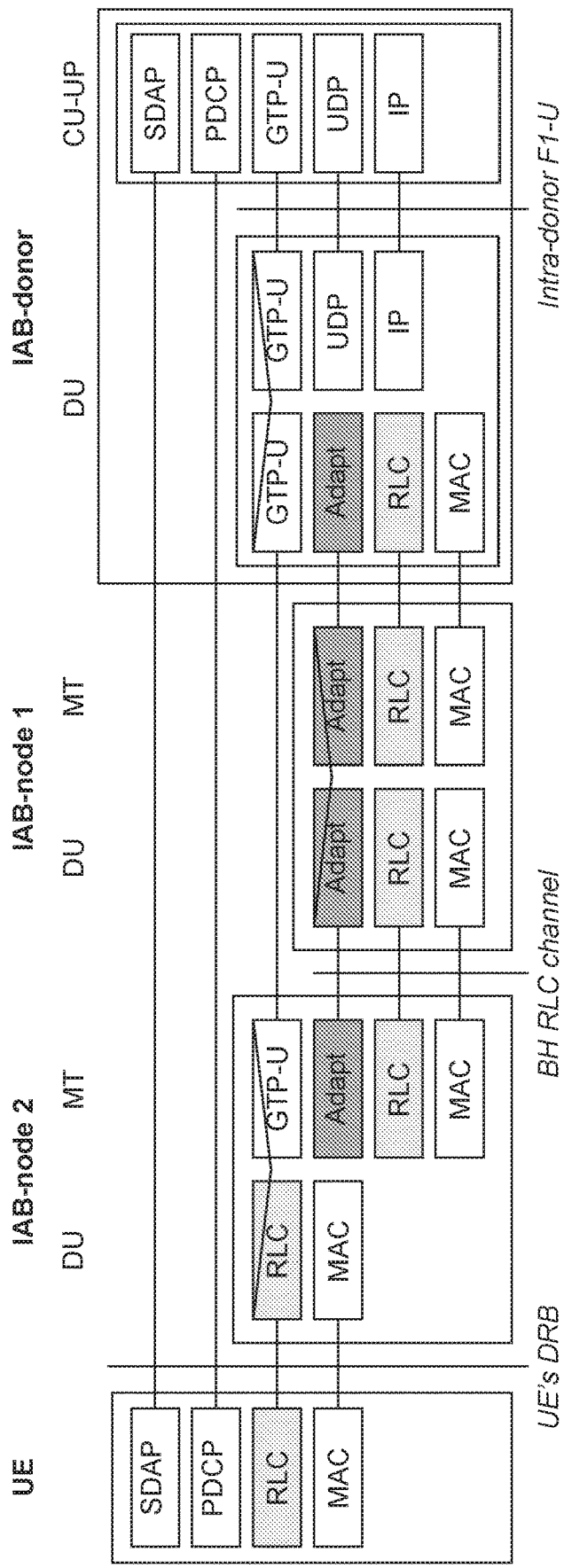
FIG. 11D shows a protocol stack example of an adaptation layer.
Figure 11E:
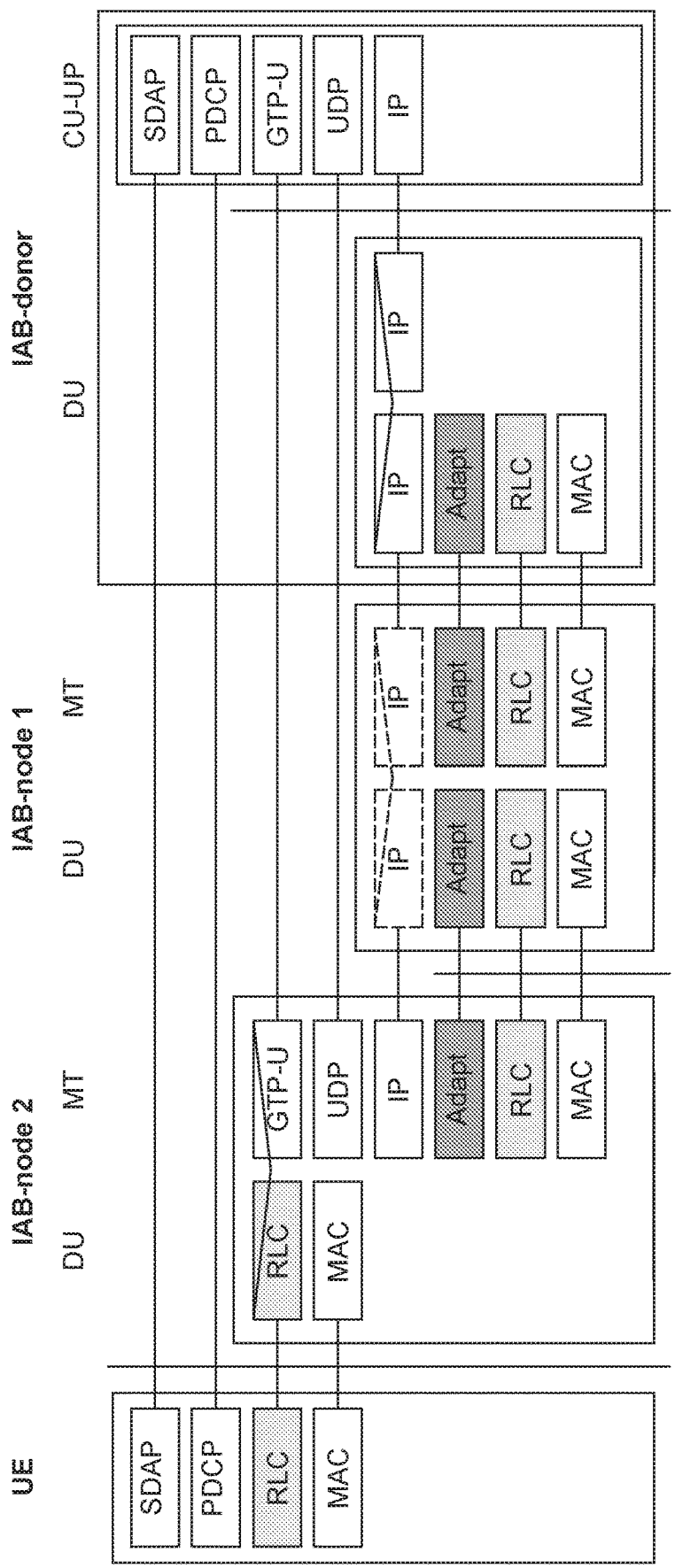
FIG. 11E shows a protocol stack example of an adaptation layer.

Various architectures were proposed in the study and the architecture shown in FIG. 10 was selected as the basis for the normative work. In this architecture, an adaptation layer is added to Layer 2 to assist in routing data from the UEs 102 through the IAB backhaul to the core network 106 and ensuring the QoS for each PDU session is met. Many variations were identified where the adaptation layer is present in the user plane during the study and further work is planned to recommend a single solution among the different examples shown in FIGS. 11A, 11B, 11C, 11D, and 11E.

In the IAB architecture, the IAB nodes relay UE traffic through backhaul links created between IAB nodes and between IAB nodes and the core network. These backhaul links serve as data "pipes" where traffic from various UEs are relayed to the core network 106 independently as the IAB nodes do not have visibility into the PDU Sessions carrying the data from the UEs 102 to the core network 106. There is no data aggregation performed by the IAB nodes which factors for buffering delay tolerant data.

Issues Addressed by the Embodiments

Use Case

TR 22.836 (3GPP TR 22.836, Study on Asset Tracking Use Cases, V0.1.0 (2018 November)), incorporated herein by reference, describes uses cases where an organization owns assets that must be tracked and the assets can be transported by planes, boats, trucks, or railways. The assets can be transported all over the world and can have many ownership changes throughout its travels. Tracking the assets can involve more than traditional location tracking as the assets themselves may require refrigeration or other environmentally stable conditions (e.g. humidity or light levels). Still other monitoring events can be desirable such as shock detection and container door openings for the detection of potential theft of assets. As a result, improving container tracking and supply chain management is a top priority to enable the global economy (TR 22.836).

Within each shipping container, a UE can collect data from a number of sensors within the container to provide tracking of the internal environment of the container. A UE can collect data from sensors at set periodic intervals and provide status to an upstream relay UE depending on the required service level (e.g. once every hour to twice a day). Note that data in assets tracking use cases typically are small in size and exhibit a certain degree of delay tolerance. Hence, the data can be buffered and relayed as long as the required service level is met. The data can then be aggregated together by a relay UE and sent periodically to a management tracking system through the core network. Being mounted on the container, the UE must be battery powered and may need to have the same lifetime as that of the container, which can be up to 12 to 15 years, without replacing its battery. Throughout the transport, the management tracking system can also make requests to obtain monitoring of the shipping container.

Figure 12:
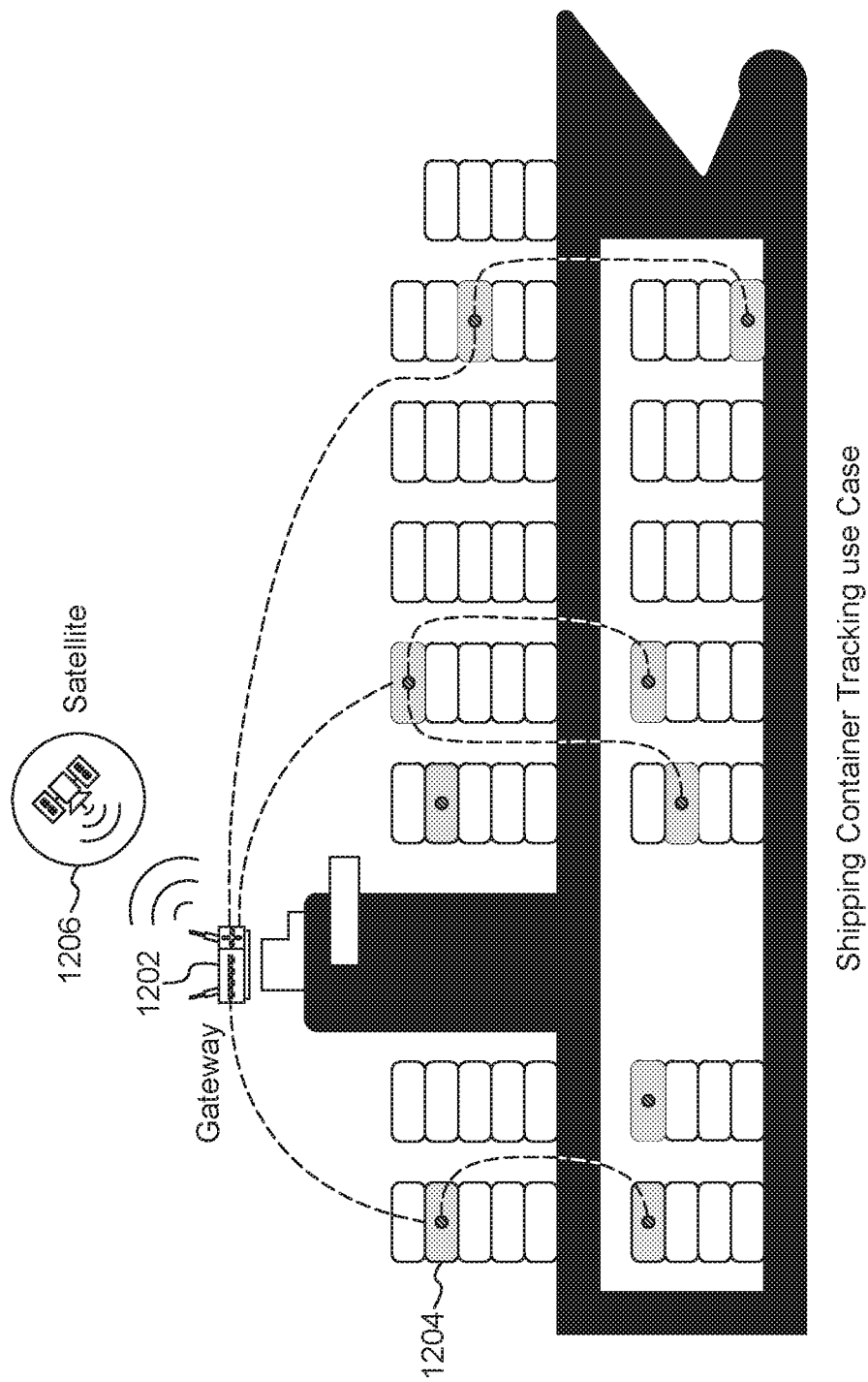
FIG. 12 shows a shipping container tracking use case in accordance with an exemplary embodiment.

FIG. 12 shows a use case from TR 22.866 (3GPP TR 22.866, enhanced Relays for Energy Efficiency and Extensive Coverage, V0.1.0 (2018 November)), incorporated herein by reference, for the asset tracking of shipping containers using UE relays. A gateway device 1202 with a UE communications module on a ship can relay data received from various shipping containers 1204 back to a management tracking system through the core network over satellite communications 1206. Each shipping container can collect data from various sensors within the container and be able to send all its data back to a management tracking system even though it may not have connectivity with the core network 106. The containers can be stacked on top of each other and can even be located at the lower decks of the ship which can interfere with signal transmission and reception. As a result, a UE at the farthest distance from the gateway device 1202 in the ship can require the assistance of other intermediate UEs to relay its data to the gateway device 1202. The gateway device 1202 can host a UE that will then aggregate data received from all containers and send the aggregated data to the core network 106 for routing to the appropriate management tracking system.

The UE in the gateway serves as the head of the relay chain to interface to the core network. All the UEs that communicate with each other is then part of this relay chain. Data can originate from a UE at the farthest reach of this chain and sent to an upstream UE, which can even include its own data and then relays the aggregated data to the next UE in the relay chain. The process repeats until the aggregated data arrives at the relay UE acting as the gateway device, which will then send all the data to the core network to be routed to the appropriate tracking management system in the DN 202. Note that the relay chain can consist of more than the two levels that is shown in FIG. 12.

Note that the above use case and its requirements can be applied to other use cases as well. For example, a locomotive wagon tracking and fleet monitoring use case can have many of the same requirements and issues faced by the shipping container use case. A typical freight train can have 50 to 120 wagons each 40 feet long and travelling at speeds of 50 to 80 km/h. Each wagon can have a UE installed to collect data from various sensors within the wagon and may need to provide the data to a tracking management system in the cloud. The wagons at the end of the train can be 700 m to 1 km from the front and have intermittent connectivity to the core network. As a result, it can require the assistance of UEs in other wagons to relay their data.

Remote connected healthcare monitoring is another use case with similar requirements as the shipping container and wagon tracking use cases. A patient lives in a rural village with sparse cellular coverage and may need to be remotely monitored. The patient is not in critical condition so the data is delay tolerant, e.g. a latency of several hours is not an issue. Battery operated body sensors and home monitoring devices can be utilized to provide data that needs to be relayed to a hospital system that is providing care to the patient.

Issues Addressed by the Embodiments

The aforementioned use cases present the importance of supporting asset tracking in the 5G system. UEs attached to shipping containers are expected to provide worldwide coverage while optimized for battery consumption. Since the shipping containers are transported in various and sometimes harsh environments, it can be a challenge for the UEs to maintain connectivity with the core network throughout their journey. As a result, a UE may need to rely on other UEs to provide relaying service back to the core network in order to provide for the proper tracking of the underlying assets.

When a UE is operating in relay mode, two main issues arise: 1) how the UE aggregates the data from other UEs while balancing efficient power consumption requirements and 2) how the core network can route the aggregated data to and from the relay UE. A relay UE may need to wait for a certain time to allow other UEs time to send their data. The relay UE also needs to be power efficient to minimize power consumption of its own battery. Therefore, the relay UE must balance power consumption with waiting for UEs to provide their data.

Once data have been aggregated at the relay UE, the next issue is how the core network may know how to route the data from each UE to the proper PSA UPF. Existing approaches to de-multiplex data rely on tunneling methods. To use such methods in the 5GC would mean that we are not leveraging capabilities that have been built into the 5GC in release 15, such as the ability to dynamically insert UPFs into the data path. In addition, as the containers are being transported, UEs may need to join or leave a relay chain if their paths diverge. The impacts of changes to members of a relay chain can require changes to the core network's user plane resources to provide for proper routing of the aggregated data.

Similar to the relay UE case, the core network 106 may need to aggregate data received from various management tracking systems targeting different UEs in the relay chain and aggregate and forward the data to the relay UE. The core network 106 may need to wait for a certain time as well to aggregate the data and minimize the frequency of communications with the relay UE to preserve the battery life of the relay UE. The relay UE is then required to separate the data and relay it to the appropriate downstream UEs until the data reaches the destination UEs.

Consequently, asset tracking use cases require UEs to operate worldwide and be reachable throughout its transport to provide tracking and management of the underlying assets. These UEs can be attached to shipping containers and are expected to operate for lifetimes of 10 to 15 years. The UEs can be devices with fixed batteries so efficient power consumption is a critical requirement. Due to mobility and poor signal strengths, the containers may not always have connectivity to the core network. As a result, asset tracking UEs may need to depend on other UEs to relay and aggregate its data to the core network to optimize power consumption.

This disclosure sets forth the following mechanisms to address the requirements of asset tracking UEs from TR 22.836 (3GPP TR 22.836, Study on Asset Tracking Use Cases, V0.1.0 (2018 November)) and TR 22.866 (3GPP TR 22.866, enhanced Relays for Energy Efficiency and Extensive Coverage, V0.1.0 (2018 November)), incorporated herein by reference:

Relay UEs provide a capability indication to the core network to indicate the support of relay aggregation. The core network then provisions relay UEs with data aggregation parameters used to aggregate and relay UE data.
  Relay UEs provide indication to core network to create Shared PDU Sessions for sending aggregated data on the user plane. In turn, core network configures UPF and RAN node to allocate resources for tunneling data through the shared PDU session.
  Relay UEs utilize data aggregation parameters to make determination on whether to aggregate data from other UEs. Relay UEs can also wait for a specified aggregation period to allow other UEs to send its data.
  Relay UE aggregates data from other UEs and sends them on the shared PDU sessions. RAN node and UPF(s) route data on shared PDU session to one or more PSA UPFs.
  UPF supports aggregating DL data from one or more PSA UPFs and sends aggregated data to relay UEs
  UEs within relay chains synchronize communications with each other to optimize power consumption.
  Relay UE and RAN node communicate with each other for RAN node to efficiently allocate radio resources for UE to send delay tolerant data to the core network Main Solution 1:
Core network 106 provisions relay aggregation policy to a UE 102:
  A UE 102 informs the core network 106 that it is capable of aggregating and relaying data from other UEs
  Core network 106 checks policy for possible parameters to provision to UE 102
  Core network 106 returns policy to be used for aggregating data to relay UE
  Relay UE saves policy and performs aggregation of data using information from the policy Supporting concepts for main solution 1:
 1. Where informing the core network 106 can be made through a UE registration request, the registration request includes a relay aggregation or a data aggregation indication
 2. Where the aggregation policy comprise of Traffic Group ID and Delay Tolerant Data Period parameters
 3. The UE 102 saves the policy as a URSP rule internally to make aggregation and relaying decisions 4. UE 102 receives data from another UE with a Traffic Group ID and makes aggregation decision if there is a match with internally stored Traffic Group ID
  5. UE 102 uses Delay Tolerant Data Period parameter to wait for data from other UEs.

Main Solution 2:
UE 102 establishes shared PDU session to send aggregated data to the core network 106:
  UE 102 establishes a PDU session with primary PDU Session ID and one or more secondary PDU Session IDs and includes a Shared PDU Session indication
  Core network 106 establishes and provisions routing rules to a Relay Aggregation UPF
  Core network 106 re-configures the tunnel information for each of the PSA UPFs associated with the secondary PDU Session IDs
  Core network 106 informs RAN node 105 that the shared PDU session contains delay tolerant data
  Core network informs UE 102 that shared PDU session is created.

Supporting concepts for main solution 2:
  1. The PDU Session establishment can include a Shared PDU Session indication and a Traffic Group identifier
  2. The secondary PDU Session IDs can consist of a list of previously established PDU sessions from other UEs in a relay chain
  3. Network retrieves PDU session contexts for each of the secondary PDU Session IDs and generates routing rules to be sent to the RA UPF
  4. Relay UEs organize data according to PDU session ID
  5. Network provisions RAN node with PDU Session ID and Delay Tolerant Data Period Main Solution 3:
UE 102 informs RAN node 105 it has delay tolerant data:
  UE 102 provides indication of availability of delay tolerant data to RAN node 105
  UE 102 waits for paging message from RAN node 105 after completion of RACH procedure
  RAN node 105 pages UE 102 for receiving delay tolerant data
  UE 102 sends RAN node 105 the aggregated data Supporting concepts for main solution 3:
  1. UE 102 provides delay tolerant indication in establishmentCause information element of RRCSetupRequest message To resolve the relay and data aggregation issues identified with the asset tracking use case, several enhancements are proposed to support the processing of aggregated data from relay UEs. First, the core network 106 can provision relay UEs with policies that contains aggregated traffic parameters such as newly proposed Traffic Group ID and Delay Tolerant Data Period parameters. These policies can be provided to the NAS Layer of a UE 102 by the core network 106 in the response to the UE 102 including a Relay Aggregation or Data Aggregation indication in a registration request. Using the new parameters, the NAS Layer of the UE 102 can make a determination on whether to relay data from other UEs and the time to wait for such data.

After receiving the new parameters, the NAS Layer of a UE 102 can establish a "Shared PDU Session" with the core network 106. This Shared PDU Session is a special PDU session with a primary PDU session ID and one or more secondary PDU session IDs. The shared PDU session contains data from multiple PDU Session IDs, which represent the one or more secondary PDU session IDs, that have been aggregated as described herein. A UE 102 can include a primary PDU Session ID for this shared PDU session, a Shared PDU Session indication, the Traffic Group ID, and a list of secondary PDU Session IDs of other UEs in a PDU Session Establishment request where the provided secondary PDU Session IDs are associated with aggregated data over this shared PDU session. These secondary PDU Session IDs and the Traffic Group ID can be included along with the aggregated data to inform a Relay Aggregation (RA) UPF on how to route the data from the individual UEs. These secondary PDU Session IDs may have been received by the relay UE via PC5 signaling from other UEs.

The SMF 174 will use the secondary PDU Session IDs to determine the UPF anchors 176*b*, 176*c*, etc. identified by each PDU session ID. The SMF 174 will then perform a UPF selection procedure to select an RA UPF that will be used to de-aggregate and aggregate the data of PDU session IDs of UL and DL traffic, respectively. The SMF 174 will provide the secondary PDU Session IDs, the Traffic Group ID, and the Delay Tolerant Data Period to the selected RA UPF. The SMF 174 will also configure the RA UPF and the PSA UPFs with tunnel information so that data can be tunneled between the RA UPF and PSA UPFs. The RA UPF in turn will use the secondary PDU Session IDs, the Traffic Group ID, and the Delay Tolerant Data Period in making UL and DL traffic routing decisions. For UL traffic routing, the UPF 176 can interface to the multiple PSA UPFs using the secondary PDU Session IDs and the Traffic Group ID and the tunnel parameters that can be received from the SMF. For DL traffic routing, the RA UPF can use the Delay Tolerant Data Period and the Traffic Group ID to aggregate data from potentially multiple PSA UPFs for different UEs before sending the aggregated data to the relay UE via the RAN node 105.

For the enhancements disclosed herein, the following assumptions are made:
  1. Each UE will have established a PDU session
  2. Traffic Group ID and Delay Tolerant Data Period parameters have been established in PCF policy to indicate to relay and remote UEs and RA UPFs when and how to aggregate data
  3. UEs support communications with other UEs over PC5 or other communication medium
  4. UE to UE communications lead to formation of UE groups referred to as relay chain which have data aggregated and relayed by relay UEs within the relay chain. How the relay chains are formed is out of the scope of this disclosure
  5. Due to the fact that the data is delay tolerant, it is assumed that the QoS requirements are similar or are the same for all the data flows in the relay chain.
  6. SMF, PCF, UPF, and UE support the shared PDU session concept presented in this disclosure A protocol stack of the user plane is presented in FIG. 13 to show exemplary embodiments of functionalities in support of the asset tracking use case. The functionalities are:
  Introduction of an Aggregation Layer for remote UEs and relay UEs to communicate over PC5 or other proximity communication mechanisms. This layer performs the data aggregation and de-aggregation required by the asset tracking use case and is described further in the sections entitled "Uplink UE Relay Data Aggregation" and "Downlink UPF Relay Data Aggregation." Note that although the Aggregation Layer is shown as a separate layer, the required functionality can be added to existing layers such as the PDU layer or the SDAP layer shown in the figure.
  The relay UE will also have an Aggregation/PDU layer when interfacing to the core network. This layer performs not only the data aggregation function but also the shared PDU session management as described in the section entitled "Shared PDU Session Establishment Procedure."

Figure 13:
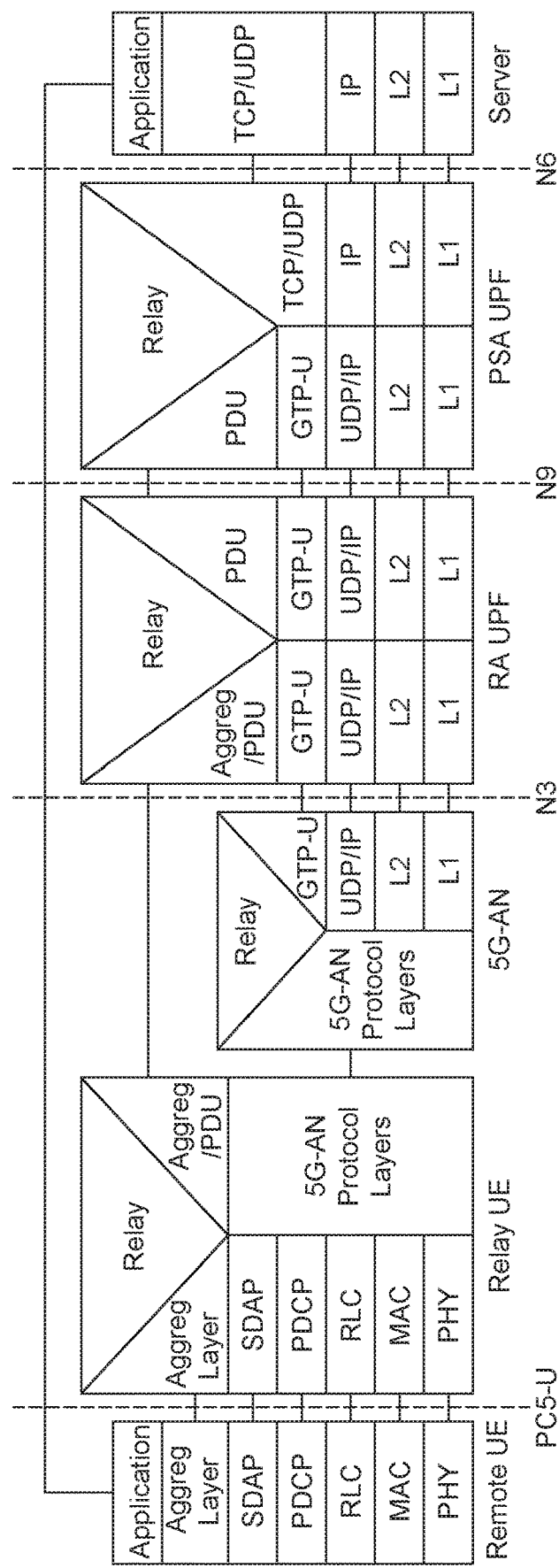
FIG. 13 shows user plane protocol stacks in accordance with an exemplary embodiment.

It is understood that there can be one or more relay UEs inserted between the remote UE and the relay UE shown in FIG. 13 to support multi-hop scenarios.

It is also understood that each relay UE can provide data to its own asset tracking application in addition to the data aggregation function that it performs. Note this functionality is not shown explicitly in FIG. 13.

New functionalities are introduced in the RA UPF to provide de-aggregation and aggregation of UL and DL data traffic respectively as proposed in the sections entitled "Uplink UE Relay Data Aggregation" and "Downlink UPF Relay Data Aggregation.' The RA UPF performs de-aggregation of data sent on the shared PDU session to route UL traffic to one or more PSA UPFs. Conversely, the RA UPF aggregates data received from one or more PSA UPFs for a duration specified by the Delay Tolerant Data Period and sends the aggregated data in the shared PDU session tunneled to the relay UE. The Delay Tolerant Data Period sent to the RA UPF may be the same or different from the Delay Tolerant Data Period parameter provided to the relay UEs.

Other proposed functionalities not shown in FIG. 13 are the PDU session related information provided by policy in the PCF (section entitled "PDU Session Related Policy Information in the PCF"), propagation of aggregation policy to the UEs in the relay chain (section entitled "Propagation of Aggregation Policy to UE from CN"), UE communications within a relay chain to optimize power consumption (section entitled "Uplink UE Relay Data Aggregation"), and the relay UE interactions with the RAN node (section entitled "UE Notifies RAN of Availability of Delay Tolerant Data for Transmission").

PDU Session Related Policy Information in the PCF

In order to support asset tracking use cases, it is proposed to add some information elements to the PDU session related policy information in the PCF 184. The new information elements are shown in Table 4. Note these new information elements are additions to the information elements shown in Table 1. The SMF 174 can use the information provided in this policy to provision UEs to support data aggregation and relaying as proposed herein. For the asset tracking use case, two parameters are proposed to enable such use cases: Traffic Group ID and Delay Tolerant Data Period. Note that the term "Traffic Group ID" is used to refer to a group of UEs that are part of a relay chain and whose data are aggregated together and relayed to the core network. Other terms may also apply, such as Traffic Chain ID, Relay Chain ID, Relay Group ID, etc. Both parameters are provided to UEs as outlined below during the UE registration procedure or during other procedures in which the core network can provision policy to the UEs. The parameters are used by each UE in a relay chain to make relaying decisions as described herein. The Traffic Group ID is an identifier used by UEs to identify data that may need to be aggregated and relayed while the Delay Tolerant Data Period provides UEs a time to wait for delay tolerant data from other UEs. At the expiration of this time, the relay UE can aggregate all data received and send them to an upstream relay UE or to the core network.

TABLE 4

New PDU Session related policy information

| Attribute | Description | PCF permitted to modify for dynamically provided information | Scope | Differences compared with table 6.4. and 6.6 in TS 23.203 |
|---|---|---|---|---|
| Shared PDU Traffic Group IDs | IDs provided to UEs that are part of a relay chain where data are aggregated by a relay UE and sent on a shared PDU session established for the relay chain. Multiple Traffic Group IDs can be part of a relay chain. In addition, a relay UE can support multiple relay chains each with multiple Traffic Group IDs. Each relay chain will be associated with a Shared PDU Session. | Yes | PDU Session | None |
| Delay Tolerant Data Period | Define a time period for UEs and UPFs to wait for aggregating delay tolerant data that are to be sent on a shared PDU session | Yes | PDU Session | None |

Propagation of Aggregation Policy to UE from CN

Figure 14A:
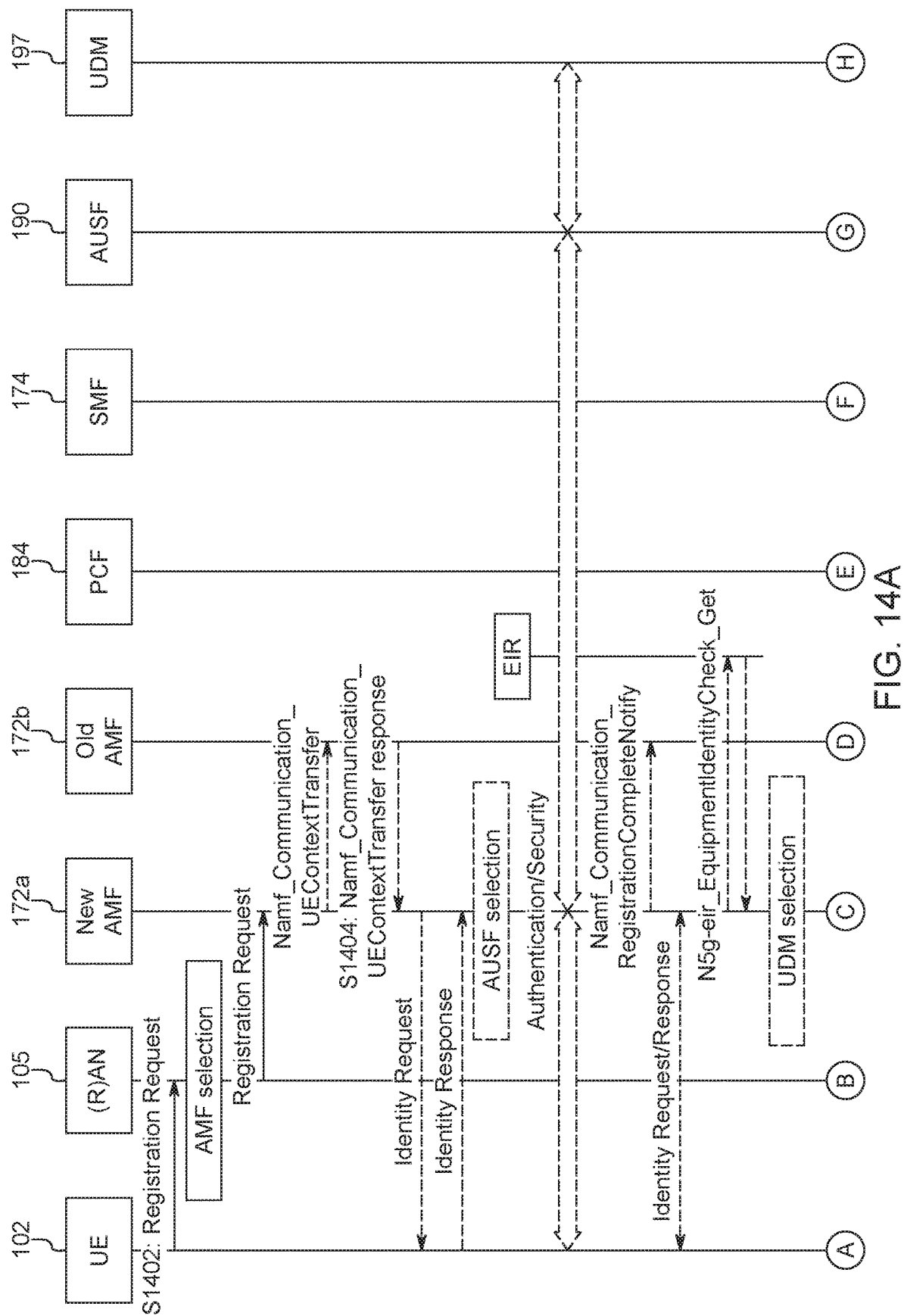
FIG. 14A shows a UE Registration procedure in accordance with an exemplary embodiment.
Figure 14B:
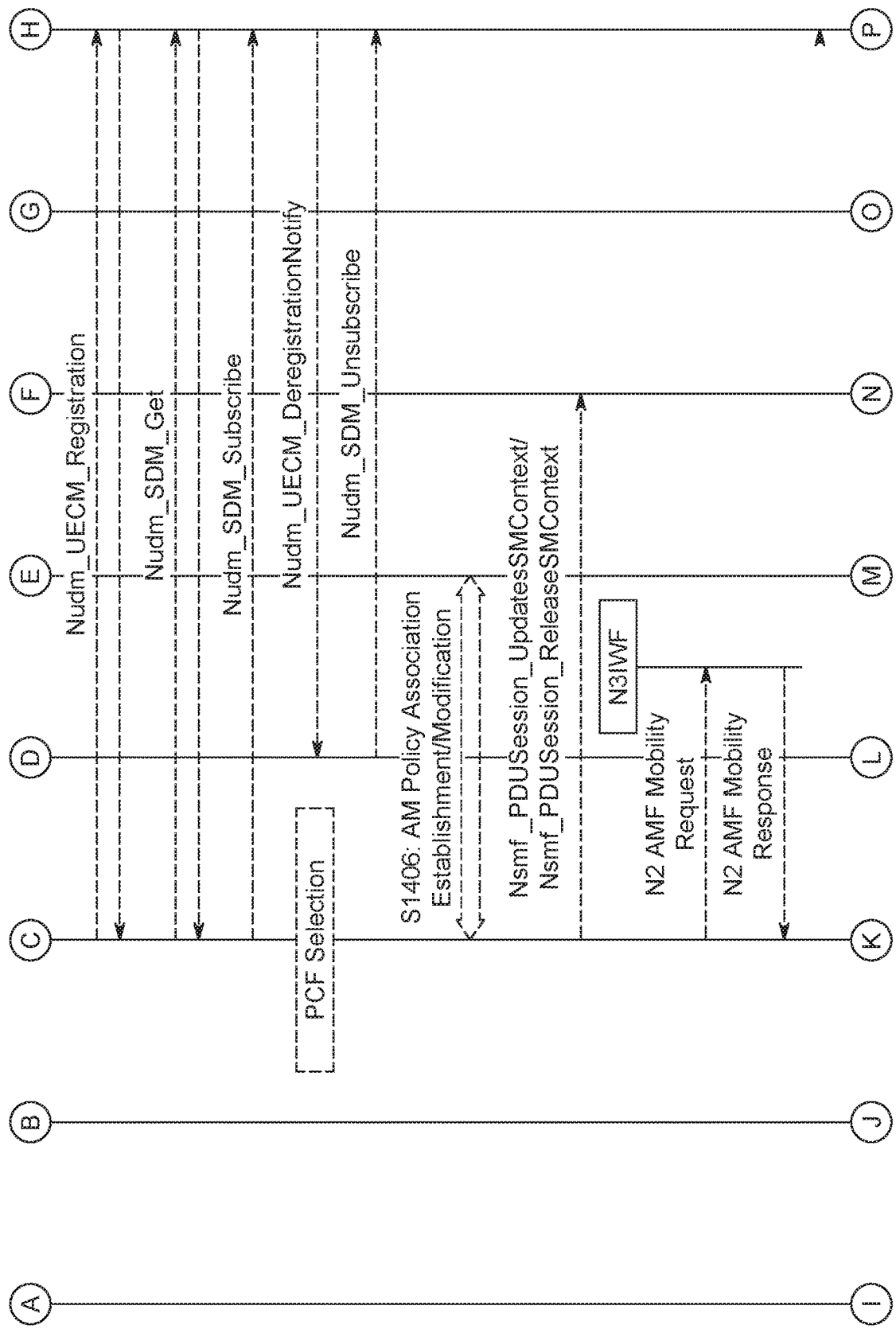
FIG. 14B shows a UE Registration procedure in accordance with an exemplary embodiment.
Figure 14C:
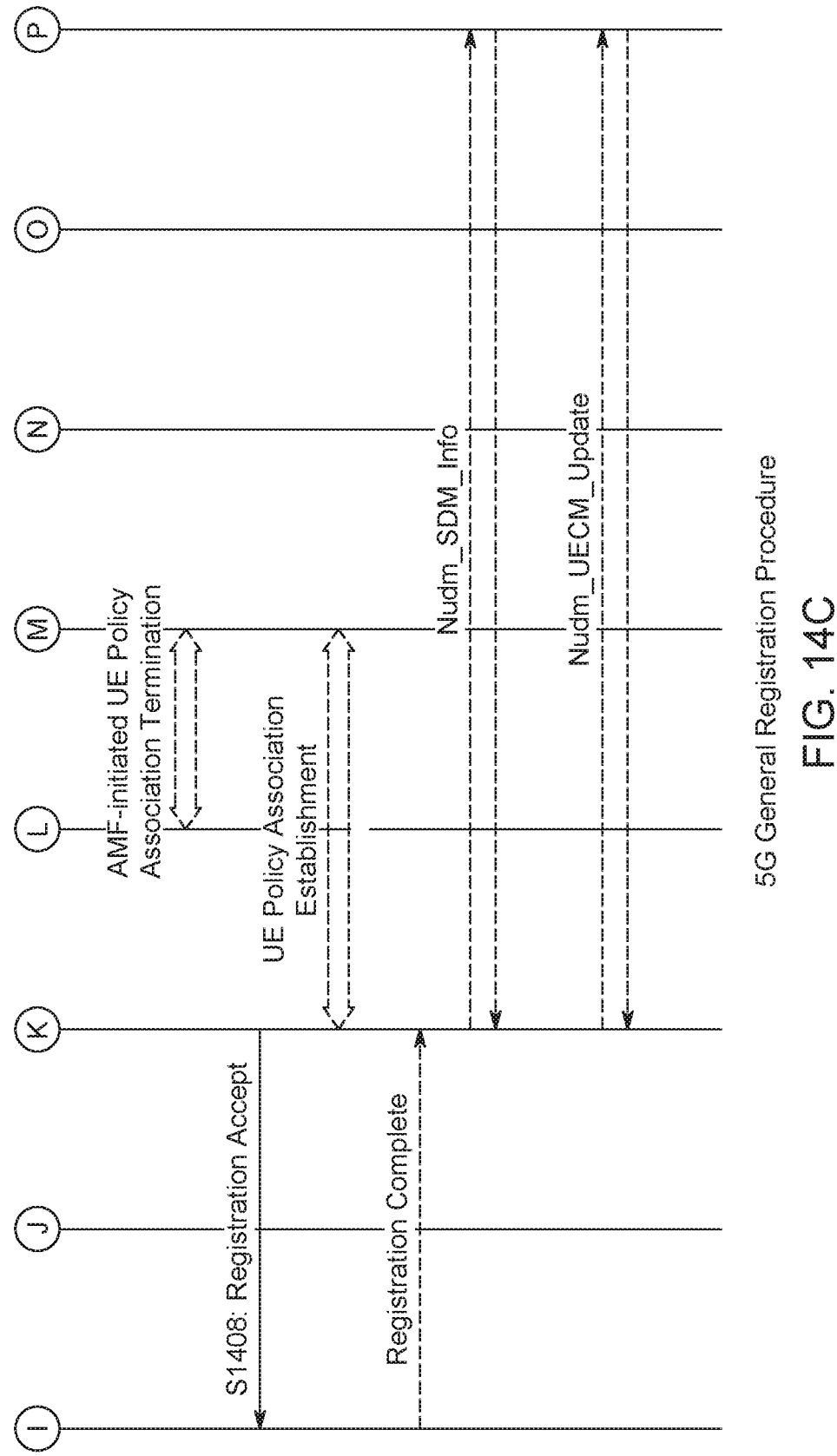
FIG. 14C shows a UE Registration procedure in accordance with an exemplary embodiment.

As previously mentioned, the core network 106 can provide the relay aggregation policy to the UE 102 during UE registration procedure. FIGS. 14A, 14B, and 14C show the registration procedure from TS 23.502 (3GPP TS 23.502, Procedures for the 5G System; V15.4.1 (2019 January)) for the UE to register with the core network in order to be authorized to receive services, incorporated herein by reference.

Exemplary and non-limiting enhancements to the registration procedure are:

- In step S1402, a relay UE 102 may provide a Relay Aggregation indication in the registration request to inform the core network 106 that the UE 102 supports relay aggregation. Separately, a remote UE can provide Data Aggregation indication in the registration request to inform the core network 106 that the UE 102 would like to have its data aggregated by a relay UE. Either of the indications, Relay Aggregation or Data Aggregation, can be used by UEs to be provisioned with aggregation policy containing the parameters shown in Table 4.
- In step S1404, if an old AMF 172b holds information about established PDU Sessions, the old AMF 172b can include SMF information DNN, S-NSSAI(s), and PDU Session ID. If Shared PDU sessions exist, the Traffic Group ID and Delay Tolerant Data Period parameters and the list of secondary PDU Session IDs are provided as well. The Shared PDU Session will be described later.
- In step S1406, the new AMF 172a performs an AM Policy Association Establishment with the PCF 184 by sending a Npcf_AMPolicyControl_Create to the PCF 184. As part of this request, the new AMF 172a includes the Relay Aggregation or the Data Aggregation indication. In response, the PCF 184 provides access and mobility related policy information. Part of this policy information includes the Traffic Group ID and the Delay Tolerant Data Period parameters that can be returned to the UE 102.
- In step S1408, the new AMF 172a returns the Registration Accept message to the UE 102 and can include the Traffic Group ID and the Delay Tolerant Data Period in the message. The Traffic Group ID and the Delay Tolerant Data Period are delivered to the NAS Layer of the UE 102 in a URSP rule in a NAS-PCF message.

As previously stated, a UE 102 uses the UE Route Selection Policy (URSP) it maintains to determine how to send data on a PDU session. The inclusion of the Traffic Group ID and the Delay Tolerant Data Period in a URSP rule enables a UE 102 to assign traffic to be sent on a PDU session. Within the Route Selection Descriptor of the URSP rule, a "Shared PDU Session" indication can be saved in either the "PDU Session Type Selection," the "Access Type preference," or some other information element. This indication can be used to direct a relay UE to route its own application data for asset tracking as well as aggregate the application data from other UEs obtained from UE-to-UE communications, e.g., over PC5 communications. Traffic that is assigned to the Traffic Group ID can be sent on this aggregated PDU session.

There can be other ways that a UE can be provisioned with the Traffic Group ID and the Delay Tolerant Data Period parameters. One such procedure is the UE Configuration Update procedure for transparent UE Policy delivery as described in TS 23.502 (3GPP TS 23.502, Procedures for the 5G System; V15.4.1 (2019 January)), incorporated herein by reference. Note that the aggregation policy can be part of the UE policy and the terms will be used interchangeably hereafter. This procedure can be initiated by the core network 106 due to an update by the tracking management system that either adds or removes a Traffic Group ID for a relay UE to monitor or adds or removes UEs from a relay chain. The procedure executes as outlined in TS 23.502 (3GPP TS 23.502, Procedures for the 5G System; V15.4.1 (2019 January)), incorporated herein by reference, and the new aggregation policy data is transmitted to the UE during step 3.

Figure 15:
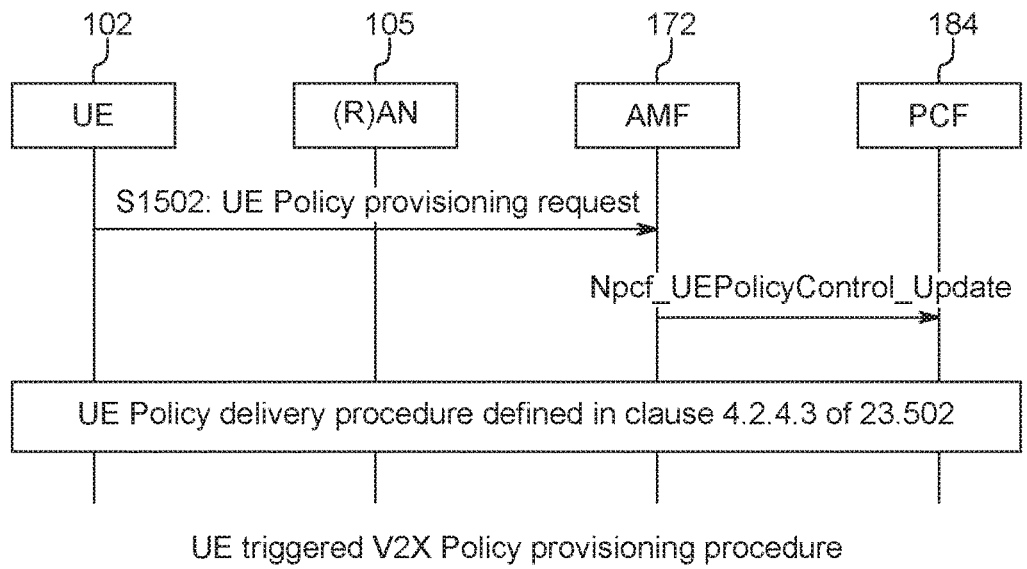
FIG. 15 shows a UE triggered V2X Policy provisioning procedure in accordance with an exemplary embodiment.

Whereas the core network 106 can initiate aggregation policy update as previously described, a UE 102 can also initiate aggregation policy update itself due to changes in the UE's operating environment. For example, a UE 102 can arrive at a new location such as a shipping dock and may need to request from the core network an update to its aggregation policy. Alternatively, a UE 102 can discover a new UE over PC5 and initiate an update to its aggregation policy to check if data from the new UE should be aggregated. FIG. 15 shows the UE triggered V2X Policy provisioning procedure from TS 23.287 (3GPP TS 23.287, Architecture enhancements for 5G System (5GS) to support Vehicle-to-Everything (V2X) services, V0.2.0 (2019 March)), incorporated herein by reference, that can be applied to have a UE initiate the aggregation policy update procedure previously described. The UE in FIG. 15 can provide a UE policy container with the Traffic Group ID(s) and the associated PDU Session IDs parameters in step S1502 to initiate the UE Configuration Update procedure for transparent UE Policy delivery as described in TS 23.502 (3GPP TS 23.502, Procedures for the 5G System; V15.4.1 (2019 January)), incorporated herein by reference.

Shared PDU Session Establishment Procedure

A shared or aggregated PDU session is proposed to allow a relay UE to inform the core network that this special PDU session will be used to tunnel aggregated data. This shared PDU session can be associated with a list of secondary PDU Session IDs for one or more UEs and used to combine the aggregated data that are organized according to each individual PDU Session ID. The assumption is that each UE had previously established a PDU session with the core network and has a corresponding PDU Session ID. Each UE then send the data to be aggregated with their PDU Session ID and the Traffic Group ID to a relay UE using, for example, PC5 communications. The relay UE in turn checks the Traffic Group ID, and if there is a match with an internally stored Traffic Group ID, aggregates the data and organizes them according to PDU Session ID. The relay UE can also associate a time stamp with the data it receives.

As previously stated, the shared PDU session is a special PDU session that only the relay chain terminating UE (which communicates to the core network) and the Relay Aggregation UPF are aware of. Other UEs in the relay chain do not need to be aware of its existence and they only need to aggregate the data from other UEs and ensure the data is associated with a corresponding PDU Session ID. The relay chain terminating UE can establish a shared PDU session to send the aggregated data for the relay chain to the core network 106. Similarly, an RA UPF needs to be aware of the shared PDU session to perform the necessary processing described hereafter.

An RA UPF that supports this shared PDU session concept can perform the de-aggregation of UL data to one or more PSA UPFs similar to an UL CL or BP UPF. However, unlike the UL CL or the BP UPF cases, the establishment of a shared PDU session automatically selects a UPF that supports relay aggregation to manage routing both UL and DL data associated with the shared PDU session to and from multiple PSA UPFs. The relay UE sends a combined message including data from multiple PDU Session IDs of other UEs. Within the combined message, a Traffic Group ID is inserted along with the aggregated data that are organized according to the PDU Session ID they belong to. The Traffic Group ID allows the RA UPF to make a determination to parse the combined message into individual PDU sessions and route them to the associate PSA UPFs.

To support the shared PDU session concept, the session management procedures of TS 23.502 (3GPP TS 23.502, Procedures for the 5G System; V15.4.1 (2019 January)), incorporated herein by reference, are modified for specifying a request for shared PDU session functionality. Using FIGS. 3A and 3B as the basis for the modifications to the PDU Session Establishment procedure, the following are differences to the procedure to support shared PDU sessions:

In step S302, the relay UE 102 includes a Shared PDU Session indication along with a list of secondary PDU Session IDs that can be associated with this PDU session ID in a PDU Session Establishment request to the core network. The PDU Session ID provided in the request can be referred to as the primary PDU Session ID and used for the shared PDU session. The resulting tunnel that is created for this PDU session will be used to carry the aggregated data from the multiple UEs. The IDs of these PDU sessions are found in the list of secondary PDU Session IDs, which contains the PDU Session IDs of all UEs that share this PDU session including the PDU Session ID of the relay UE if it also provides data. In this case, the PDU Session ID provided in the PDU Session Establishment request will serve as the primary PDU Session ID for the shared PDU session. Alternatively, the primary PDU Session ID provided in the shared PDU Session Establishment request can be used for a dual purpose: 1) session ID for the shared PDU session, and 2) session ID for the PDU session associated with the relay UE in which the relay UE provides its own application data. In this alternative case, the secondary PDU Session IDs list will only contain PDU Session IDs for all UEs in the relay chain except for the PDU Session ID of the relay UE.

In step S308, the SMF 174 may need to retrieve PDU session context information from the UDM 197 for each of the PDU Session IDs in the secondary PDU Session IDs list if it is not already available in the SMF. Similarly, the SMF 174 may need to retrieve SM subscription data from the UDM 197 if they are not available and subscribe to get notifications for changes in the subscription data.

In step S310, SMF 174 returns one or more Context IDs to AMF 172 if SMF 174 was successful in obtaining all context information in step S308 for all PDU Session IDs in the secondary PDU Session IDs list. If SMF 174 is not able to obtain all context information required for each of the PDU Session IDs, then SMF 174 can reject the request.

In step S314a and S314b, the SMF 174 can establish a SM Policy Association to obtain PCC rules from the PCF 184 for the shared PDU session. The SMF 174 provides the PDU Session IDs found in the secondary PDU Session IDs list in this procedure.

In step S316, the SMF 174 selects a UPF 176a that supports the shared PDU session functionality to provide the relay aggregation described herein.

In step S320a and S320b, the SMF 174 establishes N4 session establishment with the selected UPF 176a to serve as the RA UPF. Packet detection, enforcement, and reporting rules are provided to the RA UPF for each PDU Session ID in the secondary PDU Session IDs list. If SMF 174 allocates CN Tunnel Info, it is provided to the UPF 176a. Note that this tunnel info corresponds to the N3 interface. Then the SMF 174 initiates N4 Session Modification for each of the PSA UPFs associated with the PDU Session IDs found in the secondary PDU Session IDs list. This ensures that all data traffic from the PSA UPFs are routed to the RA UPF.

In step S322, the SMF 174 sends the CN Tunnel Info to the RAN node among other information found in the Namf_Communication_N1N2MessageTransfer. Additionally, the SMF 174 can provide some indication to the RAN node 105 that data for this shared PDU session is delay tolerant. The RAN node 105 can in turn use this indication when communicating with the relay UE as described below. In addition, the aggregation policy can be provisioned to the UE 102 at this time in a NAS message sent through the AMF. This aggregation policy can contain the Traffic Group ID and the Delay Tolerant Data Period parameters the UE 102 uses to make data aggregation decisions over PC5 or other UE-to-UE communications.

Note that the PDU Session Modification procedure from TS 23.502 (3GPP TS 23.502, Procedures for the 5G System; V15.4.1 (2019 January)), incorporated herein by reference, can also be used to make changes to the shared PDU session. A relay UE can add or remove secondary PDU Session IDs from the shared PDU session whenever UEs are added or removed from the relay chain. In addition, a PDU session can be modified from a non-shared PDU session to a shared PDU session using this procedure. A third scenario is that a relay UE can establish a shared PDU session initially before any UE provide their data and update the shared PDU session by providing the secondary PDU Session IDs using the PDU Session Modification procedure.

One of the assumptions made previously was that all UEs in the relay chain would have established their own PDU session with the core network 106 before data aggregation begins. As a result, each UE 102 performs the PDU Session Establishment procedure from FIGS. 3A and 3B and as part of that procedure, tunneling information are provided to the UPFs and the RAN node 105 to properly route UL and DL data sent from and to the UE 102 respectively. An alternative idea for optimizing this procedure is to introduce "virtual PDU sessions" created by the SMF 174 that minimizes signaling overhead when executing the PDU session establishment procedure.

The optimization can be for the UE 102 to include a new indicator when establishing a PDU session with the core network 106. This indicator, termed "Virtual PDU Session," would inform the SMF 174 that a UE 102 supports sending delay tolerant data that can be relayed by another UE at some point in the future within a shared PDU session. The SMF 174, in response, can decide to omit performing certain signaling associated with user plane configuration (in the UPF 176a and RAN node 105) such as steps S316, S320a, and S320b. In addition, the SMF 174 can also limit the information provided to the RAN node 105 in the messages of steps S322 and S324. A UE 102 using this alternative solution would not be able to send uplink data through the user plane as indicated in FIGS. 3A and 3B, but instead will send its data to relay UEs in the relay chain for routing through the user plane.

Uplink UE Relay Data Aggregation

Once the core network 106 provides the UEs with the Traffic Group IDs and the Delay Tolerant Data Period parameters, relay UEs can begin aggregating data from other UEs. The relay UEs can save these parameters to assist in future processing when they receive UE-to-UE communications, e.g. over PC5. The Traffic Group IDs can be utilized by the relay UE to make a determination on whether to aggregate data received from other UEs. Other UEs, both remote and relay UEs, in the relay chain can include the provisioned Traffic Group ID in communications where the data needs to be aggregated and relayed.

Since the data in asset tracking use cases are delay tolerant, the Delay Tolerant Data Period can be synchronized between UEs to limit the time each is awake to preserve battery life. This period can be interpreted as the period that relay UEs will wait for data from other UEs in the relay chain. If the UEs in the relay chain synchronize this period to occur in the vicinity of each other, then battery life can be preserved on relay UEs. The alternative is the relay UE may need to stay awake for longer periods of time in order to be available to receive data from other UEs, which will drain battery power faster in the relay UEs.

One way to synchronize the occurrence of these periods on multiple UEs in a relay chain is to have a relay UE return the time remaining in this period after receiving data from another UE. For example, UE1 is sending data to UE2 within the same relay chain. UE2 can return the time remaining in the Delay Tolerant Data Period to UE1 so UE1 can synchronize its timer with that of UE2's timer. This process repeats and after all the UEs in the relay chain receive this information, the timers within the UEs in the relay chain will be synchronized.

Within the Delay Tolerant Data Period, the relay UE can continue to receive data from other UEs and aggregate them appropriately if the provided Traffic Group ID matches. Included with the data and the Traffic Group ID are the PDU Session IDs of the respective UEs. These PDU Session IDs can be used by the relay UE to organize the aggregated data. If a UE sends multiple data within the Delay Tolerant Data Period, the relay UE can aggregate the multiple data for the same PDU Session ID. This information is preserved within the relay chain in order for the RA UPF to be able to properly parse the aggregated data.

When a relay UE receives data from another UE in the same relay chain, it checks the provided Traffic Group ID if one is provided by the other UE. If there is a match with the Traffic Group ID stored internally, the relay UE then buffers the data and starts a timer based on the Delay Tolerant Data Period if the timer is not already running. If the timer is already running, the relay UE aggregates the data according to the provided PDU Session ID. The relay UE can also return the time remaining in the timer to notify the other UE when the Delay Tolerant Data Period will expire. At the expiration of the timer, the relay UE can send the aggregated data to an upstream relay UE or to the core network. The aggregated data can include, for example, the Traffic Group ID and a timestamp for when the data was aggregated. Note that individual UEs can also provide time stamp information in their data as well.

Figure 16:
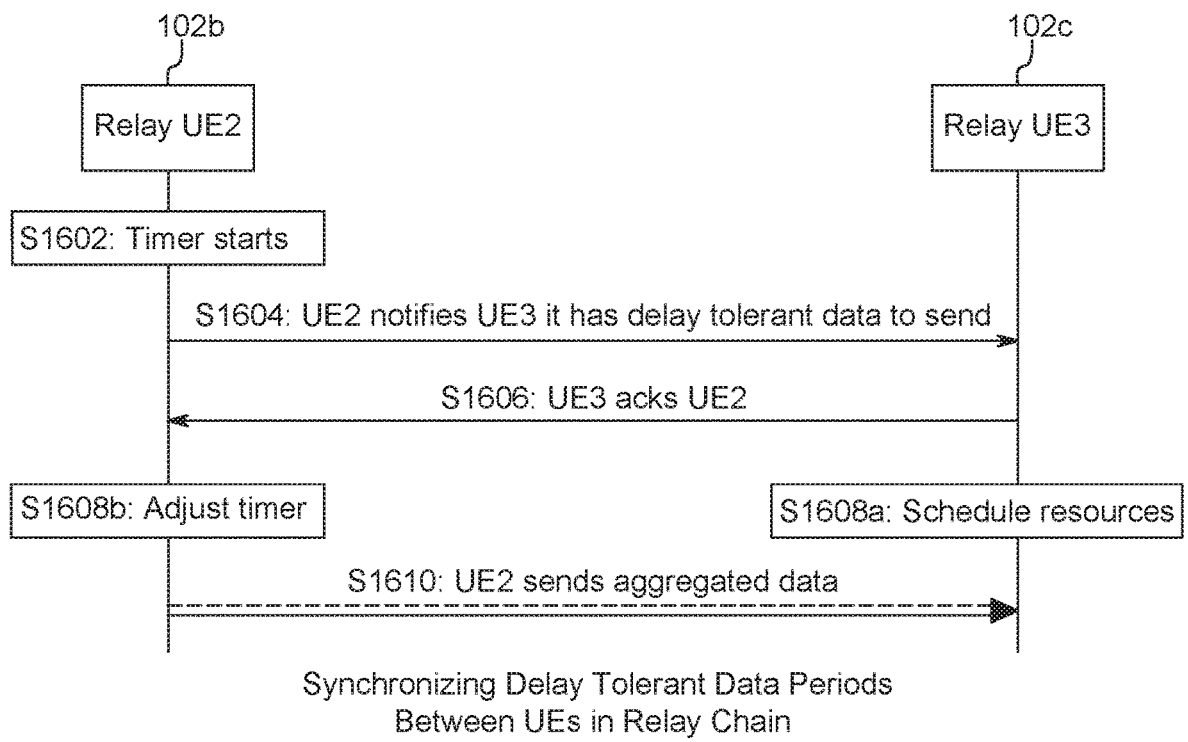
FIG. 16 shows synchronizing delay tolerant data periods between UEs in a relay chain in accordance with an exemplary embodiment.

Another exemplary method for UEs to synchronize their delay timers is shown in FIG. 16. A relay UE 102b (e.g. UE2) can inform an upstream relay UE 102c (e.g. UE3) that it has delay tolerant data to send at some future time after starting its timer. This communication can allow the upstream relay UE 102c to better schedule radio resources when communicating with downstream UEs. Furthermore, the communications can also enable synchronizing Delay Tolerant Data Periods among UEs in the relay chains. Note that the above functionality can be performed at the aggregation layer that was previously proposed or at another layer where this functionality exists. Note also that although this method is utilized for delay tolerant data, it can also be applied to delay intolerant data to optimize radio resource usage in the system.

Step S1602: A timer starts within relay UE2 (102b) to enable aggregating data from other, downstream UEs.

Step S1604: UE2 102b informs UE3 102c that it will have delay tolerant data to send to UE3 102c at some time in the future. UE2 102b can provide the remaining time on its timer to UE3 102c at this time as well as PDU Session IDs of UEs it is aggregating data for, if this information is known.

Step S1606: UE3 102c acknowledges UE2 102b and can include a time in the future different than the time provided in step S1604 for cases where the time in step S1604 can overlap with the scheduled budget for another UE.

Step S1608: In step S1608a, UE3 102c schedules radio resources for UE2 102b based on the time provided in either step S1604 or step S1606. If a new timer value was provided in step S1606, UE2 102b adjusts its timer to reflect the difference in step S1608b. If the timer value provided in step S1606 is smaller than the timer value provided from step S1604, then UE2 102b may need to communicate the difference to downstream UEs. Note that UE3 102c can go to sleep and wake up before any scheduled radio resources are required to be available if UE3 102c has scheduled radio resources for all downstream UEs it is servicing.

Step S1610: At the expiration of its internal timer, UE2 102b sends UE3 102c the aggregated data. Radio resources will already be available in UE3 102c to receive the data due to the scheduling that was performed in step S1608a.

Each data stored in the buffer of the relay UE is associated with a PDU Session ID to identify the PDU session this data belongs to. If the relay UE receives multiple data associated with a certain PDU Session ID, it will aggregate the new data with the old data under the same PDU Session ID. The relay UE can buffer the data for each UE independently and associate the aggregate data with that UE's PDU Session ID. Once the timer expires, the relay UE forwards all the data in its buffers along with a time stamp to the next upstream relay UE or to the core network 106.

During UE-to-UE communications (e.g. over PC5), a QoS can be provided in the message sent to a relay UE. This QoS applies to the PC5 communication but it is also related to the desired QoS for the PDU Session ID associated with this message. The aggregation layer shown in FIG. 13 can use this information received from the SDAP layer and derive an appropriate QoS Flow ID (QFI) for use when sending the data to the core network. If necessary, a relay UE may need to create multiple shared PDU sessions to support different QoS requirements received from the UEs in the relay chain(s). In the simplistic case when all UEs in a relay chain have the same QoS, only one shared PDU session is required to be established.

When aggregated data are available to be sent to the core network, the data is package together and sent using the Shared PDU Session ID previously created. The relay UE ensures that the Traffic Group ID is included with the aggregated data clearly delineated and categorized according to the corresponding PDU Session IDs. The data will be sent through the RAN node 105 to the RA UPF 176 for separation into individual PDU Session ID associated with the underlying UEs, i.e. different PSA UPFs.

Figure 17:
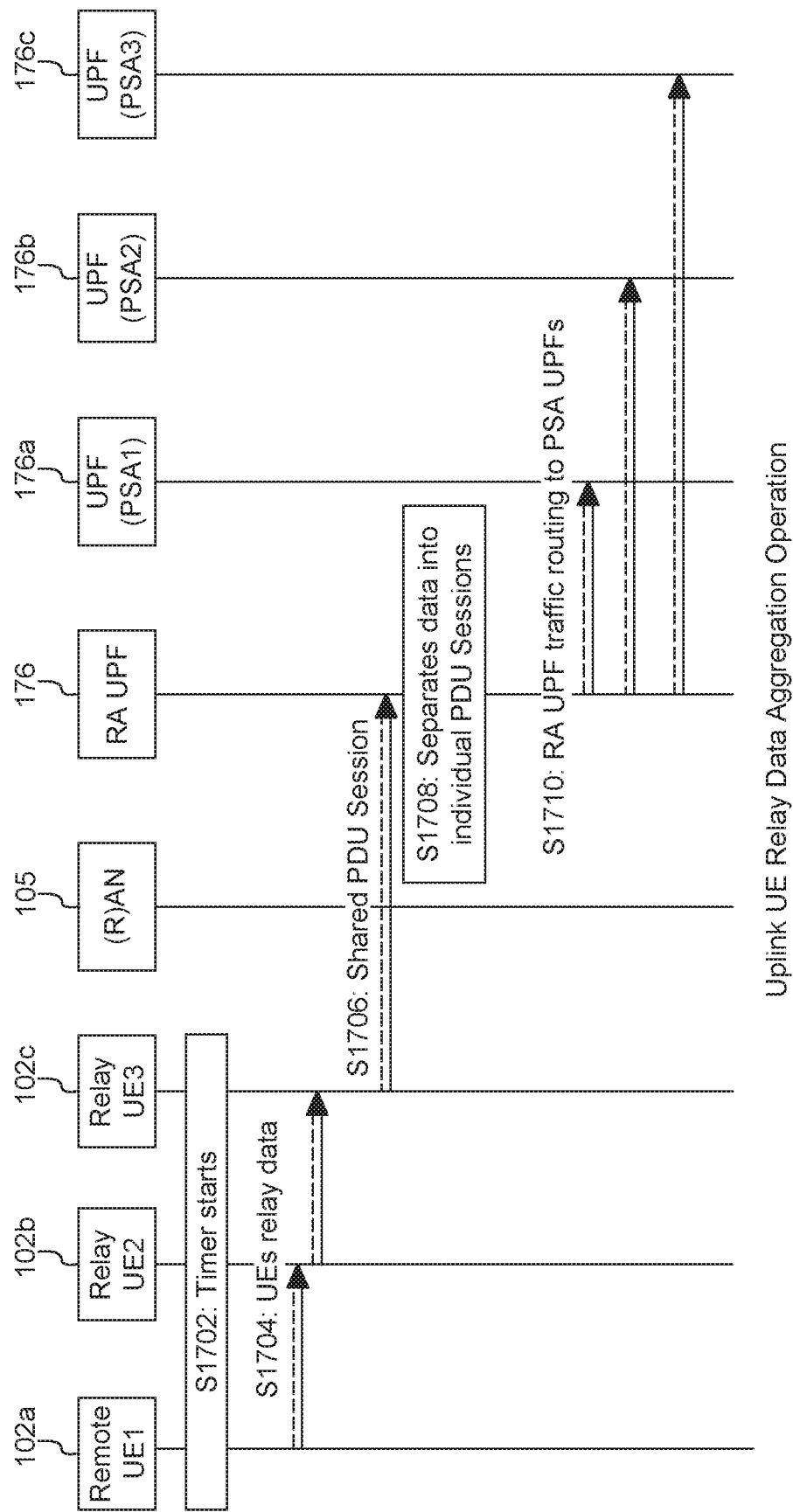
FIG. 17 shows an uplink UE relay data aggregation operation in accordance with an exemplary embodiment.

FIG. 17 shows the operations of relay UEs aggregating UL data from other UEs in a relay chain and sending the aggregated data in a shared PDU session through the RAN node 105 to the RA UPF 176.

Step S1702: The timer based on the Delay Tolerant Data Period parameter on all UEs that are part of the relay chain starts. Each UE that is part of the relay chain has already been provisioned with the Traffic Group ID and Delay Tolerant Data Period and has executed procedures to form this relay chain. In addition, UE3 102*c* has already established a shared PDU session with the core network 106.

Step S1704: Sometime later, UE1 102*a* sends data to be aggregated to UE2 102*b*. Similarly, UE2 120*b* sends data received from UE1 102*a* and also data from its own sensors to UE3 102*c*. UE3 102*c* aggregates data from UE1 102*a* and UE2 102*b* as well as data from its own internal sensors. Note that each UE includes the Traffic Group ID and its own PDU Session ID when sending data to an upstream UE and each relay UE can add a time stamp when relaying the aggregated data.

Step S1706: Once the timer expires, UE3 102*c* aggregates all the data received from the UEs in the relay chain and sends them in the shared PDU session that was previously established. UE3 102*c* can include the Traffic Group ID, a time stamp, the Shared PDU Session ID, and the aggregated data with the corresponding PDU Session IDs.

Step S1708: Upon receiving the UL data in the shared PDU session, the RA UPF 176 separates the data and forwards individual data to the different PSA UPFs 176*a*, 176*b*, 176*c* according to the PDU session ID provided with the data from each UE.

Step S1710: RA UPF 176 sends the UL data to each of the corresponding PSA UPFs 176*a*, 176*b*, 176*c* based on Packet Detection Rules (PDRs) that it received upon the establishment of the shared PDU session.

An alternative to using a shared PDU session as described herein is to have the relay UE send individual PDUs to the core network 106. The relay UE can send data associated with each PDU session IDs on the corresponding PDU session separate from data of other PDU session IDs. In that case, the relay UE does not need to create a shared PDU session and uses the PDU Session ID received from other UEs to send the data to the core network. Furthermore, the relay UE can send data to the core network 106 using a combination of individual PDU sessions and shared PDU sessions.

Downlink UPF Relay Data Aggregation

During the shared PDU session establishment, the RA UPF 176 was configured with PDU Session IDs associated with all the UEs that are covered by the relay chain as well as the aggregation parameters Traffic Group ID and Delay Tolerant Data Period. Note the Delay Tolerant Data Period provided to the RA UPF may be different from the same parameter provided to the UEs. This value can be based on network configuration or policy. When DL data arrives from different PSA UPFs, the RA UPF 176 can buffer the DL data and use the Delay Tolerant Data Period to start a timer to wait for more data for this shared PDU session. This minimizes the frequency with which the RA UPF 176 sends data to the relay UE. Similar to the relay UE, the RA UPF 176 organizes DL data according to their PDU Session IDs. At the expiration of the timer, the RA UPF 176 forwards the aggregated data to the relay UE through the RAN node 105.

Figure 18:
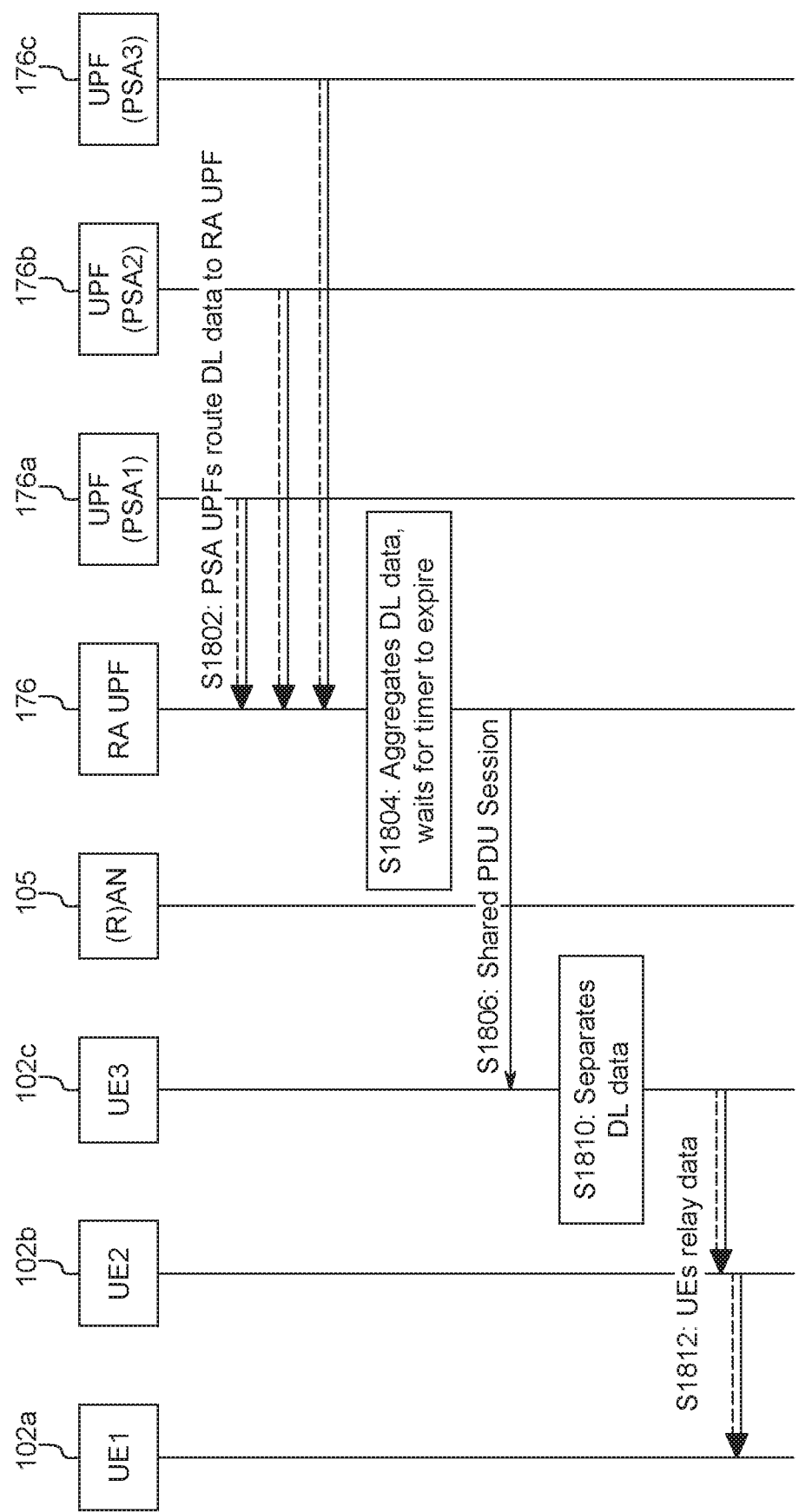
FIG. 18 shows a downlink UPF relay data aggregation operation in accordance with an exemplary embodiment.

FIG. 18 shows the operations of the RA UPF 176 aggregating DL data from various PSA UPFs 176*a*, 176*b*, 176*c* before sending them to the relay UE. The figure assumes that the UEs have been provisioned with necessary aggregation information, have formed a relay chain, and a shared PDU session has been established to relay aggregated data from all UEs in the relay chain.

Step S1802: The RA UPF 176 receives DL data from various PSA UPFs 176*a*, 176*b*, 176*c* and aggregates the data based on the individual PDU Session IDs.

Step S1804: The RA UPF 176 waits for the duration specified by Delay Tolerant Data Period before sending the DL data to UE3 102*c*. During this time, the RA UPF 176 continues to aggregate data from various PSA UPFs 176*a*, 176*b*, 176*c*.

Step S1806: The RA UPF 176 sends the aggregated data organized to their individual PDU Session IDs and includes the Traffic Group ID on the shared PDU session through the RAN node 105 to UE3 102*c*. A time stamp can be added as well.

Step S1810: UE3 102*c* separates the DL data and extracts data for its own PDU Session ID and repackages the remaining data for other UEs according to their PDU Session ID.

Step S1812: UE3 102*c* sends the repackaged data to UE2 102*b*, which performs similar functionality as UE3 102*c* and forwards data intended to other UEs to UE1 102*a*. The process repeats until the DL data have reached all downstream UEs in the relay chain.

UE Notifies RAN of Availability of Delay Tolerant Data for Transmission

A relay UE may need to perform a RACH procedure to establish or re-establish RRC Connection with a RAN node 105 while it is aggregating data from other UEs. The relay UE can be able to perform the procedure and indicate to the RAN node 105 that the UE has delay tolerant data. In turn, the RAN node 105 can be able to better utilize radio resources by paging the relay UE at some future time and dedicating current radio resources for higher priority traffic.

Figure 19:
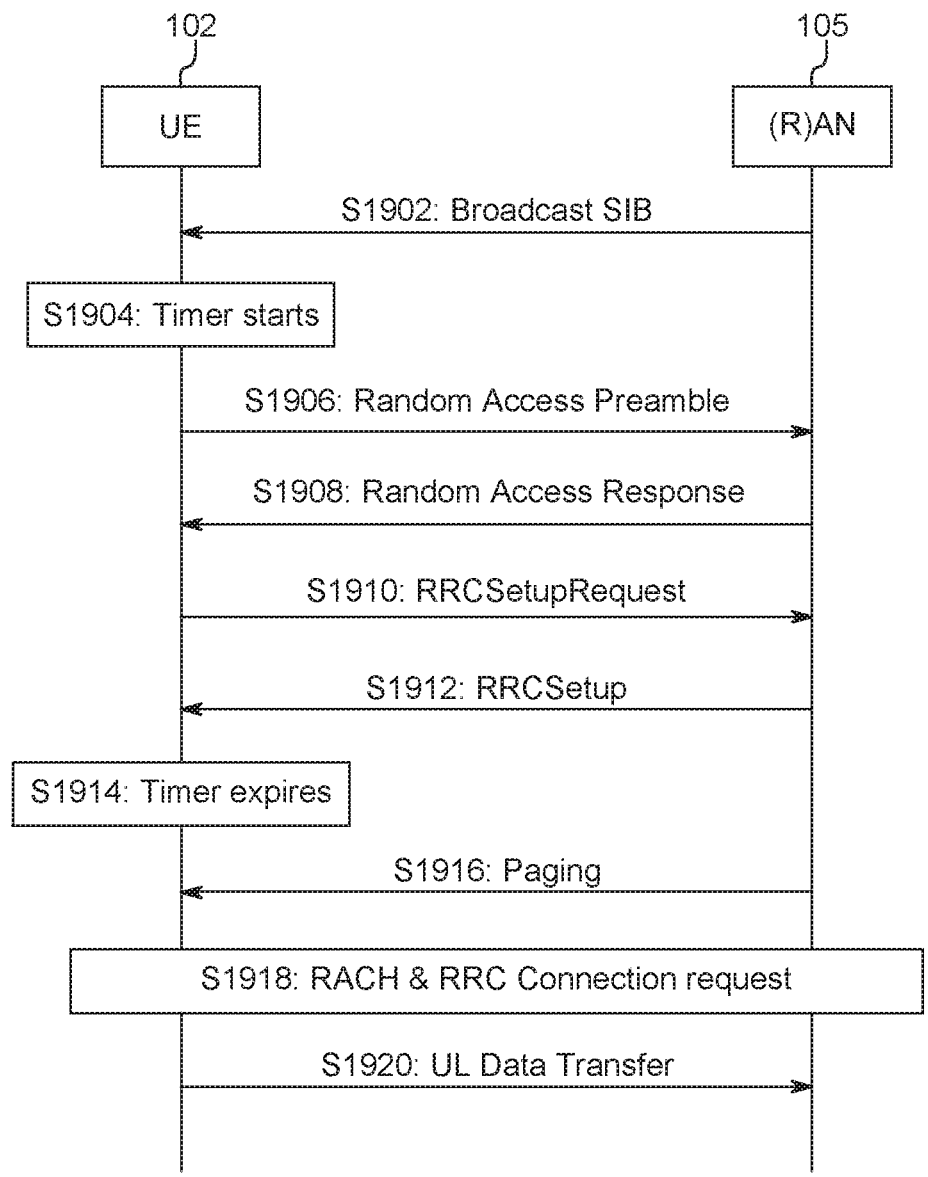
FIG. 19 shows a RAN node paging a UE for delay tolerant data in accordance with an exemplary embodiment.

FIG. 19 shows a procedure in which a UE 102 performs RACH procedure with a RAN node 105 and indicates it has data that is delay tolerant. The RAN node 105 can use this indication to optimize radio resource usage and decide to page the UE 102 for the delay tolerant data at a future time. The steps of the procedure are as follows.

Step S1902: The UE 102 reads broadcast information that is sent by the RAN node 105 (e.g. System Information Broadcast (SIB)). The UE 102 receives an indication in the SIB that the RAN node 105 supports the "moPageWhenReady" feature. This feature is further explained in step S1910.

Step S1904: A timer based on the Delay Tolerant Data Period is started within the relay UE as the process of data aggregation begins.

Step S1906: The relay UE 102 initiates the RACH procedure by sending a Random Access Preamble. A RACH preamble can be defined specifically for use in delay tolerant use cases and if that is the case, steps S1910 and S1912 can be skipped.

Step S1908: The RAN node 105 responds with the Random Access Response. If a delay tolerant RACH preamble was defined and sent in step S1906, the RAN node 105 can return some code to indicate that the network will page the UE 102 when it is a good time to send the data. The message can also include an indication of how long the UE 102 should wait before trying again if it does not receive a page. The message can further include a request reference number and the procedure continues to step S1914.

Step S1910: The relay UE 102 can then send an RRCSetupRequest or RRCResumeRequest message to the RAN node 105 to establish or resume an RRC connection depending on the UE's RRC state. In the message, the relay UE 105 can include an indication in the establishmentCause or resumeCause information element. This indication can be "mo-PageWhenReady". The "mo-PageWhenReady" indication tells the network that the network should page the UE 102 when it is a good time to send the data. Furthermore, the UE 102 can provide an indication of how long the UE 102 is willing to be paged.

Step S1912: The RAN node 105 returns an RRCSetup or RRCResume message. The network can indicate that the request is rejected or accepted. The reject or accept message can have a cause code or indication that indicates that the network will page the UE 102 when it is a good time to send the data. The message can also include an indication of how long the UE 102 should wait before trying again if it does not receive a page. The message can further include a request reference number.

Step S1914: Rather than sending an RRCSetupComplete or RRCResumComplete message, the UE 102 waits for the timer to expire and continues to aggregate data since the network has indicated it will page the UE 102 for the data at a later time.

Step S1916: After some time, the RAN node 105 pages the UE 102 for the delay tolerant data. The RAN node 105 has flexibility with when to send the paging message depending on radio resource availability and can incorporate the fact that the data is delay tolerant to optimize radio resource usage. Note that the RAN node 105 can page the relay UE 102 before the timer expires in step S1914. The relay UE 102 can then send the data that it has aggregated to the RAN node 105. The paging message that is sent to the UE 102 can include an indication that the UE 102 is being paged for MO data. The paging message can further include the reference number that was also provided to the UE 102 in step S1908 or step S1912 so that the UE 102 can associate the page with the original request for MO data.

Step S1918: The relay UE 102 performs a RACH procedure, establishes an RRC connection, and sends a Service Request. The RRC Connection Request and Service Request can include indication that the request is in response to a page for MO data. The indication that the request is in response to a page for MO data can cause the network to treat the request with a higher priority since the UE 102 was previously delayed, or backed off.

Step S1920: The UE 102 then sends the aggregated data to the RAN node 105.

Graphical User Interface

Figure 20:
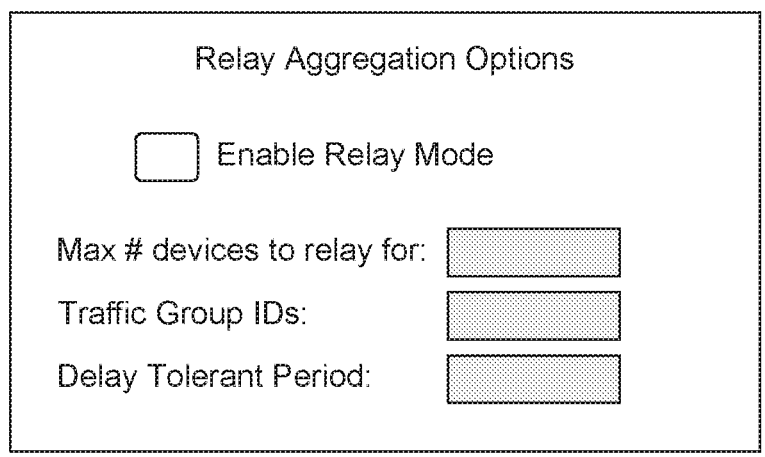
FIG. 20 shows a user interface that displays relay aggregation options in a UE in accordance with an exemplary embodiment.

FIG. 20 shows an example of a user interface of relay aggregation options that can be configured on a UE 102. The data for some of the parameters can be pre-provisioned to the UE 102, the parameters can be obtained from the core network 106 when UE policy that contains aggregation parameters is configured or updated, or a user may even override the parameters as necessary.

In an exemplary embodiment, the electronic device is a UE 102, such as a relay UE that is the uppermost UE in the relay chain. However, the UE 102 can be located at any position in the relay chain. In an exemplary embodiment, the circuitry of the electronic device (e.g., UE 102) can include at least one or more processor devices (e.g., CPUs). In an exemplary embodiment, the circuitry can also include one or more memories storing computer executable instructions. In an exemplary embodiment, the circuitry can include one or more of the components shown in FIG. 1F.

In an exemplary embodiment, the electronic device (e.g., UE 102) receives data from the other electronic devices (e.g., other UEs, etc.).

In an exemplary embodiment, the electronic device (e.g., UE 102, such as relay UE3 102c) includes circuitry (e.g., one or more components of FIG. 1F) configured to send a request to a core network 106, 107, 109 (e.g., to one or more nodes in the core network such as the AMF 172). The request can inform the core network that the electronic device is capable of aggregating data and relaying data from other electronic devices (e.g., remote UE1 102a, relay UE2 102b, etc.). The circuitry is also configured to receive one or more aggregation policies from the core network. The one or more aggregation policies can provide parameters that instruct how the electronic device is to aggregate and relay data. The circuitry is also configured to receive data from the other electronic devices; aggregate the data from the other electronic devices based on the parameters; and send the aggregated data to the core network 106, 107, 109.

In an exemplary embodiment, the circuitry of the electronic device is configured to establish a shared protocol data unit (PDU) session so that the electronic device can send the aggregated data to the core network. The circuitry is also configured to receive a response from the core network that the shared PDU session has been created.

In an exemplary embodiment, the one or more aggregation policies include, for example, at least a traffic group ID parameter and a parameter indicative of a delay tolerant data period.

In an exemplary embodiment, received data from one of the other electronic devices can include, for example, a traffic group ID, and the electronic device will aggregate the received data if the traffic group ID matches the traffic group ID parameter of the one or more aggregation policies.

In an exemplary embodiment, the received data from one of the other electronic devices can include, for example, a traffic group ID and a PDU session ID.

In an exemplary embodiment, the circuitry of the electronic device is configured to set an amount of time to wait for data from the other electronic devices based on the delay tolerant data period.

In an exemplary embodiment, a non-access stratum (NAS) layer of the electronic device can set the amount of time to wait for data from the other electronic devices.

In an exemplary embodiment, the circuitry of the electronic device is configured to establish the shared PDU session with a primary PDU Session ID and one or more secondary PDU Session IDs.

In an exemplary embodiment, the circuitry of the electronic device is configured to notify a radio access network (RAN) node (e.g., RAN 105) that delay tolerant data will be sent to the RAN node 105 in the future, so that the RAN node 105 can optimize allocation of radio resources.

In an exemplary embodiment, the circuitry of the electronic device is configured to receive a page from the RAN node 105 to notify the electronic device that the RAN node 105 is ready to receive the aggregated data.

In an exemplary embodiment, the circuitry of the electronic device is configured to relay the aggregated data to the core network through a RAN node 105 and a relay aggregation user plane function (RA UPF) 176. See FIG. 17.

In an exemplary embodiment, the RA UPF 176 receives the aggregated data, separates the aggregated data, and forwards individual data from the separated aggregated data to different PDU Session Anchor (PSA) UPFs (e.g., 176a,

176b, 176c) according to an individual PDU session ID provided with the data from each of the other electronic devices. See FIG. 17.

In an exemplary embodiment, the circuitry of the electronic device is configured to coordinate with the other electronic devices to synchronize a delay budget for sending data to optimize battery consumption of the electronic device and the other electronic devices.

In an exemplary embodiment, the electronic device is a user equipment operating as a relay node device.

In an exemplary embodiment, the electronic device is configured to receive the data from the other electronic devices via PC5 communications.

In an exemplary embodiment, the electronic device is configured to receive a broadcast from the RAN node 105 indicating support of receiving delay tolerant data and paging the electronic device when ready to receive the delay tolerant data.

In an exemplary embodiment, the request can include either a relay aggregation indication or a data aggregation indication.

In an exemplary embodiment, the electronic device adds a time stamp to the received data from the other electronic devices.

In an exemplary embodiment, a method is performed by an electronic device. The method can include: sending a request to a core network, wherein the request informs the core network that the electronic device is capable of aggregating data and relaying data from other electronic devices. The method can include receiving one or more aggregation policies from the core network, wherein the one or more aggregation policies provide parameters that instruct how the electronic device is to aggregate and relay data. The method can include receiving data from the other electronic devices. The method can include aggregating the data from the other electronic devices based on the parameters. The method can include sending the aggregated data to the core network.

In an exemplary embodiment, a method for a network node is performed. The method can include receiving a request from an electronic device. The request can inform the network node that the electronic device is capable of aggregating data and relaying data from other electronic devices. The method can include sending one or more aggregation policies to the electronic device. The one or more aggregation policies can provide parameters that instruct how the electronic device is to aggregate and relay data. The one or more aggregation policies can include at least a traffic group ID parameter and a parameter indicative of a delay tolerant data period.

In an exemplary embodiment, the network node is an Access and Mobility Management Function (AMF) 172.

In an exemplary embodiment, the network node is an Access and Mobility Management Function (AMF) 172 and one or more other nodes or components (for example, one or more network nodes shown in FIGS. 1B, 1C, 1D, and 2). In an exemplary embodiment, the network node is one or more network nodes (for example, one or more network nodes shown in FIGS. 1B, 1C, 1D, and 2).

In an exemplary embodiment, the method can include receiving aggregated data. The received aggregated data can be data that has been aggregated from the other electronic devices based on the provided parameters. The method can include any other steps described herein.

In an exemplary embodiment, a non-transitory computer-readable medium (e.g., one or more of non-removable memory 130 and removable memory 132) includes computer-executable instructions, which when executed by circuitry (e.g., processor 118) of an electronic device (e.g., UE 102), cause the electronic device to: send a request to a core network, wherein the request informs the core network that the electronic device is capable of aggregating data and relaying data from other electronic devices; receive one or more aggregation policies from the core network, wherein the one or more aggregation policies provide parameters that instruct how the electronic device is to aggregate and relay data; receive data from the other electronic devices; aggregate the data from the other electronic devices based on the parameters; and send the aggregated data to the core network.

It will be understood that any of the methods and processes described herein may be embodied in the form of computer executable instructions (i.e., program code) stored on a computer-readable storage medium, and when the instructions are executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information, and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

Thus, it will be appreciated by those skilled in the art that the disclosed systems and methods can be embodied in other specific forms without departing from the spirit or essential characteristics thereof. The presently disclosed embodiments are therefore considered in all respects to be illustrative and not restricted. It is not exhaustive and does not limit the disclosure to the precise form disclosed. Modifications and variations are possible in light of the above teachings or may be acquired from practicing of the disclosure, without departing from the breadth or scope. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The scope of the invention is indicated by the appended claims rather than the foregoing description and all changes that come within the meaning and range and equivalence thereof are intended to be embraced therein.

What is claimed is:

1. A wireless transmit/receive unit (WTRU) configured to: send a request to a core network, wherein the request informs the core network that the WTRU is capable of aggregating data and relaying data from other WTRUs;
receive one or more aggregation policies from the core network, wherein the one or more aggregation policies comprise one or more parameters that instruct how the WTRU is to aggregate and relay data and wherein the one or more aggregation policies comprise at least a parameter indicative of a delay tolerant data period;
set an amount of time to wait for data from the other WTRUs based on the delay tolerant data period; receive data from the other WTRUs during the amount of time that was set based on the delay tolerant data period; aggregate the data from the other WTRUs based on the parameters, wherein the aggregation policies comprise a traffic group ID parameter that indicates a group of WTRUs whose data can be aggregated together and relayed to the core network; and send the aggregated data to the core network.

2. The WTRU of claim 1, wherein the WTRU is further configured to establish a shared protocol data unit (PDU) session so that the WTRU can send the aggregated data to the core network; and
receive a response from the core network that the shared PDU session has been created.

3. The WTRU of claim 1, wherein the received data from one of the other WTRUs comprises a traffic group ID, and the WTRU will aggregate the received data if the traffic group ID matches the traffic group ID parameter of the one or more aggregation policies.

4. The WTRU of claim 1, wherein the received data from one of the other WTRUs comprises a traffic group ID and a PDU session ID.

5. The WTRU of claim 1, wherein a non-access stratum (NAS) layer of the WTRU sets the amount of time to wait for data from the other WTRUS.

6. The WTRU of claim 2, wherein the WTRU is further configured to establish the shared PDU session with a primary PDU Session ID and one or more secondary PDU Session IDs.

7. The WTRU of claim 1, wherein the WTRU is further configured to notify a radio access network (RAN) node that delay tolerant data will be sent to the RAN node in the future, so that the RAN node can optimize allocation of radio resources.

8. The WTRU of claim 7, wherein the WTRU is further configured to receive a page from the RAN node to notify the WTRU that the RAN node is ready to receive the aggregated data.

9. The WTRU of claim 1, wherein the WTRU is further configured to relay the aggregated data to the core network through a RAN node and a relay aggregation user plane function (RA UPF).

10. The WTRU of claim 9, wherein the RA UPF receives the aggregated data, separates the aggregated data, and forwards individual data from the separated aggregated data to different PDU Session Anchor (PSA) UPFs according to an individual PDU session ID provided with the data from each of the other WTRUs.

11. The WTRU of claim 1, wherein the WTRU is further configured to coordinate with the other WTRUs to synchronize a delay budget for sending data to optimize battery consumption of the WTRU and the other WTRUs.

12. The WTRU of claim 1, wherein the WTRU is a user equipment operating as a relay node device.

13. The WTRU of claim 1, wherein the WTRU is configured to receive the data from the other WTRUs via PC5 communications.

14. The WTRU of claim 7, wherein the WTRU is further configured to receive a broadcast from the RAN node indicating support of receiving delay tolerant data and paging the WTRU when ready to receive the delay tolerant data.

15. The WTRU of claim 1, wherein the request comprises a relay aggregation indication or a data aggregation indication.

16. A method performed by a wireless transmit/receive unit (WTRU), the method comprising: sending a request to a core network, wherein the request informs the core network that the WTRU is capable of aggregating data and relaying data from other WTRUs; receiving one or more aggregation policies from the core network, wherein the one or more aggregation policies comprise one or more parameters that instruct how the WTRU is to aggregate and relay data and wherein the one or more aggregation policies comprise at least a parameter indicative of a delay tolerant data period; setting an amount of time to wait for data from the other WTRUs based on the delay tolerant data period; receiving data from the other WTRUs during the amount of time that was set based on the delay tolerant data period; aggregating the data from the other WTRUs based on the parameters, wherein the aggregation policies comprise a traffic group ID parameter that indicates a group of WTRUs whose data can be aggregated together and relayed to the core network; and sending the aggregated data to the core network.

17. A method for a network node, the method comprising:
receiving a request from a WTRU, wherein the request informs the network node that the WTRU is capable of aggregating data and relaying data from other WTRUs;
sending one or more aggregation policies to the WTRU, wherein the one or more aggregation policies comprise one or more parameters that instruct how the WTRU is to aggregate and relay data, wherein the aggregation policies comprise a traffic group ID parameter that indicates a group of WTRUs whose data can be aggregated together and relayed to the core network, wherein the one or more aggregation policies further comprise at least a parameter indicative of a delay tolerant data period and an amount of time to wait for data from the other WTRUs; and receiving aggregated data, wherein the received aggregated data is data that has been aggregated from the other WTRUs based on the one or more parameters.

* * * * *